US009863267B2

(12) United States Patent
O'Dea et al.

(10) Patent No.: US 9,863,267 B2
(45) Date of Patent: Jan. 9, 2018

(54) SYSTEM AND METHOD OF CONTROL FOR A GAS TURBINE ENGINE

(71) Applicants: General Electric Company, Schenectady, NY (US); ExxonMobil Upstream Research Company, Houston, TX (US)

(72) Inventors: Dennis M. O'Dea, Somerset, NJ (US); Karl Dean Minto, Ballston Lake, NY (US); Richard A. Huntington, Houston, TX (US); Sulabh K. Dhanuka, Houston, TX (US); Franklin F. Mittricker, Jamul, CA (US)

(73) Assignees: General Electric Company, Schenectady, NY (US); ExxonMobil Upstream Research Company, Spring, TX (US)

( * ) Notice: Subject to any disclaimer, the term of this patent is extended or adjusted under 35 U.S.C. 154(b) by 424 days.

(21) Appl. No.: 14/599,750

(22) Filed: Jan. 19, 2015

(65) Prior Publication Data

US 2016/0010493 A1  Jan. 14, 2016

Related U.S. Application Data

(60) Provisional application No. 61/929,873, filed on Jan. 21, 2014.

(51) Int. Cl.
*F02C 1/00* (2006.01)
*F01D 21/00* (2006.01)
(Continued)

(52) U.S. Cl.
CPC .............. *F01D 21/003* (2013.01); *F02C 7/04* (2013.01); *F02C 7/22* (2013.01); *F23C 9/00* (2013.01);
(Continued)

(58) Field of Classification Search
USPC ......... 60/737, 740, 742, 746, 752, 772, 776, 60/39.52, 39.461, 39.463
See application file for complete search history.

(56) References Cited

U.S. PATENT DOCUMENTS 2,488,911 A  11/1949  Hepburn et al.
2,884,758 A  5/1959  Oberle
(Continued)

FOREIGN PATENT DOCUMENTS

CA  2231749  9/1998
CA  2645450  9/2007
(Continued)

OTHER PUBLICATIONS

U.S. Appl. No. 14/771,450, filed Feb. 28, 2013, Valeev et al.
(Continued)

*Primary Examiner* — Binh Q Tran
(74) *Attorney, Agent, or Firm* — Fletcher Yoder P.C.

(57) ABSTRACT

A system includes plurality of combustors and a distributed flow measurement system coupled to the plurality of combustors. Each combustor of the plurality of combustors includes one or more oxidant passages and one or more fuel passages. The distributed flow measurement system is configured to measure an oxidant flow rate for a respective oxidant passage of the one or more oxidant passages of the respective combustor based at least in part on an oxidant pressure drop along the respective oxidant passage, and the distributed flow measurement system is configured to measure a fuel flow rate for a respective fuel passage of the one or more fuel passages of the respective combustor based at least in part on a fuel pressure drop along the respective fuel passage.

25 Claims, 8 Drawing Sheets

(51) Int. Cl.
  *F23N 5/18* (2006.01)
  *F23R 3/26* (2006.01)
  *F23R 3/28* (2006.01)
  *F23C 9/00* (2006.01)
  *F23R 3/50* (2006.01)
  *F02C 7/04* (2006.01)
  *F02C 7/22* (2006.01)

(52) U.S. Cl.
  CPC ............... *F23N 5/18* (2013.01); *F23R 3/26* (2013.01); *F23R 3/28* (2013.01); *F23R 3/50* (2013.01); *F23N 2025/06* (2013.01); *F23N 2041/20* (2013.01); *Y02T 50/677* (2013.01)

(56) References Cited

U.S. PATENT DOCUMENTS

| | | | |
|---|---|---|---|
| 3,631,672 A | 1/1972 | Gentile et al. | |
| 3,643,430 A | 2/1972 | Emory et al. | |
| 3,705,492 A | 12/1972 | Vickers | |
| 3,841,382 A | 10/1974 | Gravis et al. | |
| 3,949,548 A | 4/1976 | Lockwood | |
| 4,018,046 A | 4/1977 | Hurley | |
| 4,043,395 A | 8/1977 | Every et al. | |
| 4,050,239 A | 9/1977 | Kappler et al. | |
| 4,066,214 A | 1/1978 | Johnson | |
| 4,077,206 A | 3/1978 | Ayyagari | |
| 4,085,578 A | 4/1978 | Kydd | |
| 4,092,095 A | 5/1978 | Straitz | |
| 4,101,294 A | 7/1978 | Kimura | |
| 4,112,676 A | 9/1978 | DeCorso | |
| 4,117,671 A | 10/1978 | Neal et al. | |
| 4,160,640 A | 7/1979 | Maev et al. | |
| 4,165,609 A | 8/1979 | Rudolph | |
| 4,171,349 A | 10/1979 | Cucuiat et al. | |
| 4,204,401 A | 5/1980 | Earnest | |
| 4,222,240 A | 9/1980 | Castellano | |
| 4,224,991 A | 9/1980 | Sowa et al. | |
| 4,236,378 A | 12/1980 | Vogt | |
| 4,253,301 A | 3/1981 | Vogt | |
| 4,271,664 A | 6/1981 | Earnest | |
| 4,344,486 A | 8/1982 | Parrish | |
| 4,345,426 A | 8/1982 | Egnell et al. | |
| 4,352,269 A | 10/1982 | Dineen | |
| 4,380,895 A | 4/1983 | Adkins | |
| 4,399,652 A | 8/1983 | Cole et al. | |
| 4,414,334 A | 11/1983 | Hitzman | |
| 4,434,613 A | 3/1984 | Stahl | |
| 4,435,153 A | 3/1984 | Hashimoto et al. | |
| 4,442,665 A | 4/1984 | Fick et al. | |
| 4,445,842 A | 5/1984 | Syska | |
| 4,479,484 A | 10/1984 | Davis | |
| 4,480,985 A | 11/1984 | Davis | |
| 4,488,865 A | 12/1984 | Davis | |
| 4,498,288 A | 2/1985 | Vogt | |
| 4,498,289 A | 2/1985 | Osgerby | |
| 4,528,811 A | 7/1985 | Stahl | |
| 4,543,784 A | 10/1985 | Kirker | |
| 4,548,034 A | 10/1985 | Maguire | |
| 4,561,245 A | 12/1985 | Ball | |
| 4,569,310 A | 2/1986 | Davis | |
| 4,577,462 A | 3/1986 | Robertson | |
| 4,602,614 A | 7/1986 | Percival et al. | |
| 4,606,721 A | 8/1986 | Livingston | |
| 4,613,299 A | 9/1986 | Backheim | |
| 4,637,792 A | 1/1987 | Davis | |
| 4,651,712 A | 3/1987 | Davis | |
| 4,653,278 A | 3/1987 | Vinson et al. | |
| 4,681,678 A | 7/1987 | Leaseburge et al. | |
| 4,684,465 A | 8/1987 | Leaseburge et al. | |
| 4,753,666 A | 6/1988 | Pastor et al. | |
| 4,762,543 A | 8/1988 | Pantermuehl et al. | |
| 4,817,387 A | 4/1989 | Lashbrook | |
| 4,858,428 A | 8/1989 | Paul | |
| 4,895,710 A | 1/1990 | Hartmann et al. | |
| 4,898,001 A | 2/1990 | Kuroda et al. | |
| 4,946,597 A | 8/1990 | Sury | |
| 4,976,100 A | 12/1990 | Lee | |
| 5,014,785 A | 5/1991 | Puri et al. | |
| 5,044,932 A | 9/1991 | Martin et al. | |
| 5,073,105 A | 12/1991 | Martin et al. | |
| 5,084,438 A | 1/1992 | Matsubara et al. | |
| 5,085,274 A | 2/1992 | Puri et al. | |
| 5,098,282 A | 3/1992 | Schwartz et al. | |
| 5,123,248 A | 6/1992 | Monty et al. | |
| 5,135,387 A | 8/1992 | Martin et al. | |
| 5,141,049 A | 8/1992 | Larsen et al. | |
| 5,142,866 A | 9/1992 | Yanagihara et al. | |
| 5,147,111 A | 9/1992 | Montgomery | |
| 5,154,596 A | 10/1992 | Schwartz et al. | |
| 5,183,232 A | 2/1993 | Gale | |
| 5,195,884 A | 3/1993 | Schwartz et al. | |
| 5,197,289 A | 3/1993 | Glevicky et al. | |
| 5,238,395 A | 8/1993 | Schwartz et al. | |
| 5,255,506 A | 10/1993 | Wilkes et al. | |
| 5,265,410 A | 11/1993 | Hisatome | |
| 5,271,905 A | 12/1993 | Owen et al. | |
| 5,275,552 A | 1/1994 | Schwartz et al. | |
| 5,295,350 A | 3/1994 | Child et al. | |
| 5,304,362 A | 4/1994 | Madsen | |
| 5,325,660 A | 7/1994 | Taniguchi et al. | |
| 5,332,036 A | 7/1994 | Shirley et al. | |
| 5,344,307 A | 9/1994 | Schwartz et al. | |
| 5,345,756 A | 9/1994 | Jahnke et al. | |
| 5,355,668 A | 10/1994 | Weil et al. | |
| 5,359,847 A | 11/1994 | Pillsbury et al. | |
| 5,361,586 A | 11/1994 | McWhirter et al. | |
| 5,388,395 A | 2/1995 | Scharpf et al. | |
| 5,394,688 A | 3/1995 | Amos | |
| 5,402,847 A | 4/1995 | Wilson et al. | |
| 5,444,971 A | 8/1995 | Holenberger | |
| 5,457,951 A | 10/1995 | Johnson et al. | |
| 5,458,481 A | 10/1995 | Surbey et al. | |
| 5,468,270 A | 11/1995 | Borszynski | |
| 5,490,378 A | 2/1996 | Berger et al. | |
| 5,542,840 A | 8/1996 | Surbey et al. | |
| 5,566,756 A | 10/1996 | Chaback et al. | |
| 5,572,862 A | 11/1996 | Mowill | |
| 5,581,998 A | 12/1996 | Craig | |
| 5,584,182 A | 12/1996 | Althaus et al. | |
| 5,590,518 A | 1/1997 | Janes | |
| 5,628,182 A | 5/1997 | Mowill | |
| 5,634,329 A | 6/1997 | Andersson et al. | |
| 5,638,675 A | 6/1997 | Zysman et al. | |
| 5,640,840 A | 6/1997 | Briesch | |
| 5,657,631 A | 8/1997 | Androsov | |
| 5,680,764 A | 10/1997 | Viteri | |
| 5,685,158 A | 11/1997 | Lenahan et al. | |
| 5,709,077 A | 1/1998 | Beichel | |
| 5,713,206 A | 2/1998 | McWhirter et al. | |
| 5,715,673 A | 2/1998 | Beichel | |
| 5,724,805 A | 3/1998 | Golomb et al. | |
| 5,725,054 A | 3/1998 | Shayegi et al. | |
| 5,740,786 A | 4/1998 | Gartner | |
| 5,743,079 A | 4/1998 | Walsh et al. | |
| 5,765,363 A | 6/1998 | Mowill | |
| 5,771,867 A | 6/1998 | Amstutz et al. | |
| 5,771,868 A | 6/1998 | Khair | |
| 5,819,540 A | 10/1998 | Massarani | |
| 5,832,712 A | 11/1998 | Ronning et al. | |
| 5,836,164 A | 11/1998 | Tsukahara et al. | |
| 5,839,283 A | 11/1998 | Dobbeling | |
| 5,850,732 A | 12/1998 | Willis et al. | |
| 5,894,720 A | 4/1999 | Willis et al. | |
| 5,901,547 A | 5/1999 | Smith et al. | |
| 5,924,275 A | 7/1999 | Cohen et al. | |
| 5,930,990 A | 8/1999 | Zachary et al. | |
| 5,937,634 A | 8/1999 | Etheridge et al. | |
| 5,950,417 A | 9/1999 | Robertson et al. | |
| 5,956,937 A | 9/1999 | Beichel | |
| 5,968,349 A | 10/1999 | Duyvesteyn et al. | |
| 5,974,780 A | 11/1999 | Santos | |
| 5,992,388 A | 11/1999 | Seger | |
| 6,016,658 A | 1/2000 | Willis et al. | |

(56) References Cited

U.S. PATENT DOCUMENTS

| | | |
|---|---|---|
| 6,032,465 A | 3/2000 | Regnier |
| 6,035,641 A | 3/2000 | Lokhandwala |
| 6,062,026 A | 5/2000 | Woollenweber et al. |
| 6,079,974 A | 6/2000 | Thompson |
| 6,082,093 A | 7/2000 | Greenwood et al. |
| 6,089,855 A | 7/2000 | Becker et al. |
| 6,094,916 A | 8/2000 | Puri et al. |
| 6,101,983 A | 8/2000 | Anand et al. |
| 6,148,602 A | 11/2000 | Demetri |
| 6,170,264 B1 | 1/2001 | Viteri et al. |
| 6,183,241 B1 | 2/2001 | Bohn et al. |
| 6,201,029 B1 | 3/2001 | Waycuilis |
| 6,202,400 B1 | 3/2001 | Utamura et al. |
| 6,202,442 B1 | 3/2001 | Brugerolle |
| 6,202,574 B1 | 3/2001 | Liljedahl et al. |
| 6,209,325 B1 | 4/2001 | Alkabie |
| 6,216,459 B1 | 4/2001 | Daudel et al. |
| 6,216,549 B1 | 4/2001 | Davis et al. |
| 6,230,103 B1 | 5/2001 | DeCorso et al. |
| 6,237,339 B1 | 5/2001 | Åsen et al. |
| 6,247,315 B1 | 6/2001 | Marin et al. |
| 6,247,316 B1 | 6/2001 | Viteri |
| 6,248,794 B1 | 6/2001 | Gieskes |
| 6,253,555 B1 | 7/2001 | Willis |
| 6,256,976 B1 | 7/2001 | Kataoka et al. |
| 6,256,994 B1 | 7/2001 | Dillon, IV |
| 6,263,659 B1 | 7/2001 | Dillon, IV et al. |
| 6,266,954 B1 | 7/2001 | McCallum et al. |
| 6,269,882 B1 | 8/2001 | Wellington et al. |
| 6,276,171 B1 | 8/2001 | Brugerolle |
| 6,282,901 B1 | 9/2001 | Marin et al. |
| 6,283,087 B1 | 9/2001 | Isaksen |
| 6,289,677 B1 | 9/2001 | Prociw et al. |
| 6,298,652 B1 | 10/2001 | Mittricker et al. |
| 6,298,654 B1 | 10/2001 | Vermes et al. |
| 6,298,664 B1 | 10/2001 | Åsen et al. |
| 6,301,888 B1 | 10/2001 | Gray |
| 6,301,889 B1 | 10/2001 | Gladden et al. |
| 6,305,929 B1 | 10/2001 | Chung et al. |
| 6,314,721 B1 | 11/2001 | Mathews et al. |
| 6,324,867 B1 | 12/2001 | Fanning et al. |
| 6,332,313 B1 | 12/2001 | Willis et al. |
| 6,345,493 B1 | 2/2002 | Smith et al. |
| 6,360,528 B1 | 3/2002 | Brausch et al. |
| 6,363,709 B2 | 4/2002 | Kataoka et al. |
| 6,367,258 B1 | 4/2002 | Wen et al. |
| 6,370,870 B1 | 4/2002 | Kamijo et al. |
| 6,374,591 B1 | 4/2002 | Johnson et al. |
| 6,374,594 B1 | 4/2002 | Kraft et al. |
| 6,383,461 B1 | 5/2002 | Lang |
| 6,389,814 B2 | 5/2002 | Viteri et al. |
| 6,405,536 B1 | 6/2002 | Ho et al. |
| 6,412,278 B1 | 7/2002 | Matthews |
| 6,412,302 B1 | 7/2002 | Foglietta |
| 6,412,559 B1 | 7/2002 | Gunter et al. |
| 6,418,725 B1 | 7/2002 | Maeda et al. |
| 6,429,020 B1 | 8/2002 | Thornton et al. |
| 6,449,954 B2 | 9/2002 | Bachmann |
| 6,450,256 B2 | 9/2002 | Mones |
| 6,461,147 B1 | 10/2002 | Sonju et al. |
| 6,467,270 B2 | 10/2002 | Mulloy et al. |
| 6,470,682 B2 | 10/2002 | Gray |
| 6,477,859 B2 | 11/2002 | Wong et al. |
| 6,484,503 B1 | 11/2002 | Raz |
| 6,484,507 B1 | 11/2002 | Pradt |
| 6,487,863 B1 | 12/2002 | Chen et al. |
| 6,499,990 B1 | 12/2002 | Zink et al. |
| 6,502,383 B1 | 1/2003 | Janardan et al. |
| 6,505,567 B1 | 1/2003 | Anderson et al. |
| 6,505,683 B2 | 1/2003 | Minkkinen et al. |
| 6,508,209 B1 | 1/2003 | Collier |
| 6,523,349 B2 | 2/2003 | Viteri |
| 6,532,745 B1 | 3/2003 | Neary |
| 6,539,716 B2 | 4/2003 | Finger et al. |
| 6,584,775 B1 | 7/2003 | Schneider et al. |
| 6,598,398 B2 | 7/2003 | Viteri et al. |
| 6,598,399 B2 | 7/2003 | Liebig |
| 6,598,402 B2 | 7/2003 | Kataoka et al. |
| 6,606,861 B2 | 8/2003 | Snyder |
| 6,612,291 B2 | 9/2003 | Sakamoto |
| 6,615,576 B2 | 9/2003 | Sheoran et al. |
| 6,615,589 B2 | 9/2003 | Allam et al. |
| 6,622,470 B2 | 9/2003 | Viteri et al. |
| 6,622,645 B2 | 9/2003 | Havlena |
| 6,637,183 B2 | 10/2003 | Viteri et al. |
| 6,644,041 B1 | 11/2003 | Eyermann |
| 6,655,150 B1 | 12/2003 | Åsen et al. |
| 6,668,541 B2 | 12/2003 | Rice et al. |
| 6,672,863 B2 | 1/2004 | Doebbeling et al. |
| 6,675,579 B1 | 1/2004 | Yang |
| 6,684,643 B2 | 2/2004 | Frutschi |
| 6,694,735 B2 | 2/2004 | Sumser et al. |
| 6,698,412 B2 | 3/2004 | Betta |
| 6,702,570 B2 | 3/2004 | Shah et al. |
| 6,722,436 B2 | 4/2004 | Krill |
| 6,725,665 B2 | 4/2004 | Tuschy et al. |
| 6,731,501 B1 | 5/2004 | Cheng |
| 6,732,531 B2 | 5/2004 | Dickey |
| 6,742,506 B1 | 6/2004 | Grandin |
| 6,743,829 B2 | 6/2004 | Fischer-Calderon et al. |
| 6,745,573 B2 | 6/2004 | Marin et al. |
| 6,745,624 B2 | 6/2004 | Porter et al. |
| 6,748,004 B2 | 6/2004 | Jepson |
| 6,752,620 B2 | 6/2004 | Heier et al. |
| 6,767,527 B1 | 7/2004 | Åsen et al. |
| 6,772,583 B2 | 8/2004 | Bland |
| 6,790,030 B2 | 9/2004 | Fischer et al. |
| 6,805,483 B2 | 10/2004 | Tomlinson et al. |
| 6,810,673 B2 | 11/2004 | Snyder |
| 6,813,889 B2 | 11/2004 | Inoue et al. |
| 6,817,187 B2 | 11/2004 | Yu |
| 6,820,428 B2 | 11/2004 | Wylie |
| 6,821,501 B2 | 11/2004 | Matzakos et al. |
| 6,823,852 B2 | 11/2004 | Collier |
| 6,824,710 B2 | 11/2004 | Viteri et al. |
| 6,826,912 B2 | 12/2004 | Levy et al. |
| 6,826,913 B2 | 12/2004 | Wright |
| 6,838,071 B1 | 1/2005 | Olsvik et al. |
| 6,851,413 B1 | 2/2005 | Tamol |
| 6,868,677 B2 | 3/2005 | Viteri et al. |
| 6,886,334 B2 | 5/2005 | Shirakawa |
| 6,887,069 B1 | 5/2005 | Thornton et al. |
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. |
| 6,910,335 B2 | 6/2005 | Viteri et al. |
| 6,923,915 B2 | 8/2005 | Alford et al. |
| 6,939,130 B2 | 9/2005 | Abbasi et al. |
| 6,945,029 B2 | 9/2005 | Viteri |
| 6,945,052 B2 | 9/2005 | Frutschi et al. |
| 6,945,087 B2 | 9/2005 | Porter et al. |
| 6,945,089 B2 | 9/2005 | Barie et al. |
| 6,946,419 B2 | 9/2005 | Kaefer |
| 6,969,123 B2 | 11/2005 | Vinegar et al. |
| 6,971,242 B2 | 12/2005 | Boardman |
| 6,981,358 B2 | 1/2006 | Bellucci et al. |
| 6,988,549 B1 | 1/2006 | Babcock |
| 6,993,901 B2 | 2/2006 | Shirakawa |
| 6,993,916 B2 | 2/2006 | Johnson et al. |
| 6,994,491 B2 | 2/2006 | Kittle |
| 7,007,487 B2 | 3/2006 | Belokon et al. |
| 7,010,921 B2 | 3/2006 | Intile et al. |
| 7,011,154 B2 | 3/2006 | Maher et al. |
| 7,015,271 B2 | 3/2006 | Bice et al. |
| 7,032,388 B2 | 4/2006 | Healy |
| 7,040,400 B2 | 5/2006 | de Rouffignac et al. |
| 7,043,898 B2 | 5/2006 | Rago |
| 7,043,920 B2 | 5/2006 | Viteri et al. |
| 7,045,553 B2 | 5/2006 | Hershkowitz |
| 7,053,128 B2 | 5/2006 | Hershkowitz |
| 7,056,482 B2 | 6/2006 | Hakka et al. |
| 7,059,152 B2 | 6/2006 | Oakey et al. |
| 7,065,953 B1 | 6/2006 | Kopko |

(56) References Cited

U.S. PATENT DOCUMENTS

| | | |
|---|---|---|
| 7,065,972 B2 | 6/2006 | Zupanc et al. |
| 7,074,033 B2 | 7/2006 | Neary |
| 7,077,199 B2 | 7/2006 | Vinegar et al. |
| 7,089,743 B2 | 8/2006 | Frutschi et al. |
| 7,096,942 B1 | 8/2006 | de Rouffignac et al. |
| 7,097,925 B2 | 8/2006 | Keefer |
| 7,104,319 B2 | 9/2006 | Vinegar et al. |
| 7,104,784 B1 | 9/2006 | Hasegawa et al. |
| 7,124,589 B2 | 10/2006 | Neary |
| 7,137,256 B1 | 11/2006 | Stuttaford et al. |
| 7,137,623 B2 | 11/2006 | Mockry et al. |
| 7,143,572 B2 | 12/2006 | Ooka et al. |
| 7,143,606 B2 | 12/2006 | Tranier |
| 7,146,969 B2 | 12/2006 | Weirich |
| 7,147,461 B2 | 12/2006 | Neary |
| 7,148,261 B2 | 12/2006 | Hershkowitz et al. |
| 7,152,409 B2 | 12/2006 | Yee et al. |
| 7,162,875 B2 | 1/2007 | Fletcher et al. |
| 7,168,265 B2 | 1/2007 | Briscoe et al. |
| 7,168,488 B2 | 1/2007 | Olsvik et al. |
| 7,183,328 B2 | 2/2007 | Hershkowitz et al. |
| 7,185,497 B2 | 3/2007 | Dudebout et al. |
| 7,194,869 B2 | 3/2007 | McQuiggan et al. |
| 7,197,880 B2 | 4/2007 | Thornton et al. |
| 7,217,303 B2 | 5/2007 | Hershkowitz et al. |
| 7,225,623 B2 | 6/2007 | Koshoffer |
| 7,237,385 B2 | 7/2007 | Carrea |
| 7,284,362 B2 | 10/2007 | Marin et al. |
| 7,299,619 B2 | 11/2007 | Briesch et al. |
| 7,299,868 B2 | 11/2007 | Zapadinski |
| 7,302,801 B2 | 12/2007 | Chen |
| 7,305,817 B2 | 12/2007 | Blodgett et al. |
| 7,305,831 B2 | 12/2007 | Carrea et al. |
| 7,313,916 B2 | 1/2008 | Pellizzari |
| 7,318,317 B2 | 1/2008 | Carrea |
| 7,343,742 B2 | 3/2008 | Wimmer et al. |
| 7,353,655 B2 | 4/2008 | Bolis et al. |
| 7,357,857 B2 | 4/2008 | Hart et al. |
| 7,363,756 B2 | 4/2008 | Carrea et al. |
| 7,363,764 B2 | 4/2008 | Griffin et al. |
| 7,381,393 B2 | 6/2008 | Lynn |
| 7,401,577 B2 | 7/2008 | Saucedo et al. |
| 7,410,525 B1 | 8/2008 | Liu et al. |
| 7,416,137 B2 | 8/2008 | Hagen et al. |
| 7,434,384 B2 | 10/2008 | Lord et al. |
| 7,438,744 B2 | 10/2008 | Beaumont |
| 7,467,942 B2 | 12/2008 | Carroni et al. |
| 7,468,173 B2 | 12/2008 | Hughes et al. |
| 7,472,550 B2 | 1/2009 | Lear et al. |
| 7,481,048 B2 | 1/2009 | Harmon et al. |
| 7,481,275 B2 | 1/2009 | Olsvik et al. |
| 7,482,500 B2 | 1/2009 | Johann et al. |
| 7,485,761 B2 | 2/2009 | Schindler et al. |
| 7,488,857 B2 | 2/2009 | Johann et al. |
| 7,490,472 B2 | 2/2009 | Lynghjem et al. |
| 7,491,250 B2 | 2/2009 | Hershkowitz et al. |
| 7,492,054 B2 | 2/2009 | Catlin |
| 7,493,769 B2 | 2/2009 | Jangili |
| 7,498,009 B2 | 3/2009 | Leach et al. |
| 7,503,178 B2 | 3/2009 | Bucker et al. |
| 7,503,948 B2 | 3/2009 | Hershkowitz et al. |
| 7,506,501 B2 | 3/2009 | Anderson et al. |
| 7,513,099 B2 | 4/2009 | Nuding et al. |
| 7,513,100 B2 | 4/2009 | Motter et al. |
| 7,516,626 B2 | 4/2009 | Brox et al. |
| 7,520,134 B2 | 4/2009 | Durbin et al. |
| 7,523,603 B2 | 4/2009 | Hagen et al. |
| 7,536,252 B1 | 5/2009 | Hibshman et al. |
| 7,536,873 B2 | 5/2009 | Nohlen |
| 7,540,150 B2 | 6/2009 | Schmid et al. |
| 7,559,977 B2 | 7/2009 | Fleischer et al. |
| 7,562,519 B1 | 7/2009 | Harris et al. |
| 7,562,529 B2 | 7/2009 | Kuspert et al. |
| 7,566,394 B2 | 7/2009 | Koseoglu |
| 7,574,856 B2 | 8/2009 | Mak |
| 7,591,866 B2 | 9/2009 | Bose |
| 7,594,386 B2 | 9/2009 | Narayanan et al. |
| 7,610,752 B2 | 11/2009 | Betta et al. |
| 7,610,759 B2 | 11/2009 | Yoshida et al. |
| 7,611,681 B2 | 11/2009 | Kaefer |
| 7,614,352 B2 | 11/2009 | Anthony et al. |
| 7,618,606 B2 | 11/2009 | Fan et al. |
| 7,631,493 B2 | 12/2009 | Shirakawa et al. |
| 7,634,915 B2 | 12/2009 | Hoffmann et al. |
| 7,635,408 B2 | 12/2009 | Mak et al. |
| 7,637,093 B2 | 12/2009 | Rao |
| 7,644,573 B2 | 1/2010 | Smith et al. |
| 7,650,744 B2 | 1/2010 | Varatharajan et al. |
| 7,654,320 B2 | 2/2010 | Payton |
| 7,654,330 B2 | 2/2010 | Zubrin et al. |
| 7,655,071 B2 | 2/2010 | De Vreede |
| 7,670,135 B1 | 3/2010 | Zink et al. |
| 7,673,454 B2 | 3/2010 | Saito et al. |
| 7,673,685 B2 | 3/2010 | Shaw et al. |
| 7,674,443 B1 | 3/2010 | Davis |
| 7,677,309 B2 | 3/2010 | Shaw et al. |
| 7,681,394 B2 | 3/2010 | Haugen |
| 7,682,597 B2 | 3/2010 | Blumenfeld et al. |
| 7,690,204 B2 | 4/2010 | Drnevich et al. |
| 7,691,788 B2 | 4/2010 | Tan et al. |
| 7,695,703 B2 | 4/2010 | Sobolevskiy et al. |
| 7,717,173 B2 | 5/2010 | Grott |
| 7,721,543 B2 | 5/2010 | Massey et al. |
| 7,726,114 B2 | 6/2010 | Evulet |
| 7,734,408 B2 | 6/2010 | Shiraki |
| 7,739,864 B2 | 6/2010 | Finkenrath et al. |
| 7,749,311 B2 | 7/2010 | Saito et al. |
| 7,752,848 B2 | 7/2010 | Balan et al. |
| 7,752,850 B2 | 7/2010 | Laster et al. |
| 7,753,039 B2 | 7/2010 | Harima et al. |
| 7,753,972 B2 | 7/2010 | Zubrin et al. |
| 7,762,084 B2 | 7/2010 | Martis et al. |
| 7,763,163 B2 | 7/2010 | Koseoglu |
| 7,763,227 B2 | 7/2010 | Wang |
| 7,765,810 B2 | 8/2010 | Pfefferle |
| 7,788,897 B2 | 9/2010 | Campbell et al. |
| 7,789,159 B1 | 9/2010 | Bader |
| 7,789,658 B2 | 9/2010 | Towler et al. |
| 7,789,944 B2 | 9/2010 | Saito et al. |
| 7,793,494 B2 | 9/2010 | Wirth et al. |
| 7,802,434 B2 | 9/2010 | Varatharajan et al. |
| 7,815,873 B2 | 10/2010 | Sankaranarayanan et al. |
| 7,815,892 B2 | 10/2010 | Hershkowitz et al. |
| 7,819,951 B2 | 10/2010 | White et al. |
| 7,824,179 B2 | 11/2010 | Hasegawa et al. |
| 7,827,778 B2 | 11/2010 | Finkenrath et al. |
| 7,827,794 B1 | 11/2010 | Pronske et al. |
| 7,841,186 B2 | 11/2010 | So et al. |
| 7,845,406 B2 | 12/2010 | Nitschke |
| 7,846,401 B2 | 12/2010 | Hershkowitz et al. |
| 7,861,511 B2 | 1/2011 | Chillar et al. |
| 7,874,140 B2 | 1/2011 | Fan et al. |
| 7,874,350 B2 | 1/2011 | Pfefferle |
| 7,875,402 B2 | 1/2011 | Hershkowitz et al. |
| 7,882,692 B2 | 2/2011 | Pronske et al. |
| 7,886,522 B2 | 2/2011 | Kammel |
| 7,895,822 B2 | 3/2011 | Hoffmann et al. |
| 7,896,105 B2 | 3/2011 | Dupriest |
| 7,906,304 B2 | 3/2011 | Kohr |
| 7,909,898 B2 | 3/2011 | White et al. |
| 7,914,749 B2 | 3/2011 | Carstens et al. |
| 7,914,764 B2 | 3/2011 | Hershkowitz et al. |
| 7,918,906 B2 | 4/2011 | Zubrin et al. |
| 7,921,633 B2 | 4/2011 | Rising |
| 7,922,871 B2 | 4/2011 | Price et al. |
| 7,926,292 B2 | 4/2011 | Rabovitser et al. |
| 7,931,712 B2 | 4/2011 | Zubrin et al. |
| 7,931,731 B2 | 4/2011 | Van Heeringen et al. |
| 7,931,888 B2 | 4/2011 | Drnevich et al. |
| 7,934,926 B2 | 5/2011 | Kornbluth et al. |
| 7,942,003 B2 | 5/2011 | Baudoin et al. |
| 7,942,008 B2 | 5/2011 | Joshi et al. |
| 7,943,097 B2 | 5/2011 | Golden et al. |
| 7,955,403 B2 | 6/2011 | Ariyapadi et al. |

(56) References Cited

U.S. PATENT DOCUMENTS

| | | |
|---|---|---|
| 7,966,822 B2 | 6/2011 | Myers et al. |
| 7,976,803 B2 | 7/2011 | Hooper et al. |
| 7,980,312 B1 | 7/2011 | Hill et al. |
| 7,985,399 B2 | 7/2011 | Drnevich et al. |
| 7,988,750 B2 | 8/2011 | Lee et al. |
| 8,001,789 B2 | 8/2011 | Vega et al. |
| 8,029,273 B2 | 10/2011 | Paschereit et al. |
| 8,036,813 B2 | 10/2011 | Tonetti et al. |
| 8,038,416 B2 | 10/2011 | Ono et al. |
| 8,038,746 B2 | 10/2011 | Clark |
| 8,038,773 B2 | 10/2011 | Ochs et al. |
| 8,046,986 B2 | 11/2011 | Chillar et al. |
| 8,047,007 B2 | 11/2011 | Zubrin et al. |
| 8,051,638 B2 | 11/2011 | Aljabari et al. |
| 8,061,120 B2 | 11/2011 | Hwang |
| 8,062,617 B2 | 11/2011 | Stakhev et al. |
| 8,065,870 B2 | 11/2011 | Jobson et al. |
| 8,065,874 B2 | 11/2011 | Fong et al. |
| 8,074,439 B2 | 12/2011 | Foret |
| 8,080,225 B2 | 12/2011 | Dickinson et al. |
| 8,083,474 B2 | 12/2011 | Hashimoto et al. |
| 8,097,230 B2 | 1/2012 | Mesters et al. |
| 8,101,146 B2 | 1/2012 | Fedeyko et al. |
| 8,105,559 B2 | 1/2012 | Melville et al. |
| 8,110,012 B2 | 2/2012 | Chiu et al. |
| 8,117,825 B2 | 2/2012 | Griffin et al. |
| 8,117,846 B2 | 2/2012 | Wilbraham |
| 8,127,558 B2 | 3/2012 | Bland et al. |
| 8,127,936 B2 | 3/2012 | Liu et al. |
| 8,127,937 B2 | 3/2012 | Liu et al. |
| 8,133,298 B2 | 3/2012 | Lanyi et al. |
| 8,166,766 B2 | 5/2012 | Draper |
| 8,167,960 B2 | 5/2012 | Gil |
| 8,176,982 B2 | 5/2012 | Gil et al. |
| 8,191,360 B2 | 6/2012 | Fong et al. |
| 8,191,361 B2 | 6/2012 | Fong et al. |
| 8,192,688 B2 * | 6/2012 | Hagen ............... F01K 21/047 422/129 |
| 8,196,387 B2 | 6/2012 | Shah et al. |
| 8,196,413 B2 | 6/2012 | Mak |
| 8,201,402 B2 | 6/2012 | Fong et al. |
| 8,205,455 B2 | 6/2012 | Popovic |
| 8,206,669 B2 | 6/2012 | Schaffer et al. |
| 8,209,192 B2 | 6/2012 | Gil et al. |
| 8,215,105 B2 | 7/2012 | Fong et al. |
| 8,220,247 B2 | 7/2012 | Wijmans et al. |
| 8,220,248 B2 | 7/2012 | Wijmans et al. |
| 8,220,268 B2 | 7/2012 | Callas |
| 8,225,600 B2 | 7/2012 | Theis |
| 8,226,912 B2 | 7/2012 | Kloosterman et al. |
| 8,240,142 B2 | 8/2012 | Fong et al. |
| 8,240,153 B2 | 8/2012 | Childers et al. |
| 8,245,492 B2 | 8/2012 | Draper |
| 8,245,493 B2 | 8/2012 | Minto |
| 8,247,462 B2 | 8/2012 | Boshoff et al. |
| 8,257,476 B2 | 9/2012 | White et al. |
| 8,261,823 B1 | 9/2012 | Hill et al. |
| 8,262,343 B2 | 9/2012 | Hagen |
| 8,266,883 B2 | 9/2012 | Ouellet et al. |
| 8,266,913 B2 | 9/2012 | Snook et al. |
| 8,268,044 B2 | 9/2012 | Wright et al. |
| 8,281,596 B1 | 10/2012 | Rohrssen et al. |
| 8,316,665 B2 | 11/2012 | Mak |
| 8,316,784 B2 | 11/2012 | D'Agostini |
| 8,337,613 B2 | 12/2012 | Zauderer |
| 8,347,600 B2 | 1/2013 | Wichmann et al. |
| 8,348,551 B2 | 1/2013 | Baker et al. |
| 8,365,534 B2 * | 2/2013 | Popovic ............... F23R 3/10 60/740 |
| 8,371,100 B2 | 2/2013 | Draper |
| 8,372,251 B2 | 2/2013 | Goller et al. |
| 8,377,184 B2 | 2/2013 | Fujikawa et al. |
| 8,377,401 B2 | 2/2013 | Darde et al. |
| 8,388,919 B2 | 3/2013 | Hooper et al. |
| 8,397,482 B2 | 3/2013 | Kraemer et al. |
| 8,398,757 B2 | 3/2013 | Iijima et al. |
| 8,409,307 B2 | 4/2013 | Drnevich et al. |
| 8,414,694 B2 | 4/2013 | Iijima et al. |
| 8,424,282 B2 | 4/2013 | Vollmer et al. |
| 8,424,601 B2 | 4/2013 | Betzer-Zilevitch |
| 8,436,489 B2 | 5/2013 | Stahlkopf et al. |
| 8,453,461 B2 | 6/2013 | Draper |
| 8,453,462 B2 | 6/2013 | Wichmann et al. |
| 8,453,583 B2 | 6/2013 | Malavasi et al. |
| 8,454,350 B2 | 6/2013 | Berry et al. |
| 8,475,160 B2 | 7/2013 | Campbell et al. |
| 8,539,749 B1 | 9/2013 | Wichmann et al. |
| 8,567,200 B2 | 10/2013 | Brook et al. |
| 8,616,294 B2 | 12/2013 | Zubrin et al. |
| 8,627,643 B2 | 1/2014 | Chillar et al. |
| 9,322,336 B2 * | 4/2016 | Bathina ................ F02C 9/40 |
| 9,631,815 B2 * | 4/2017 | Antoniono ........... F23R 3/10 |
| 2001/0000049 A1 | 3/2001 | Kataoka et al. |
| 2001/0029732 A1 | 10/2001 | Bachmann |
| 2001/0045090 A1 | 11/2001 | Gray |
| 2002/0043063 A1 | 4/2002 | Kataoka et al. |
| 2002/0053207 A1 | 5/2002 | Finger et al. |
| 2002/0069648 A1 | 6/2002 | Levy et al. |
| 2002/0187449 A1 | 12/2002 | Doebbeling et al. |
| 2003/0005698 A1 | 1/2003 | Keller |
| 2003/0131582 A1 | 7/2003 | Anderson et al. |
| 2003/0134241 A1 | 7/2003 | Marin et al. |
| 2003/0221409 A1 | 12/2003 | McGowan |
| 2004/0006994 A1 | 1/2004 | Walsh et al. |
| 2004/0011050 A1 * | 1/2004 | Inoue ................ F02C 3/22 60/773 |
| 2004/0068981 A1 | 4/2004 | Siefker et al. |
| 2004/0166034 A1 | 8/2004 | Kaefer |
| 2004/0170559 A1 | 9/2004 | Hershkowitz et al. |
| 2004/0223408 A1 | 11/2004 | Mathys et al. |
| 2004/0238654 A1 | 12/2004 | Hagen et al. |
| 2005/0028529 A1 | 2/2005 | Bartlett et al. |
| 2005/0144961 A1 | 7/2005 | Colibaba-Evulet et al. |
| 2005/0197267 A1 | 9/2005 | Zaki et al. |
| 2005/0229585 A1 | 10/2005 | Webster |
| 2005/0236602 A1 | 10/2005 | Viteri et al. |
| 2006/0112675 A1 | 6/2006 | Anderson et al. |
| 2006/0158961 A1 | 7/2006 | Ruscheweyh et al. |
| 2006/0183009 A1 | 8/2006 | Berlowitz et al. |
| 2006/0196812 A1 | 9/2006 | Beetge et al. |
| 2006/0248888 A1 | 11/2006 | Geskes |
| 2007/0000242 A1 | 1/2007 | Harmon et al. |
| 2007/0044475 A1 | 3/2007 | Leser et al. |
| 2007/0044479 A1 | 3/2007 | Brandt et al. |
| 2007/0089425 A1 | 4/2007 | Motter et al. |
| 2007/0107430 A1 | 5/2007 | Schmid et al. |
| 2007/0144747 A1 | 6/2007 | Steinberg |
| 2007/0231233 A1 | 10/2007 | Bose |
| 2007/0234702 A1 | 10/2007 | Hagen et al. |
| 2007/0245736 A1 | 10/2007 | Barnicki |
| 2007/0249738 A1 | 10/2007 | Haynes et al. |
| 2007/0272201 A1 | 11/2007 | Amano et al. |
| 2008/0000214 A1 * | 1/2008 | Kothnur ............... F02C 7/222 60/39.281 |
| 2008/0000229 A1 | 1/2008 | Kuspert et al. |
| 2008/0006561 A1 | 1/2008 | Moran et al. |
| 2008/0010967 A1 | 1/2008 | Griffin et al. |
| 2008/0034727 A1 | 2/2008 | Sutikno |
| 2008/0038598 A1 | 2/2008 | Berlowitz et al. |
| 2008/0047280 A1 | 2/2008 | Dubar |
| 2008/0066443 A1 | 3/2008 | Frutschi et al. |
| 2008/0115478 A1 | 5/2008 | Sullivan |
| 2008/0118310 A1 | 5/2008 | Graham |
| 2008/0127632 A1 | 6/2008 | Finkenrath et al. |
| 2008/0155984 A1 | 7/2008 | Liu et al. |
| 2008/0178611 A1 | 7/2008 | Ding |
| 2008/0202123 A1 | 8/2008 | Sullivan et al. |
| 2008/0223038 A1 | 9/2008 | Lutz et al. |
| 2008/0250795 A1 | 10/2008 | Katdare et al. |
| 2008/0251234 A1 | 10/2008 | Wilson et al. |
| 2008/0290719 A1 | 11/2008 | Kaminsky et al. |
| 2008/0309087 A1 | 12/2008 | Evulet et al. |
| 2009/0000762 A1 | 1/2009 | Wilson et al. |
| 2009/0025390 A1 | 1/2009 | Christensen et al. |

(56) References Cited

U.S. PATENT DOCUMENTS

| | | |
|---|---|---|
| 2009/0038247 A1 | 2/2009 | Taylor et al. |
| 2009/0056342 A1 | 3/2009 | Kirzhner |
| 2009/0064653 A1 | 3/2009 | Hagen et al. |
| 2009/0071166 A1 | 3/2009 | Hagen et al. |
| 2009/0107141 A1 | 4/2009 | Chillar et al. |
| 2009/0117024 A1 | 5/2009 | Weedon et al. |
| 2009/0120087 A1 | 5/2009 | Sumser et al. |
| 2009/0157230 A1 | 6/2009 | Hibshman et al. |
| 2009/0193809 A1 | 8/2009 | Schroder et al. |
| 2009/0205334 A1 | 8/2009 | Aljabari et al. |
| 2009/0218821 A1 | 9/2009 | ElKady et al. |
| 2009/0223227 A1 | 9/2009 | Lipinski et al. |
| 2009/0229263 A1 | 9/2009 | Ouellet et al. |
| 2009/0235637 A1 | 9/2009 | Foret |
| 2009/0241506 A1 | 10/2009 | Nilsson |
| 2009/0255242 A1 | 10/2009 | Paterson et al. |
| 2009/0262599 A1 | 10/2009 | Kohrs et al. |
| 2009/0284013 A1 | 11/2009 | Anand et al. |
| 2009/0301054 A1 | 12/2009 | Simpson et al. |
| 2009/0301099 A1 | 12/2009 | Nigro |
| 2010/0003123 A1 | 1/2010 | Smith |
| 2010/0018218 A1 | 1/2010 | Riley et al. |
| 2010/0058732 A1 | 3/2010 | Kaufmann et al. |
| 2010/0115960 A1 | 5/2010 | Brautsch et al. |
| 2010/0126176 A1 | 5/2010 | Kim |
| 2010/0126906 A1 | 5/2010 | Sury |
| 2010/0162703 A1 | 7/2010 | Li et al. |
| 2010/0170253 A1 | 7/2010 | Berry et al. |
| 2010/0173253 A1 | 7/2010 | Mohr et al. |
| 2010/0180565 A1 | 7/2010 | Draper |
| 2010/0300102 A1 | 12/2010 | Bathina et al. |
| 2010/0310439 A1 | 12/2010 | Brok et al. |
| 2010/0322759 A1 | 12/2010 | Tanioka |
| 2010/0326084 A1 | 12/2010 | Anderson et al. |
| 2011/0000221 A1 | 1/2011 | Minta et al. |
| 2011/0000671 A1 | 1/2011 | Hershkowitz et al. |
| 2011/0036082 A1 | 2/2011 | Collinot |
| 2011/0048002 A1 | 3/2011 | Taylor et al. |
| 2011/0048010 A1 | 3/2011 | Balcezak et al. |
| 2011/0072779 A1 | 3/2011 | ELKady et al. |
| 2011/0088379 A1 | 4/2011 | Nanda |
| 2011/0110759 A1 | 5/2011 | Sanchez et al. |
| 2011/0126512 A1 | 6/2011 | Anderson |
| 2011/0138766 A1 | 6/2011 | ELKady et al. |
| 2011/0162353 A1 | 7/2011 | Vanvolsem et al. |
| 2011/0205837 A1 | 8/2011 | Gentgen |
| 2011/0226010 A1 | 9/2011 | Baxter |
| 2011/0227346 A1 | 9/2011 | Klenven |
| 2011/0232545 A1 | 9/2011 | Clements |
| 2011/0239653 A1 | 10/2011 | Valeev et al. |
| 2011/0265447 A1 | 11/2011 | Cunningham |
| 2011/0300493 A1 | 12/2011 | Mittricker et al. |
| 2012/0023954 A1 | 2/2012 | Wichmann |
| 2012/0023955 A1 | 2/2012 | Draper |
| 2012/0023956 A1 | 2/2012 | Popovic |
| 2012/0023957 A1 | 2/2012 | Draper et al. |
| 2012/0023958 A1 | 2/2012 | Snook et al. |
| 2012/0023960 A1 | 2/2012 | Minto |
| 2012/0023962 A1 | 2/2012 | Wichmann et al. |
| 2012/0023963 A1 | 2/2012 | Wichmann et al. |
| 2012/0023966 A1 | 2/2012 | Ouellet et al. |
| 2012/0031581 A1 | 2/2012 | Chillar et al. |
| 2012/0032810 A1 | 2/2012 | Chillar et al. |
| 2012/0085100 A1 | 4/2012 | Hughes et al. |
| 2012/0096870 A1 | 4/2012 | Wichmann et al. |
| 2012/0119512 A1 | 5/2012 | Draper |
| 2012/0131925 A1 | 5/2012 | Mittricker et al. |
| 2012/0144837 A1 | 6/2012 | Rasmussen et al. |
| 2012/0185144 A1 | 7/2012 | Draper |
| 2012/0192565 A1 | 8/2012 | Tretyakov et al. |
| 2012/0247105 A1 | 10/2012 | Nelson et al. |
| 2012/0260660 A1 | 10/2012 | Kraemer et al. |
| 2013/0086916 A1 | 4/2013 | Oelfke et al. |
| 2013/0086917 A1 | 4/2013 | Slobodyanskiy et al. |
| 2013/0091853 A1 | 4/2013 | Denton et al. |
| 2013/0091854 A1 | 4/2013 | Gupta et al. |
| 2013/0104562 A1 | 5/2013 | Oelfke et al. |
| 2013/0104563 A1 | 5/2013 | Oelfke et al. |
| 2013/0125554 A1 | 5/2013 | Mittricker et al. |
| 2013/0125555 A1 | 5/2013 | Mittricker et al. |
| 2013/0232980 A1 | 9/2013 | Chen et al. |
| 2013/0269310 A1 | 10/2013 | Wichmann et al. |
| 2013/0269311 A1 | 10/2013 | Wichmann et al. |
| 2013/0269355 A1 | 10/2013 | Wichmann et al. |
| 2013/0269356 A1 | 10/2013 | Butkiewicz et al. |
| 2013/0269357 A1 | 10/2013 | Wichmann et al. |
| 2013/0269358 A1 | 10/2013 | Wichmann et al. |
| 2013/0269360 A1 | 10/2013 | Wichmann et al. |
| 2013/0269361 A1 | 10/2013 | Wichmann et al. |
| 2013/0269362 A1 | 10/2013 | Wichmann et al. |
| 2013/0283808 A1 | 10/2013 | Kolvick |
| 2014/0000271 A1 | 1/2014 | Mittricker et al. |
| 2014/0000273 A1 | 1/2014 | Mittricker et al. |
| 2014/0007590 A1 | 1/2014 | Huntington et al. |
| 2014/0013766 A1 | 1/2014 | Mittricker et al. |
| 2014/0020398 A1 | 1/2014 | Mittricker et al. |
| 2014/0060073 A1 | 3/2014 | Slobodyanskiy et al. |
| 2014/0123620 A1 | 5/2014 | Huntington et al. |
| 2014/0123624 A1 | 5/2014 | Minto |
| 2014/0123659 A1 | 5/2014 | Biyani et al. |
| 2014/0123660 A1 | 5/2014 | Stoia et al. |
| 2014/0123668 A1 | 5/2014 | Huntington et al. |
| 2014/0123669 A1 | 5/2014 | Huntington et al. |
| 2014/0123672 A1 | 5/2014 | Huntington et al. |
| 2014/0150445 A1 | 6/2014 | Huntington et al. |
| 2014/0182298 A1 | 7/2014 | Krull et al. |
| 2014/0182299 A1 | 7/2014 | Woodall et al. |
| 2014/0182301 A1 | 7/2014 | Fadde et al. |
| 2014/0182302 A1 | 7/2014 | Fadde et al. |
| 2014/0182303 A1 | 7/2014 | Fadde et al. |
| 2014/0182304 A1 | 7/2014 | Fadde et al. |
| 2014/0182305 A1 | 7/2014 | Fadde et al. |
| 2014/0196464 A1 | 7/2014 | Biyani et al. |
| 2014/0216011 A1 | 8/2014 | Muthaiah et al. |
| 2015/0000292 A1 | 1/2015 | Subramaniyan |
| 2015/0000293 A1 | 1/2015 | Thatcher et al. |
| 2015/0000294 A1 | 1/2015 | Minto et al. |
| 2015/0000299 A1 | 1/2015 | Zuo et al. |
| 2015/0033748 A1 | 2/2015 | Vaezi |
| 2015/0033749 A1 | 2/2015 | Slobodyanskiy et al. |
| 2015/0033751 A1 | 2/2015 | Andrew |
| 2015/0033757 A1 | 2/2015 | White et al. |
| 2015/0040574 A1 | 2/2015 | Wichmann et al. |
| 2015/0059350 A1 | 3/2015 | Kolvick et al. |
| 2015/0075171 A1 | 3/2015 | Sokolov et al. |
| 2015/0152791 A1 | 6/2015 | White |
| 2015/0198089 A1 | 7/2015 | Muthaiah et al. |
| 2015/0204239 A1 | 7/2015 | Minto et al. |
| 2015/0214879 A1 | 7/2015 | Huntington et al. |
| 2015/0226133 A1 | 8/2015 | Minto et al. |

FOREIGN PATENT DOCUMENTS

| | | |
|---|---|---|
| DE | 102005011287 A1 | 11/2005 |
| EP | 0770771 | 5/1997 |
| EP | 2090829 A1 | 8/2009 |
| GB | 0776269 | 6/1957 |
| GB | 2117053 | 10/1983 |
| WO | WO9906674 | 2/1999 |
| WO | WO9963210 | 12/1999 |
| WO | WO2007068682 | 6/2007 |
| WO | WO2008142009 | 11/2008 |
| WO | WO2011003606 | 1/2011 |
| WO | WO2012003489 | 1/2012 |
| WO | WO2012128928 | 9/2012 |
| WO | WO2012128929 | 9/2012 |
| WO | WO2012170114 | 12/2012 |
| WO | 2013155214 A1 | 10/2013 |
| WO | WO2013147632 | 10/2013 |
| WO | WO2013147633 | 10/2013 |
| WO | WO2013155214 | 10/2013 |
| WO | WO2013163045 | 10/2013 |

(56) References Cited

FOREIGN PATENT DOCUMENTS

| WO | WO2014071118 | 5/2014 |
|---|---|---|
| WO | WO2014071215 | 5/2014 |
| WO | WO2014133406 | 9/2014 |

OTHER PUBLICATIONS

U.S. Appl. No. 14/067,552, filed Sep. 9, 2014, Huntington et al.
U.S. Appl. No. 14/553,458, filed Nov. 25, 2014, Huntington et al.
U.S. Appl. No. 14/599,750, filed Jan. 19, 2015, O'Dea et al.
U.S. Appl. No. 14/712,273, filed May 14, 2015, Manchikanti et al.
U.S. Appl. No. 14/726,001, filed May 29, 2015, Della-Fera et al.
U.S. Appl. No. 14/741,189, filed Jun. 16, 2015, Minto et al.
U.S. Appl. No. 14/745,095, filed Jun. 19, 2015, Minto et al.
Ahmed, S. et al. (1998) "Catalytic Partial Oxidation Reforming of Hydrocarbon Fuels," 1998 Fuel Cell Seminar, 7 pgs.
Air Products and Chemicals, Inc. (2008) "Air Separation Technology—Ion Transport Membrane (ITM)," www.airproducts.com/ASUsales, 3 pgs.
Air Products and Chemicals, Inc. (2011) "Air Separation Technology Ion Transport Membrane (ITM)," www.airproducts.com/gasification, 4 pgs.
Anderson, R. E. (2006) "Durability and Reliability Demonstration of a Near-Zero-Emission Gas-Fired Power Plant," California Energy Comm., CEC 500-2006-074, 80 pgs.
Baxter, E. et al. (2003) "Fabricate and Test an Advanced Non-Polluting Turbine Drive Gas Generator," U. S. Dept. of Energy, Nat'l Energy Tech. Lab., DE-FC26-00NT 40804, 51 pgs.
Bolland, O. et al. (1998) "Removal of CO2 From Gas Turbine Power Plants Evaluation of Pre- and Postcombustion Methods," SINTEF Group, www.energy.sintef.no/publ/xergi/98/3/art-8engelsk.htm, 11 pgs.
BP Press Release (2006) "BP and Edison Mission Group Plan Major Hydrogen Power Project for California," www.bp.com/hydrogenpower, 2 pgs.
Bryngelsson, M. et al. (2005) "Feasibility Study of $CO_2$ Removal From Pressurized Flue Gas in a Fully Fired Combined Cycle—The Sargas Project," KTH—Royal Institute of Technology, Dept. of Chemical Engineering and Technology, 9 pgs.
Clark, Hal (2002) "Development of a Unique Gas Generator for a Non-Polluting Power Plant," California Energy Commission Feasibility Analysis, P500-02-011F, 42 pgs.
Foy, Kirsten et al. (2005) "Comparison of Ion Transport Membranes" Fourth Annual Conference on Carbon Capture and Sequestration, DOE/NETL; 11 pgs.
Cho, J. H. et al. (2005) "Marrying LNG and Power Generation," Energy Markets; 10, 8; ABI/INFORM Trade & Industry, 5 pgs.
Ciulia, Vincent. (2001-2003) "Auto Repair. How the Engine Works," http://autorepair.about.com/cs/generalinfo/a/aa060500a.htm, 1 page.
Corti, A. et al. (1988) "Athabasca Mineable Oil Sands: The RTR/Gulf Extraction Process Theoretical Model of Bitumen Detachment," $4^{th}$ UNITAR/UNDP Int'l Conf. on Heavy Crude and Tar Sands Proceedings, v.5, paper No. 81, Edmonton, AB, Canada, 4 pgs.
Science Clarified (2012) "Cryogenics," http://www.scienceclarified.com/Co-Di/Cryogenics.html; 6 pgs.
Defrate, L. A. et al. (1959) "Optimum Design of Ejector Using Digital Computers" Chem. Eng. Prog. Symp. Ser., 55 ( 21), 12 pgs.
Ditaranto, M. et al. (2006) "Combustion Instabilities in Sudden Expansion Oxy-Fuel Flames," ScienceDirect, Combustion and Flame, v.146, 20 pgs.
Elwell, L. C. et al. (2005) "Technical Overview of Carbon Dioxide Capture Technologies for Coal-Fired Power Plants," MPR Associates, Inc., www.mpr.com/uploads/news/co2-capture-coal-fired.pdf, 15 pgs.

Eriksson, Sara. (2005) "Development of Methane Oxidation Catalysts for Different Gas Turbine Combustor Concepts." KTH—The Royal Institute of Technology, Department of Chemical Engineering and Technology, Chemical Technology, Licentiate Thesis, Stockholm Sweden; 45 pgs.
Ertesvag, I. S. et al. (2005) "Exergy Analysis of a Gas-Turbine Combined-Cycle Power Plant With Precombustion $CO_2$ Capture," Elsevier, 35 pgs.
Elkady, Ahmed. M. et al. (2009) "Application of Exhaust Gas Recirculation in a DLN F-Class Combustion System for Postcombustion Carbon Capture," ASME J. Engineering for Gas Turbines and Power, vol. 131, 6 pgs.
Evulet, Andrei T. et al. (2009) "On the Performance and Operability of Ge's Dry Low $NO_x$ Combustors utilizing Exhaust Gas Recirculation for Post-Combustion Carbon Capture" Energy Procedia I, 8 pgs.
Caldwell Energy Company (2011) "Wet Compression"; IGTI 2011—CTIC Wet Compression, http://www.turbineinletcooling.org/resources/papers/CTIC_WetCompression_Shepherd_ASMETurboExpo2011.pdf , 22 pgs.
Luby, P. et al. (2003) "Zero Carbon Power Generation: IGCC as the Premium Option," Powergen International, 19 pgs.
Macadam, S. et al. (2007) "Coal-Based Oxy-Fuel System Evaluation and Combustor Development," Clean Energy Systems, Inc.; presented at the $2^{nd}$ International Freiberg Conference on IGCC & XtL Technologies, 6 pgs.
Morehead, H. (2007) "Siemens Global Gasification and IGCC Update," Siemens, Coal-Gen, 17 pgs.
Nanda, R. et al. (2007) "Utilizing Air Based Technologies as Heat Source for LNG Vaporization," presented at the $86^{th}$ Annual convention of the Gas Processors of America (GPA 2007), , San Antonio, TX; 13 pgs.
Reeves, S. R. (2001) "Geological Sequestration of $CO_2$ in Deep, Unmineable Coalbeds: An Integrated Research and Commercial-Scale Field Demonstration Project," SPE 71749; presented at the 2001 SPE Annual Technical Conference and Exhibition, New Orleans, Louisiana, 10 pgs.
Reeves, S. R. (2003) "Enhanced Coalbed Methane Recovery," Society of Petroleum Engineers 101466-DL; SPE Distinguished Lecture Series, 8 pgs.
Richards, Geo A., et al. (2001) "Advanced Steam Generators," National Energy Technology Lab., Pittsburgh, PA, and Morgantown. WV; NASA Glenn Research Center (US), 7 pgs.
Rosetta, M. J. et al. (2006) "Integrating Ambient Air Vaporization Technology with Waste Heat Recovery—A Fresh Approach to LNG Vaporization," presented at the $85^{th}$ annual convention of the Gas Processors of America (GPA 2006), Grapevine, Texas, 22 pgs.
Snarheim, D. et al. (2006) "Control Design for a Gas Turbine Cycle With $CO_2$ Capture Capabilities," Modeling, Identification and Control, vol. 00; presented at the $16^{th}$ IFAC World Congress, Prague, Czech Republic, 10 pgs.
Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," Department of Energy and Process Eng., Norwegian Univ. of Science and Technology, 9 pgs.
Van Hemert, P. et al. (2006) "Adsorption of Carbon Dioxide and a Hydrogen-Carbon Dioxide Mixture," Intn'l Coalbed Methane Symposium (Tuscaloosa, AL) Paper 0615, 9 pgs.
Zhu, J. et al. (2002) "Recovery of Coalbed Methane by Gas Injection," Society of Petroleum Engineers 75255; presented at the 2002 SPE Annual Technical Conference and Exhibition, Tulsa, Oklahoma, 15 pgs.
PCT International Search Report and Written Opinion; Application No. PCT/US2015/012105; dated Apr. 2, 2015; 11 pages.

* cited by examiner

SYSTEM AND METHOD OF CONTROL FOR A GAS TURBINE ENGINE

CROSS-REFERENCE TO RELATED APPLICATIONS

This application claims priority to and benefit of U.S. Provisional Patent Application No. 61/929,873, entitled "SYSTEM AND METHOD OF CONTROL FOR A GAS TURBINE," filed Jan. 21, 2014, which is hereby incorporated by reference in its entirety for all purposes.

BACKGROUND

The subject matter disclosed herein relates to gas turbine engines, and more specifically, to systems and methods for operating gas turbine engines.

Gas turbine engines are used in a wide variety of applications, such as power generation, aircraft, and various machinery. Gas turbine engines generally combust a fuel with an oxidant (e.g., air) in a combustor section to generate hot combustion products, which then drive one or more turbine stages of a turbine section. In turn, the turbine section drives one or more compressor stages of a compressor section. Again, the fuel and oxidant mix in the combustor section, and then combust to produce the hot combustion products. Under certain conditions, it may be desirable for the hot combustion products to have a low concentration of oxygen, carbon monoxide, nitrogen oxides, unburned hydrocarbons, or any combination thereof. Thus, it may be useful to use feedback control to operate the gas turbine engine to achieve a desired composition of the hot combustion products. Furthermore, gas turbine engines typically consume a vast amount of air as the oxidant, and output a considerable amount of exhaust gas into the atmosphere. In other words, the exhaust gas is typically wasted as a byproduct of the gas turbine operation. Unfortunately, utilizing flow meters to measure the vast amount of air as the oxidant may affect the air flow, as well as may increase system costs and system complexity.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system a first combustor with a plurality of first oxidant passages configured to supply a first oxidant flow to the first combustor, a plurality of first fuel passages configured to supply a first fuel flow to the first combustor, a plurality of first oxidant pressure sensors, a plurality of first fuel pressure sensors, and a controller coupled to the plurality of first oxidant pressure sensors and to the plurality of first fuel pressure sensors. Each first oxidant pressure sensor of the plurality of first oxidant pressure sensors is fluidly coupled to a respective first oxidant passage of the plurality of first oxidant passages and is configured to transmit a respective first oxidant pressure signal. Each first fuel pressures sensor of the plurality of first fuel pressure sensors is fluidly coupled to a respective first fuel passage of the plurality of first fuel passages and is configured to transmit a respective first fuel pressure signal. The controller is configured to determine a first oxidant flow rate through each first oxidant passage of the plurality of first oxidant passages based at least in part on the respective first oxidant pressure signal and a first reference oxidant pressure. The controller is configured to determine a first fuel flow rate through each first fuel passage of the plurality of first fuel passages based at least in part on the respective first fuel pressure signal and a first reference fuel pressure.

In a second embodiment, a system includes plurality of combustors and a distributed flow measurement system coupled to the plurality of combustors. Each combustor of the plurality of combustors includes one or more oxidant passages and one or more fuel passages. The distributed flow measurement system is configured to measure an oxidant flow rate for a respective oxidant passage of the one or more oxidant passages of the respective combustor based at least in part on an oxidant pressure drop along the respective oxidant passage, and the distributed flow measurement system is configured to measure a fuel flow rate for a respective fuel passage of the one or more fuel passages of the respective combustor based at least in part on a fuel pressure drop along the respective fuel passage.

In a third embodiment, a method includes conveying an oxidant flow through a plurality of oxidant passages, conveying a fuel flow through a plurality of fuel passages, measuring an oxidant pressure of the oxidant flow through each oxidant passage of the plurality of oxidant passages, measuring a fuel pressure of the fuel flow through each fuel passage of the plurality of fuel passages, determining an oxidant flow rate through each oxidant passage of the plurality of oxidant passages based at least in part on the respective oxidant pressure and a reference pressure, and determining a fuel flow rate of the fuel flow through each fuel passage of the plurality of fuel passages based at least in part on the respective fuel flow and a reference pressure.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
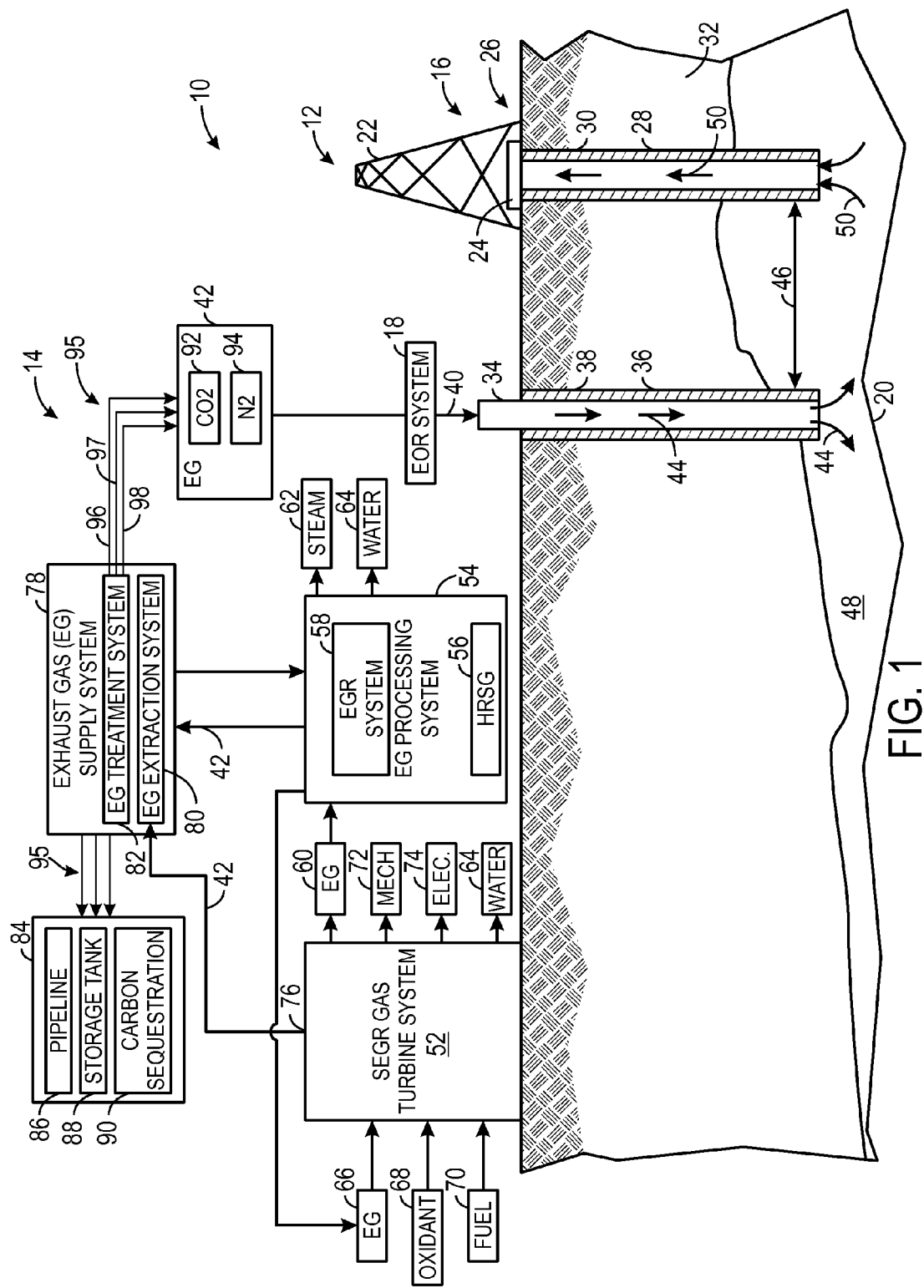
FIG. 1 is a diagram of an embodiment of a system having a turbine-based service system coupled to a hydrocarbon production system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Accordingly, while example embodiments are capable of various modifications and alternative forms, embodiments thereof are illustrated by way of example in the figures and will herein be described in detail. It should be understood, however, that there is no intent to limit example embodiments to the particular forms disclosed, but to the contrary, example embodiments are to cover all modifications, equivalents, and alternatives falling within the scope of the present invention.

The terminology used herein is for describing particular embodiments only and is not intended to be limiting of example embodiments. As used herein, the singular forms "a", "an" and "the" are intended to include the plural forms as well, unless the context clearly indicates otherwise. The terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Although the terms first, second, primary, secondary, etc. may be used herein to describe various elements, these elements should not be limited by these terms. These terms are only used to distinguish one element from another. For example, but not limiting to, a first element could be termed a second element, and, similarly, a second element could be termed a first element, without departing from the scope of example embodiments. As used herein, the term "and/or" includes any, and all, combinations of one or more of the associated listed items.

Certain terminology may be used herein for the convenience of the reader only and is not to be taken as a limitation on the scope of the invention. For example, words such as "upper", "lower", "left", "right", "front", "rear", "top", "bottom", "horizontal", "vertical", "upstream", "downstream", "fore", "aft", and the like; merely describe the configuration shown in the figures. Indeed, the element or elements of an embodiment of the present invention may be oriented in any direction and the terminology, therefore, should be understood as encompassing such variations unless specified otherwise.

As discussed in detail below, the disclosed embodiments relate generally to gas turbine systems with exhaust gas recirculation (EGR), and particularly stoichiometric operation of the gas turbine systems using EGR. For example, the gas turbine systems may be configured to recirculate the exhaust gas along an exhaust recirculation path, stoichiometrically combust fuel and oxidant moderated with at least some of the recirculated exhaust gas, and capture the exhaust gas for use in various target systems. The recirculation of the exhaust gas along with stoichiometric combustion may help to increase the concentration level of carbon dioxide ($CO_2$) in the exhaust gas, which can then be post treated to separate and purify the $CO_2$ and nitrogen ($N_2$) for use in various target systems. The gas turbine systems also may employ various exhaust gas processing (e.g., heat recovery, catalyst reactions, etc.) along the exhaust recirculation path, thereby increasing the concentration level of $CO_2$, reducing concentration levels of other emissions (e.g., carbon monoxide, nitrogen oxides, and unburnt hydrocarbons), and increasing energy recovery (e.g., with heat recovery units). Furthermore, the gas turbine engines may be configured to combust the fuel and oxidant with one or more diffusion flames (e.g., using diffusion fuel nozzles), premix flames (e.g., using premix fuel nozzles), or any combination thereof. In certain embodiments, the diffusion flames may help to maintain stability and operation within certain limits for stoichiometric combustion, which in turn helps to increase production of $CO_2$. For example, a gas turbine system operating with diffusion flames may enable a greater quantity of EGR, as compared to a gas turbine system operating with premix flames. In turn, the increased quantity of EGR helps to increase $CO_2$ production. Possible target systems include pipelines, storage tanks, carbon sequestration systems, and hydrocarbon production systems, such as enhanced oil recovery (EOR) systems.

The disclosed embodiments provide systems and methods for determining a flow rate of an oxidant flow and/or a fuel flow, and controlling the respective flows to a gas turbine engine with EGR to adjust the equivalence ratio, emissions levels, and/or stoichiometric combustion. Specifically, a system may include a distributed flow measurement system having multiple oxidant pressure sensors arranged within multiple oxidant passages, and multiple fuel pressure sensors arranged within multiple fuel passages. These pressure sensors may be disposed in close proximity to, directly attached to, and/or within one or more turbine combustors, fuel nozzles, or both, of the gas turbine engine. For example, the pressure sensors may be disposed at a head end of each turbine combustor. The pressure drop for a flow along each passage at various flow rates may be determined prior to operation of the gas turbine engine, such as via calculations per the design of the oxidant passages and fuel passages or empirically via calibration and testing. A controller may determine the oxidant pressure in an oxidant passage from oxidant pressure signals received from an oxidant pressure sensor, and the controller may determine the fuel pressure in a fuel passage from fuel pressure signals received from a fuel pressure sensor. The controller may compare the oxidant pressure for each oxidant passage to a reference oxidant pressure to determine an oxidant flow rate through the respective oxidant passage, and the controller may compare the fuel pressure for each fuel passage to a reference fuel pressure to determine a fuel flow rate through the respective fuel passage. The equivalence ratio for each fuel nozzle and/or for each combustor may be determined from the respective oxidant flow rates and the respective fuel flow rates.

The equivalence ratio for each fuel nozzle or each combustor may be controlled via control of the oxidant flow through the oxidant passages and/or control of the fuel flow through the fuel passages. Additionally, the recirculated exhaust gas may be controlled to affect the equivalence ratio of the mixture in the combustion chamber by dilution of the oxidant. In some embodiments, the recirculated exhaust gas may be controlled to moderate the exit temperature of the mixture in the combustion chamber by dilution of the combustion products. In some embodiments, the oxidant flow through the oxidant passages may be adjusted based at least in part on the load driven by the gas turbine engine. For example, the oxidant flow may be increased in response to an increased load on the gas turbine engine, or in response to a predicted increase in the load on the gas turbine engine. In some embodiments, the oxidant flow may be adjusted via adjustments to inlet guide vanes, bleed valves, or flow control valves, or any combination thereof. The fuel flow through the fuel passages may be adjusted based at least in part on the equivalence ratio or the load. For example, the fuel flow to a fuel nozzle or to a combustor may be adjusted to tune the equivalence ratio for the respective fuel nozzle or the respective combustor. The determined oxidant pressure and the determined fuel pressure may be utilized in a feedback or feed forward control system to control the equivalence ratio in response to measured or predicted loading changes.

As may be appreciated, a restriction flow meter (e.g., Venturi meter, orifice meter, flow nozzle) induces a pressure drop in a flow, and utilizes the induced pressure drop to determine the flow rate. A certain amount of the pressure drop due to the restriction flow meter may not be recoverable. Moreover, the accuracy of a restriction flow meter may be based at least in part on systems with relatively long lengths of straight conduit on the downstream side of the restriction, such as to recover some of the induced pressure drop. The relatively long length may be impractical for large restriction flow meters where space between equipment is limited and/or costly. Accordingly, a restriction flow meter upstream of the supply passages to a combustor may incur undesirable pressure losses and be less accurate than a distributed flow measurement system that measures the pressure within and/or downstream of the precisely machined supply passages in or near the head end portion of a combustor. Moreover, the distributed flow measurement system may utilize the functional pressure drop that is inherent in the respective flow supply system (e.g., oxidant supply system, fuel supply system) to determine the flow rate. The distributed flow measurement system described herein utilizes pressure drops from the respective oxidant passages and fuel passages to determine the oxidant flows and fuel flows with a reduced measurement effect on the pressure and flow rates from measurement relative to a restriction flow meter positioned upstream.

FIG. 1 is a diagram of an embodiment of a system 10 having a hydrocarbon production system 12 associated with a turbine-based service system 14. As discussed in further detail below, various embodiments of the turbine-based service system 14 are configured to provide various services, such as electrical power, mechanical power, and fluids (e.g., exhaust gas), to the hydrocarbon production system 12 to facilitate the production or retrieval of oil and/or gas. In the illustrated embodiment, the hydrocarbon production system 12 includes an oil/gas extraction system 16 and an enhanced oil recovery (EOR) system 18, which are coupled to a subterranean reservoir 20 (e.g., an oil, gas, or hydrocarbon reservoir). The oil/gas extraction system 16 includes a variety of surface equipment 22, such as a Christmas tree or production tree 24, coupled to an oil/gas well 26. Furthermore, the well 26 may include one or more tubulars 28 extending through a drilled bore 30 in the earth 32 to the subterranean reservoir 20. The tree 24 includes one or more valves, chokes, isolation sleeves, blowout preventers, and various flow control devices, which regulate pressures and control flows to and from the subterranean reservoir 20. While the tree 24 is generally used to control the flow of the production fluid (e.g., oil or gas) out of the subterranean reservoir 20, the EOR system 18 may increase the production of oil or gas by injecting one or more fluids into the subterranean reservoir 20.

Accordingly, the EOR system 18 may include a fluid injection system 34, which has one or more tubulars 36 extending through a bore 38 in the earth 32 to the subterranean reservoir 20. For example, the EOR system 18 may route one or more fluids 40, such as gas, steam, water, chemicals, or any combination thereof, into the fluid injection system 34. For example, as discussed in further detail below, the EOR system 18 may be coupled to the turbine-based service system 14, such that the system 14 routes an exhaust gas 42 (e.g., substantially or entirely free of oxygen) to the EOR system 18 for use as the injection fluid 40. The fluid injection system 34 routes the fluid 40 (e.g., the exhaust gas 42) through the one or more tubulars 36 into the subterranean reservoir 20, as indicated by arrows 44. The injection fluid 40 enters the subterranean reservoir 20 through the tubular 36 at an offset distance 46 away from the tubular 28 of the oil/gas well 26. Accordingly, the injection fluid 40 displaces the oil/gas 48 disposed in the subterranean reservoir 20, and drives the oil/gas 48 up through the one or more tubulars 28 of the hydrocarbon production system 12, as indicated by arrows 50. As discussed in further detail below, the injection fluid 40 may include the exhaust gas 42 originating from the turbine-based service system 14, which is able to generate the exhaust gas 42 on-site as needed by the hydrocarbon production system 12. In other words, the turbine-based system 14 may simultaneously generate one or more services (e.g., electrical power, mechanical power, steam, water (e.g., desalinated water), and exhaust gas (e.g., substantially free of oxygen)) for use by the hydrocarbon production system 12, thereby reducing or eliminating the reliance on external sources of such services.

In the illustrated embodiment, the turbine-based service system 14 includes a stoichiometric exhaust gas recirculation (SEGR) gas turbine system 52 and an exhaust gas (EG) processing system 54. The gas turbine system 52 may be configured to operate in a stoichiometric combustion mode of operation (e.g., a stoichiometric control mode) and a non-stoichiometric combustion mode of operation (e.g., a non-stoichiometric control mode), such as a fuel-lean control mode or a fuel-rich control mode. In the stoichiometric control mode, the combustion generally occurs in a substantially stoichiometric ratio of a fuel and oxidant, thereby resulting in substantially stoichiometric combustion. In particular, stoichiometric combustion generally involves consuming substantially all of the fuel and oxidant in the combustion reaction, such that the products of combustion are substantially or entirely free of unburnt fuel and oxidant. One measure of stoichiometric combustion is the equivalence ratio, or phi ($\Phi$), which is the ratio of the actual fuel/oxidant ratio relative to the stoichiometric fuel/oxidant ratio. An equivalence ratio of greater than 1.0 results in a fuel-rich combustion of the fuel and oxidant, whereas an equivalence ratio of less than 1.0 results in a fuel-lean combustion of the fuel and oxidant. In contrast, an equivalence ratio of 1.0 results in combustion that is neither fuel-rich nor fuel-lean, thereby substantially consuming all of the fuel and oxidant in the combustion reaction. In context of the disclosed embodiments, the term stoichiometric or substantially stoichiometric may refer to an equivalence ratio of approximately 0.95 to approximately 1.05. However, the disclosed embodiments may also include an equivalence ratio of 1.0 plus or minus 0.01, 0.02, 0.03, 0.04, 0.05, or more. Again, the stoichiometric combustion of fuel and oxidant in the turbine-based service system 14 may result in products of combustion or exhaust gas (e.g., 42) with substantially no unburnt fuel or oxidant remaining. For example, the exhaust gas 42 may have less than 1, 2, 3, 4, or 5 percent by volume of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. By further example, the exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. However, the disclosed embodiments also may produce other ranges of residual fuel, oxidant, and other emissions levels in the exhaust gas 42. As used herein, the terms emissions, emissions levels, and emissions targets may refer to concentration levels of certain products of combustion (e.g., $NO_X$, CO, $SO_X$, $O_2$, $N_2$, $H_2$, HCs, etc.), which may be present in recirculated gas streams, vented gas streams (e.g., exhausted into the atmosphere), and gas streams used in various target systems (e.g., the hydrocarbon production system 12).

Although the SEGR gas turbine system 52 and the EG processing system 54 may include a variety of components in different embodiments, the illustrated EG processing system 54 includes a heat recovery steam generator (HRSG) 56 and an exhaust gas recirculation (EGR) system 58, which receive and process an exhaust gas 60 originating from the SEGR gas turbine system 52. The HRSG 56 may include one or more heat exchangers, condensers, and various heat recovery equipment, which collectively function to transfer heat from the exhaust gas 60 to a stream of water, thereby generating steam 62. The steam 62 may be used in one or more steam turbines, the EOR system 18, or any other portion of the hydrocarbon production system 12. For example, the HRSG 56 may generate low pressure, medium pressure, and/or high pressure steam 62, which may be selectively applied to low, medium, and high pressure steam turbine stages, or different applications of the EOR system 18. In addition to the steam 62, a treated water 64, such as a desalinated water, may be generated by the HRSG 56, the EGR system 58, and/or another portion of the EG processing system 54 or the SEGR gas turbine system 52. The treated water 64 (e.g., desalinated water) may be particularly useful in areas with water shortages, such as inland or desert regions. The treated water 64 may be generated, at least in part, due to the large volume of air driving combustion of fuel within the SEGR gas turbine system 52. While the on-site generation of steam 62 and water 64 may be beneficial in many applications (including the hydrocarbon production system 12), the on-site generation of exhaust gas 42, 60 may be particularly beneficial for the EOR system 18, due to its low oxygen content, high pressure, and heat derived from the SEGR gas turbine system 52. Accordingly, the HRSG 56, the EGR system 58, and/or another portion of the EG processing system 54 may output or recirculate an exhaust gas 66 into the SEGR gas turbine system 52, while also routing the exhaust gas 42 to the EOR system 18 for use with the hydrocarbon production system 12. Likewise, the exhaust gas 42 may be extracted directly from the SEGR gas turbine system 52 (i.e., without passing through the EG processing system 54) for use in the EOR system 18 of the hydrocarbon production system 12.

The exhaust gas recirculation is handled by the EGR system 58 of the EG processing system 54. For example, the EGR system 58 includes one or more conduits, valves, blowers, exhaust gas treatment systems (e.g., filters, particulate removal units, gas separation units, gas purification units, heat exchangers, heat recovery units, moisture removal units, catalyst units, chemical injection units, or any combination thereof), and controls to recirculate the exhaust gas along an exhaust gas circulation path from an output (e.g., discharged exhaust gas 60) to an input (e.g., intake exhaust gas 66) of the SEGR gas turbine system 52. In the illustrated embodiment, the SEGR gas turbine system 52 intakes the exhaust gas 66 into a compressor section having one or more compressors, thereby compressing the exhaust gas 66 for use in a combustor section along with an intake of an oxidant 68 and one or more fuels 70. The oxidant 68 may include ambient air, pure oxygen, oxygen-enriched air, oxygen-reduced air, oxygen-nitrogen mixtures, or any suitable oxidant that facilitates combustion of the fuel 70. The fuel 70 may include one or more gas fuels, liquid fuels, or any combination thereof. For example, the fuel 70 may include natural gas, liquefied natural gas (LNG), syngas, methane, ethane, propane, butane, naphtha, kerosene, diesel fuel, ethanol, methanol, biofuel, or any combination thereof.

The SEGR gas turbine system 52 mixes and combusts the exhaust gas 66, the oxidant 68, and the fuel 70 in the combustor section, thereby generating hot combustion gases or exhaust gas 60 to drive one or more turbine stages in a turbine section. In certain embodiments, each combustor in the combustor section includes one or more premix fuel nozzles, one or more diffusion fuel nozzles, or any combination thereof. For example, each premix fuel nozzle may be configured to mix the oxidant 68 and the fuel 70 internally within the fuel nozzle and/or partially upstream of the fuel nozzle, thereby injecting an oxidant-fuel mixture from the fuel nozzle into the combustion zone for a premixed combustion (e.g., a premixed flame). By further example, each diffusion fuel nozzle may be configured to isolate the flows of oxidant 68 and fuel 70 within the fuel nozzle, thereby separately injecting the oxidant 68 and the fuel 70 from the fuel nozzle into the combustion zone for diffusion combustion (e.g., a diffusion flame). In particular, the diffusion combustion provided by the diffusion fuel nozzles delays mixing of the oxidant 68 and the fuel 70 until the point of initial combustion, i.e., the flame region. In embodiments employing the diffusion fuel nozzles, the diffusion flame may provide increased flame stability, because the diffusion flame generally forms at the point of stoichiometry between the separate streams of oxidant 68 and fuel 70 (i.e., as the oxidant 68 and fuel 70 are mixing). In certain embodiments, one or more diluents (e.g., the exhaust gas 60, steam, nitrogen, or another inert gas) may be pre-mixed with the oxidant 68, the fuel 70, or both, in either the diffusion fuel nozzle or the premix fuel nozzle. In addition, one or more diluents (e.g., the exhaust gas 60, steam, nitrogen, or another inert gas) may be injected into the combustor at or downstream from the point of combustion within each combustor. The use of these diluents may help temper the flame (e.g., premix flame or diffusion flame), thereby helping to reduce $NO_X$ emissions, such as nitrogen monoxide (NO) and nitrogen dioxide ($NO_2$). Regardless of the type of flame, the combustion produces hot combustion gases or exhaust gas 60 to drive one or more turbine stages. As each turbine stage is driven by the exhaust gas 60, the SEGR gas turbine system 52 generates a mechanical power 72 and/or an electrical power 74 (e.g., via an electrical generator). The system 52 also outputs the exhaust gas 60, and may further output water 64. Again, the water 64 may be a treated water, such as a desalinated water, which may be useful in a variety of applications on-site or off-site.

Exhaust extraction is also provided by the SEGR gas turbine system 52 using one or more extraction points 76. For example, the illustrated embodiment includes an exhaust gas (EG) supply system 78 having an exhaust gas (EG) extraction system 80 and an exhaust gas (EG) treatment system 82, which receive exhaust gas 42 from the extraction points 76, treat the exhaust gas 42, and then supply or distribute the exhaust gas 42 to various target systems. The target systems may include the EOR system 18 and/or other systems, such as a pipeline 86, a storage tank 88, or a carbon sequestration system 90. The EG extraction system 80 may include one or more conduits, valves, controls, and flow separations, which facilitate isolation of the exhaust gas 42 from the oxidant 68, the fuel 70, and other contaminants, while also controlling the temperature, pressure, and flow rate of the extracted exhaust gas 42. The EG treatment system 82 may include one or more heat exchangers (e.g., heat recovery units such as heat recovery steam generators, condensers, coolers, or heaters), catalyst systems (e.g., oxidation catalyst systems), particulate and/or water removal systems (e.g., gas dehydration units, inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, exhaust gas compressors, any combination thereof. These subsystems of the EG treatment system 82 enable control of the temperature, pressure, flow rate, moisture content (e.g., amount of water removal), particulate content (e.g., amount of particulate removal), and gas composition (e.g., percentage of $CO_2$, $N_2$, etc.).

The extracted exhaust gas 42 is treated by one or more subsystems of the EG treatment system 82, depending on the target system. For example, the EG treatment system 82 may direct all or part of the exhaust gas 42 through a carbon capture system, a gas separation system, a gas purification system, and/or a solvent based treatment system, which is controlled to separate and purify a carbonaceous gas (e.g., carbon dioxide) 92 and/or nitrogen ($N_2$) 94 for use in the various target systems. For example, embodiments of the EG treatment system 82 may perform gas separation and purification to produce a plurality of different streams 95 of exhaust gas 42, such as a first stream 96, a second stream 97, and a third stream 98. The first stream 96 may have a first composition that is rich in carbon dioxide and/or lean in nitrogen (e.g., a $CO_2$ rich, $N_2$ lean stream). The second stream 97 may have a second composition that has intermediate concentration levels of carbon dioxide and/or nitrogen (e.g., intermediate concentration $CO_2$, $N_2$ stream). The third stream 98 may have a third composition that is lean in carbon dioxide and/or rich in nitrogen (e.g., a $CO_2$ lean, $N_2$ rich stream). Each stream 95 (e.g., 96, 97, and 98) may include a gas dehydration unit, a filter, a gas compressor, or any combination thereof, to facilitate delivery of the stream 95 to a target system. In certain embodiments, the $CO_2$ rich, $N_2$ lean stream 96 may have a $CO_2$ purity or concentration level of greater than approximately 70, 75, 80, 85, 90, 95, 96, 97, 98, or 99 percent by volume, and a $N_2$ purity or concentration level of less than approximately 1, 2, 3, 4, 5, 10, 15, 20, 25, or 30 percent by volume. In contrast, the $CO_2$ lean, $N_2$ rich stream 98 may have a $CO_2$ purity or concentration level of less than approximately 1, 2, 3, 4, 5, 10, 15, 20, 25, or 30 percent by volume, and an $N_2$ purity or concentration level of greater than approximately 70, 75, 80, 85, 90, 95, 96, 97, 98, or 99 percent by volume. The intermediate concentration $CO_2$, $N_2$ stream 97 may have a $CO_2$ purity or concentration level and/or a $N_2$ purity or concentration level of between approximately 30 to 70, 35 to 65, 40 to 60, or 45 to 55 percent by volume. Although the foregoing ranges are merely non-limiting examples, the $CO_2$ rich, $N_2$ lean stream 96 and the $CO_2$ lean, $N_2$ rich stream 98 may be particularly well suited for use with the EOR system 18 and the other systems 84. However, any of these rich, lean, or intermediate concentration $CO_2$ streams 95 may be used, alone or in various combinations, with the EOR system 18 and the other systems 84. For example, the EOR system 18 and the other systems 84 (e.g., the pipeline 86, storage tank 88, and the carbon sequestration system 90) each may receive one or more $CO_2$ rich, $N_2$ lean streams 96, one or more $CO_2$ lean, $N_2$ rich streams 98, one or more intermediate concentration $CO_2$, $N_2$ streams 97, and one or more untreated exhaust gas 42 streams (i.e., bypassing the EG treatment system 82).

The EG extraction system 80 extracts the exhaust gas 42 at one or more extraction points 76 along the compressor section, the combustor section, and/or the turbine section, such that the exhaust gas 42 may be used in the EOR system 18 and other systems 84 at suitable temperatures and pressures. The EG extraction system 80 and/or the EG treatment system 82 also may circulate fluid flows (e.g., exhaust gas 42) to and from the EG processing system 54. For example, a portion of the exhaust gas 42 passing through the EG processing system 54 may be extracted by the EG extraction system 80 for use in the EOR system 18 and the other systems 84. In certain embodiments, the EG supply system 78 and the EG processing system 54 may be independent or integral with one another, and thus may use independent or common subsystems. For example, the EG treatment system 82 may be used by both the EG supply system 78 and the EG processing system 54. Exhaust gas 42 extracted from the EG processing system 54 may undergo multiple stages of gas treatment, such as one or more stages of gas treatment in the EG processing system 54 followed by one or more additional stages of gas treatment in the EG treatment system 82.

At each extraction point 76, the extracted exhaust gas 42 may be substantially free of oxidant 68 and fuel 70 (e.g., unburnt fuel or hydrocarbons) due to substantially stoichiometric combustion and/or gas treatment in the EG processing system 54. Furthermore, depending on the target system, the extracted exhaust gas 42 may undergo further treatment in the EG treatment system 82 of the EG supply system 78, thereby further reducing any residual oxidant 68, fuel 70, or other undesirable products of combustion. For example, either before or after treatment in the EG treatment system 82, the extracted exhaust gas 42 may have less than 1, 2, 3, 4, or 5 percent by volume of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. By further example, either before or after treatment in the EG treatment system 82, the extracted exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. Thus, the exhaust gas 42 is particularly well suited for use with the EOR system 18.

The EGR operation of the turbine system 52 specifically enables the exhaust extraction at a multitude of locations 76. For example, the compressor section of the system 52 may be used to compress the exhaust gas 66 without any oxidant 68 (i.e., only compression of the exhaust gas 66), such that a substantially oxygen-free exhaust gas 42 may be extracted from the compressor section and/or the combustor section prior to entry of the oxidant 68 and the fuel 70. The extraction points 76 may be located at interstage ports between adjacent compressor stages, at ports along the compressor discharge casing, at ports along each combustor in the combustor section, or any combination thereof. In certain embodiments, the exhaust gas 66 may not mix with the oxidant 68 and fuel 70 until it reaches the head end portion and/or fuel nozzles of each combustor in the combustor section. Furthermore, one or more flow separators (e.g., walls, dividers, baffles, or the like) may be used to isolate the oxidant 68 and the fuel 70 from the extraction points 76. With these flow separators, the extraction points 76 may be disposed directly along a wall of each combustor in the combustor section.

Once the exhaust gas 66, oxidant 68, and fuel 70 flow through the head end portion (e.g., through fuel nozzles) into the combustion portion (e.g., combustion chamber) of each combustor, the SEGR gas turbine system 52 is controlled to provide a substantially stoichiometric combustion of the exhaust gas 66, oxidant 68, and fuel 70. For example, the system 52 may maintain an equivalence ratio of approximately 0.95 to approximately 1.05. As a result, the products of combustion of the mixture of exhaust gas 66, oxidant 68, and fuel 70 in each combustor is substantially free of oxygen and unburnt fuel. Thus, the products of combustion (or exhaust gas) may be extracted from the turbine section of the SEGR gas turbine system 52 for use as the exhaust gas 42 routed to the EOR system 18. Along the turbine section, the extraction points 76 may be located at any turbine stage, such as interstage ports between adjacent turbine stages. Thus, using any of the foregoing extraction points 76, the turbine-based service system 14 may generate, extract, and deliver the exhaust gas 42 to the hydrocarbon production system 12 (e.g., the EOR system 18) for use in the production of oil/gas 48 from the subterranean reservoir 20.

Figure 2:
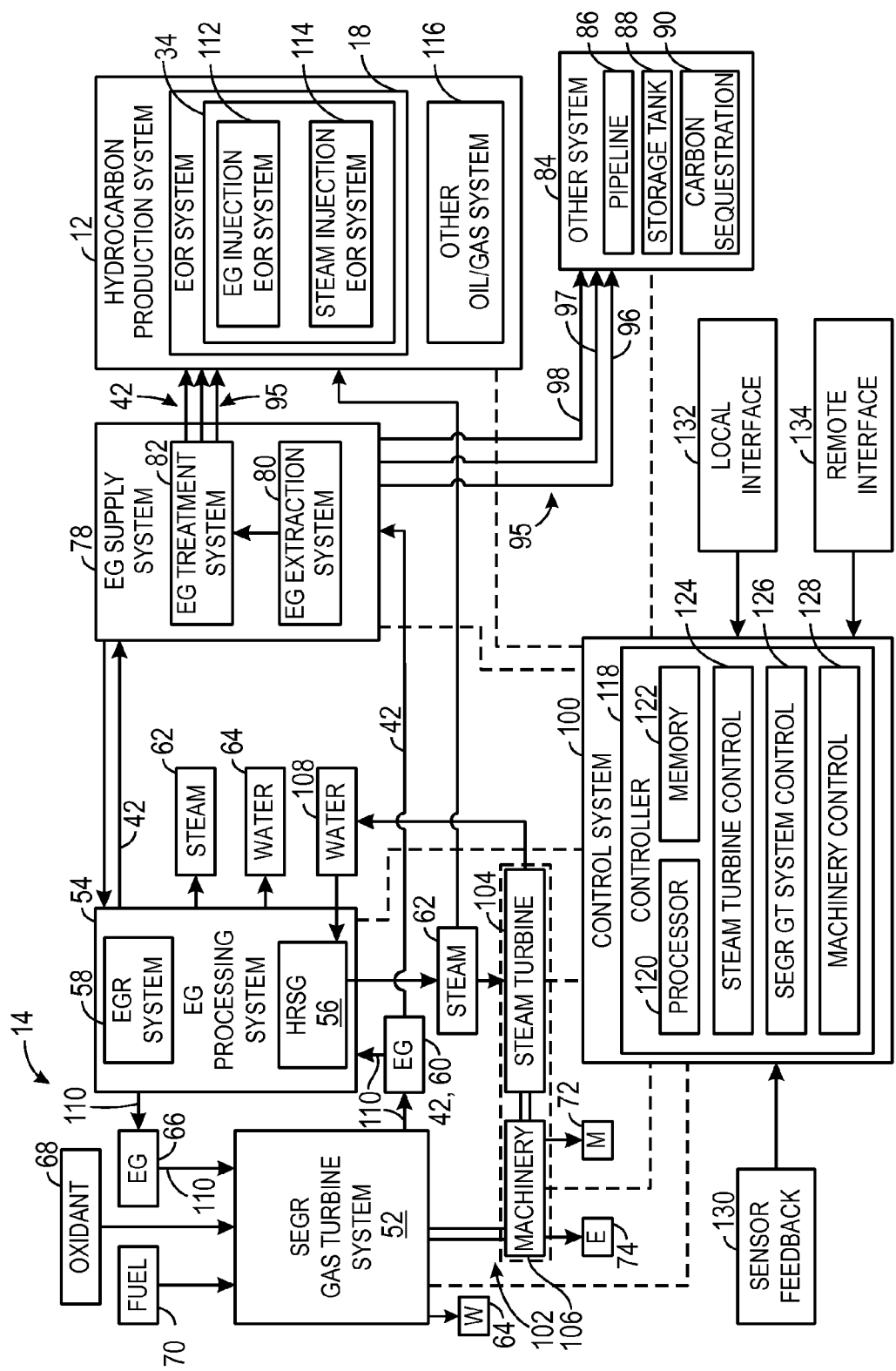
FIG. 2 is a diagram of an embodiment of the system of FIG. 1, further illustrating a control system and a combined cycle system.

FIG. 2 is a diagram of an embodiment of the system 10 of FIG. 1, illustrating a control system 100 coupled to the turbine-based service system 14 and the hydrocarbon production system 12. In the illustrated embodiment, the turbine-based service system 14 includes a combined cycle system 102, which includes the SEGR gas turbine system 52 as a topping cycle, a steam turbine 104 as a bottoming cycle, and the HRSG 56 to recover heat from the exhaust gas 60 to generate the steam 62 for driving the steam turbine 104. Again, the SEGR gas turbine system 52 receives, mixes, and stoichiometrically combusts the exhaust gas 66, the oxidant 68, and the fuel 70 (e.g., premix and/or diffusion flames), thereby producing the exhaust gas 60, the mechanical power 72, the electrical power 74, and/or the water 64. For example, the SEGR gas turbine system 52 may drive one or more loads or machinery 106, such as an electrical generator, an oxidant compressor (e.g., a main air compressor), a gear box, a pump, equipment of the hydrocarbon production system 12, or any combination thereof. In some embodiments, the machinery 106 may include other drives, such as electrical motors or steam turbines (e.g., the steam turbine 104), in tandem with the SEGR gas turbine system 52. Accordingly, an output of the machinery 106 driven by the SEGR gas turbines system 52 (and any additional drives) may include the mechanical power 72 and the electrical power 74. The mechanical power 72 and/or the electrical power 74 may be used on-site for powering the hydrocarbon production system 12, the electrical power 74 may be distributed to the power grid, or any combination thereof. The output of the machinery 106 also may include a compressed fluid, such as a compressed oxidant 68 (e.g., air or oxygen), for intake into the combustion section of the SEGR gas turbine system 52. Each of these outputs (e.g., the exhaust gas 60, the mechanical power 72, the electrical power 74, and/or the water 64) may be considered a service of the turbine-based service system 14.

The SEGR gas turbine system 52 produces the exhaust gas 42, 60, which may be substantially free of oxygen, and routes this exhaust gas 42, 60 to the EG processing system 54 and/or the EG supply system 78. The EG supply system 78 may treat and deliver the exhaust gas 42 (e.g., streams 95) to the hydrocarbon production system 12 and/or the other systems 84. As discussed above, the EG processing system 54 may include the HRSG 56 and the EGR system 58. The HRSG 56 may include one or more heat exchangers, condensers, and various heat recovery equipment, which may be used to recover or transfer heat from the exhaust gas 60 to water 108 to generate the steam 62 for driving the steam turbine 104. Similar to the SEGR gas turbine system 52, the steam turbine 104 may drive one or more loads or machinery 106, thereby generating the mechanical power 72 and the electrical power 74. In the illustrated embodiment, the SEGR gas turbine system 52 and the steam turbine 104 are arranged in tandem to drive the same machinery 106. However, in other embodiments, the SEGR gas turbine system 52 and the steam turbine 104 may separately drive different machinery 106 to independently generate mechanical power 72 and/or electrical power 74. As the steam turbine 104 is driven by the steam 62 from the HRSG 56, the steam 62 gradually decreases in temperature and pressure. Accordingly, the steam turbine 104 recirculates the used steam 62 and/or water 108 back into the HRSG 56 for additional steam generation via heat recovery from the exhaust gas 60. In addition to steam generation, the HRSG 56, the EGR system 58, and/or another portion of the EG processing system 54 may produce the water 64, the exhaust gas 42 for use with the hydrocarbon production system 12, and the exhaust gas 66 for use as an input into the SEGR gas turbine system 52. For example, the water 64 may be a treated water 64, such as a desalinated water for use in other applications. The desalinated water may be particularly useful in regions of low water availability. Regarding the exhaust gas 60, embodiments of the EG processing system 54 may be configured to recirculate the exhaust gas 60 through the EGR system 58 with or without passing the exhaust gas 60 through the HRSG 56.

In the illustrated embodiment, the SEGR gas turbine system 52 has an exhaust recirculation path 110, which extends from an exhaust outlet to an exhaust inlet of the system 52. Along the path 110, the exhaust gas 60 passes through the EG processing system 54, which includes the HRSG 56 and the EGR system 58 in the illustrated embodiment. The EGR system 58 may include one or more conduits, valves, blowers, gas treatment systems (e.g., filters, particulate removal units, gas separation units, gas purification units, heat exchangers, heat recovery units such as heat recovery steam generators, moisture removal units, catalyst units, chemical injection units, or any combination thereof) in series and/or parallel arrangements along the path 110. In other words, the EGR system 58 may include any flow control components, pressure control components, temperature control components, moisture control components, and gas composition control components along the exhaust recirculation path 110 between the exhaust outlet and the exhaust inlet of the system 52. Accordingly, in embodiments with the HRSG 56 along the path 110, the HRSG 56 may be considered a component of the EGR system 58. However, in certain embodiments, the HRSG 56 may be disposed along an exhaust path independent from the exhaust recirculation path 110. Regardless of whether the HRSG 56 is along a separate path or a common path with the EGR system 58, the HRSG 56 and the EGR system 58 intake the exhaust gas 60 and output either the recirculated exhaust gas 66, the exhaust gas 42 for use with the EG supply system 78 (e.g., for the hydrocarbon production system 12 and/or other systems 84), or another output of exhaust gas. Again, the SEGR gas turbine system 52 intakes, mixes, and stoichiometrically combusts the exhaust gas 66, the oxidant 68, and the fuel 70 (e.g., premixed and/or diffusion flames) to produce a substantially oxygen-free and fuel-free exhaust gas 60 for distribution to the EG processing system 54, the hydrocarbon production system 12, or other systems 84.

As noted above with reference to FIG. 1, the hydrocarbon production system 12 may include a variety of equipment to facilitate the recovery or production of oil/gas 48 from a subterranean reservoir 20 through an oil/gas well 26. For example, the hydrocarbon production system 12 may include the EOR system 18 having the fluid injection system 34. In the illustrated embodiment, the fluid injection system 34 includes an exhaust gas injection EOR system 112 and a steam injection EOR system 114. Although the fluid injection system 34 may receive fluids from a variety of sources, the illustrated embodiment may receive the exhaust gas 42 and the steam 62 from the turbine-based service system 14. The exhaust gas 42 and/or the steam 62 produced by the turbine-based service system 14 also may be routed to the hydrocarbon production system 12 for use in other oil/gas systems 116.

The quantity, quality, and flow of the exhaust gas 42 and/or the steam 62 may be controlled by the control system 100. The control system 100 may be dedicated entirely to the turbine-based service system 14, or the control system 100 may optionally also provide control (or at least some data to facilitate control) for the hydrocarbon production system 12 and/or other systems 84. In the illustrated embodiment, the control system 100 includes a controller 118 having a processor 120, a memory 122, a steam turbine control 124, a SEGR gas turbine system control 126, and a machinery control 128. The processor 120 may include a single processor or two or more redundant processors, such as triple redundant processors for control of the turbine-based service system 14. The memory 122 may include volatile and/or non-volatile memory. For example, the memory 122 may include one or more hard drives, flash memory, read-only memory, random access memory, or any combination thereof. The controls 124, 126, and 128 may include software and/or hardware controls. For example, the controls 124, 126, and 128 may include various instructions or code stored on the memory 122 and executable by the processor 120. The control 124 is configured to control operation of the steam turbine 104, the SEGR gas turbine system control 126 is configured to control the system 52, and the machinery control 128 is configured to control the machinery 106. Thus, the controller 118 (e.g., controls 124, 126, and 128) may be configured to coordinate various sub-systems of the turbine-based service system 14 to provide a suitable stream of the exhaust gas 42 to the hydrocarbon production system 12.

In certain embodiments of the control system 100, each element (e.g., system, subsystem, and component) illustrated in the drawings or described herein includes (e.g., directly within, upstream, or downstream of such element) one or more industrial control features, such as sensors and control devices, which are communicatively coupled with one another over an industrial control network along with the controller 118. For example, the control devices associated with each element may include a dedicated device controller (e.g., including a processor, memory, and control instructions), one or more actuators, valves, switches, and industrial control equipment, which enable control based on sensor feedback 130, control signals from the controller 118, control signals from a user, or any combination thereof. Thus, any of the control functionality described herein may be implemented with control instructions stored and/or executable by the controller 118, dedicated device controllers associated with each element, or a combination thereof.

In order to facilitate such control functionality, the control system 100 includes one or more sensors distributed throughout the system 10 to obtain the sensor feedback 130 for use in execution of the various controls, e.g., the controls 124, 126, and 128. For example, the sensor feedback 130 may be obtained from sensors distributed throughout the SEGR gas turbine system 52, the machinery 106, the EG processing system 54, the steam turbine 104, the hydrocarbon production system 12, or any other components throughout the turbine-based service system 14 or the hydrocarbon production system 12. For example, the sensor feedback 130 may include temperature feedback, pressure feedback, flow rate feedback, flame temperature feedback, combustion dynamics feedback, intake oxidant composition feedback, intake fuel composition feedback, exhaust composition feedback, the output level of mechanical power 72, the output level of electrical power 74, the output quantity of the exhaust gas 42, 60, the output quantity or quality of the water 64, or any combination thereof. For example, the sensor feedback 130 may include a composition of the exhaust gas 42, 60 to facilitate stoichiometric combustion in the SEGR gas turbine system 52. For example, the sensor feedback 130 may include feedback from one or more intake oxidant sensors along an oxidant supply path of the oxidant 68, one or more intake fuel sensors along a fuel supply path of the fuel 70, and one or more exhaust emissions sensors disposed along the exhaust recirculation path 110 and/or within the SEGR gas turbine system 52. The intake oxidant sensors, intake fuel sensors, and exhaust emissions sensors may include temperature sensors, pressure sensors, flow rate sensors, and composition sensors. The emissions sensors may include sensors for nitrogen oxides (e.g., $NO_C$ sensors), carbon oxides (e.g., CO sensors and $CO_2$ sensors), sulfur oxides (e.g., $SO_X$ sensors), hydrogen (e.g., $H_2$ sensors), oxygen (e.g., $O_2$ sensors), unburnt hydrocarbons (e.g., HC sensors), or other products of incomplete combustion, or any combination thereof.

Using this feedback 130, the control system 100 may adjust (e.g., increase, decrease, or maintain) the intake flow of exhaust gas 66, oxidant 68, and/or fuel 70 into the SEGR gas turbine system 52 (among other operational parameters) to maintain the equivalence ratio within a suitable range, e.g., between approximately 0.95 to approximately 1.05, between approximately 0.95 to approximately 1.0, between approximately 1.0 to approximately 1.05, or substantially at 1.0. For example, the control system 100 may analyze the feedback 130 to monitor the exhaust emissions (e.g., concentration levels of nitrogen oxides, carbon oxides such as CO and $CO_2$, sulfur oxides, hydrogen, oxygen, unburnt hydrocarbons, and other products of incomplete combustion) and/or determine the equivalence ratio, and then control one or more components to adjust the exhaust emissions (e.g., concentration levels in the exhaust gas 42) and/or the equivalence ratio. The controlled components may include any of the components illustrated and described with reference to the drawings, including but not limited to, valves along the supply paths for the oxidant 68, the fuel 70, and the exhaust gas 66; an oxidant compressor, a fuel pump, or any components in the EG processing system 54; any components of the SEGR gas turbine system 52, or any combination thereof. The controlled components may adjust (e.g., increase, decrease, or maintain) the flow rates, temperatures, pressures, or percentages (e.g., equivalence ratio) of the oxidant 68, the fuel 70, and the exhaust gas 66 that combust within the SEGR gas turbine system 52. The controlled components also may include one or more gas treatment systems, such as catalyst units (e.g., oxidation catalyst units), supplies for the catalyst units (e.g., oxidation fuel, heat, electricity, etc.), gas purification and/or separation units (e.g., solvent based separators, absorbers, flash tanks, etc.), and filtration units. The gas treatment systems may help reduce various exhaust emissions along the exhaust recirculation path 110, a vent path (e.g., exhausted into the atmosphere), or an extraction path to the EG supply system 78.

In certain embodiments, the control system 100 may analyze the feedback 130 and control one or more components to maintain or reduce emissions levels (e.g., concentration levels in the exhaust gas 42, 60, 95) to a target range, such as less than approximately 10, 20, 30, 40, 50, 100, 200, 300, 400, 500, 1000, 2000, 3000, 4000, 5000, or 10000 parts per million by volume (ppmv). These target ranges may be the same or different for each of the exhaust emissions, e.g., concentration levels of nitrogen oxides, carbon monoxide, sulfur oxides, hydrogen, oxygen, unburnt hydrocarbons, and other products of incomplete combustion. For example, depending on the equivalence ratio, the control system 100 may selectively control exhaust emissions (e.g., concentration levels) of oxidant (e.g., oxygen) within a target range of less than approximately 10, 20, 30, 40, 50, 60, 70, 80, 90, 100, 250, 500, 750, or 1000 ppmv; carbon monoxide (CO) within a target range of less than approximately 20, 50, 100, 200, 500, 1000, 2500, or 5000 ppmv; and nitrogen oxides ($NO_X$) within a target range of less than approximately 50, 100, 200, 300, 400, or 500 ppmv. In certain embodiments operating with a substantially stoichiometric equivalence ratio, the control system 100 may selectively control exhaust emissions (e.g., concentration levels) of oxidant (e.g., oxygen) within a target range of less than approximately 10, 20, 30, 40, 50, 60, 70, 80, 90, or 100 ppmv; and carbon monoxide (CO) within a target range of less than approximately 500, 1000, 2000, 3000, 4000, or 5000 ppmv. In certain embodiments operating with a fuel-lean equivalence ratio (e.g., between approximately 0.95 to 1.0), the control system 100 may selectively control exhaust emissions (e.g., concentration levels) of oxidant (e.g., oxygen) within a target range of less than approximately 500, 600, 700, 800, 900, 1000, 1100, 1200, 1300, 1400, or 1500 ppmv; carbon monoxide (CO) within a target range of less than approximately 10, 20, 30, 40, 50, 60, 70, 80, 90, 100, 150, or 200 ppmv; and nitrogen oxides (e.g., $NO_X$) within a target range of less than approximately 50, 100, 150, 200, 250, 300, 350, or 400 ppmv. The foregoing target ranges are merely examples, and are not intended to limit the scope of the disclosed embodiments.

The control system 100 also may be coupled to a local interface 132 and a remote interface 134. For example, the local interface 132 may include a computer workstation disposed on-site at the turbine-based service system 14 and/or the hydrocarbon production system 12. In contrast, the remote interface 134 may include a computer workstation disposed off-site from the turbine-based service system 14 and the hydrocarbon production system 12, such as through an internet connection. These interfaces 132 and 134 facilitate monitoring and control of the turbine-based service system 14, such as through one or more graphical displays of sensor feedback 130, operational parameters, and so forth.

Again, as noted above, the controller 118 includes a variety of controls 124, 126, and 128 to facilitate control of the turbine-based service system 14. The steam turbine control 124 may receive the sensor feedback 130 and output control commands to facilitate operation of the steam turbine 104. For example, the steam turbine control 124 may receive the sensor feedback 130 from the HRSG 56, the machinery 106, temperature and pressure sensors along a path of the steam 62, temperature and pressure sensors along a path of the water 108, and various sensors indicative of the mechanical power 72 and the electrical power 74. Likewise, the SEGR gas turbine system control 126 may receive sensor feedback 130 from one or more sensors disposed along the SEGR gas turbine system 52, the machinery 106, the EG processing system 54, or any combination thereof. For example, the sensor feedback 130 may be obtained from temperature sensors, pressure sensors, clearance sensors, vibration sensors, flame sensors, fuel composition sensors, exhaust gas composition sensors, or any combination thereof, disposed within or external to the SEGR gas turbine system 52. Finally, the machinery control 128 may receive sensor feedback 130 from various sensors associated with the mechanical power 72 and the electrical power 74, as well as sensors disposed within the machinery 106. Each of these controls 124, 126, and 128 uses the sensor feedback 130 to improve operation of the turbine-based service system 14.

In the illustrated embodiment, the SEGR gas turbine system control 126 may execute instructions to control the quantity and quality of the exhaust gas 42, 60, 95 in the EG processing system 54, the EG supply system 78, the hydrocarbon production system 12, and/or the other systems 84. For example, the SEGR gas turbine system control 126 may maintain a level of oxidant (e.g., oxygen) and/or unburnt fuel in the exhaust gas 60 below a threshold suitable for use with the exhaust gas injection EOR system 112. In certain embodiments, the threshold levels may be less than 1, 2, 3, 4, or 5 percent of oxidant (e.g., oxygen) and/or unburnt fuel by volume of the exhaust gas 42, 60; or the threshold levels of oxidant (e.g., oxygen) and/or unburnt fuel (and other exhaust emissions) may be less than approximately 10, 20, 30, 40, 50, 60, 70, 80, 90, 100, 200, 300, 400, 500, 1000, 2000, 3000, 4000, or 5000 parts per million by volume (ppmv) in the exhaust gas 42, 60. By further example, in order to achieve these low levels of oxidant (e.g., oxygen) and/or unburnt fuel, the SEGR gas turbine system control 126 may maintain an equivalence ratio for combustion in the SEGR gas turbine system 52 between approximately 0.95 and approximately 1.05. The SEGR gas turbine system control 126 also may control the EG extraction system 80 and the EG treatment system 82 to maintain the temperature, pressure, flow rate, and gas composition of the exhaust gas 42, 60, 95 within suitable ranges for the exhaust gas injection EOR system 112, the pipeline 86, the storage tank 88, and the carbon sequestration system 90. As discussed above, the EG treatment system 82 may be controlled to purify and/or separate the exhaust gas 42 into one or more gas streams 95, such as the $CO_2$ rich, $N_2$ lean stream 96, the intermediate concentration $CO_2$, $N_2$ stream 97, and the $CO_2$ lean, $N_2$ rich stream 98. In addition to controls for the exhaust gas 42, 60, and 95, the controls 124, 126, and 128 may execute one or more instructions to maintain the mechanical power 72 within a suitable power range, or maintain the electrical power 74 within a suitable frequency and power range.

Figure 3:
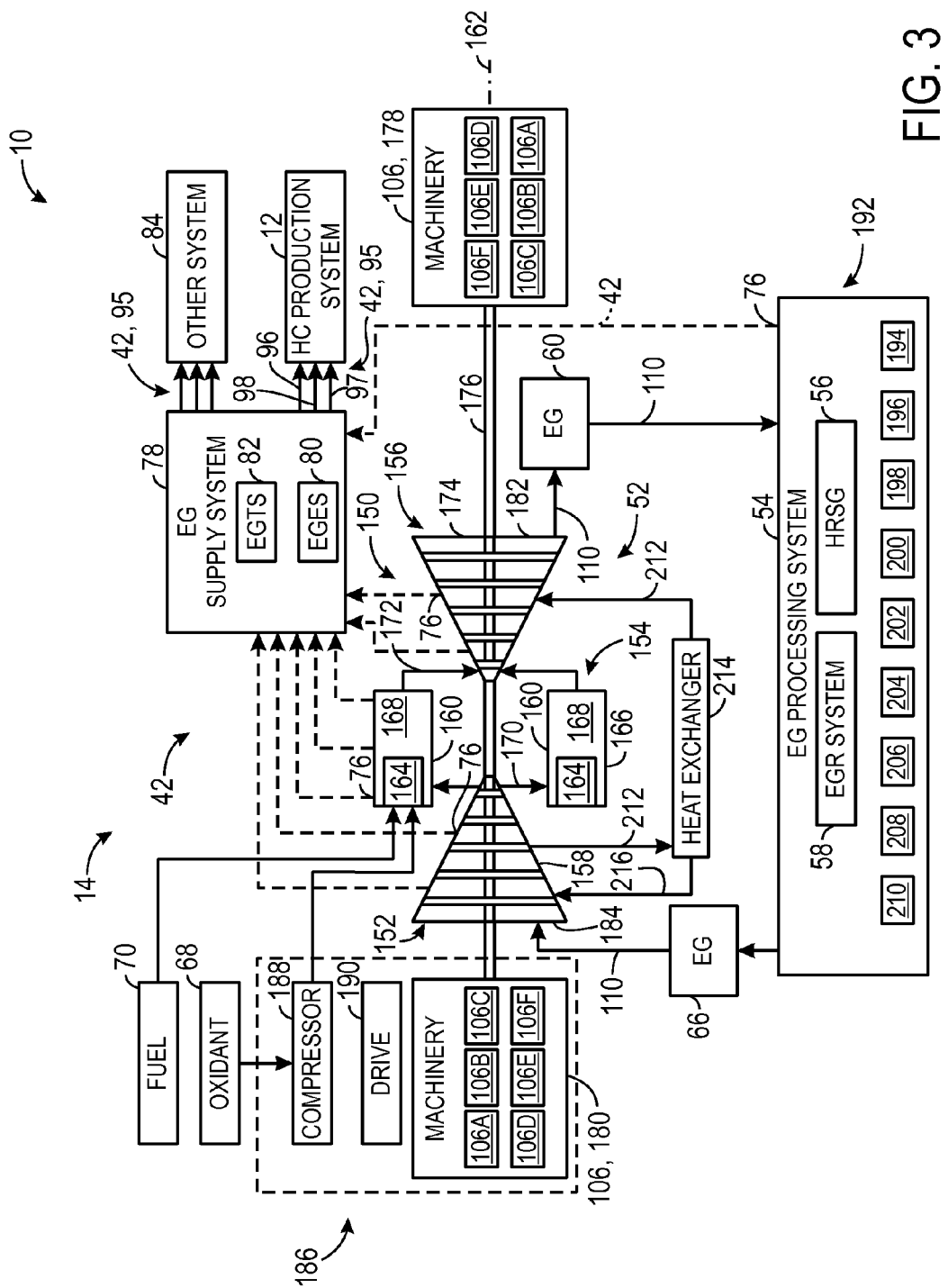
FIG. 3 is a diagram of an embodiment of the system of FIGS. 1 and 2, further illustrating details of a gas turbine engine, exhaust gas supply system, and exhaust gas processing system.

FIG. 3 is a diagram of embodiment of the system 10, further illustrating details of the SEGR gas turbine system 52 for use with the hydrocarbon production system 12 and/or other systems 84. In the illustrated embodiment, the SEGR gas turbine system 52 includes a gas turbine engine 150 coupled to the EG processing system 54. The illustrated gas turbine engine 150 includes a compressor section 152, a combustor section 154, and an expander section or turbine section 156. The compressor section 152 includes one or more exhaust gas compressors or compressor stages 158, such as 1 to 20 stages of rotary compressor blades disposed in a series arrangement. Likewise, the combustor section 154 includes one or more combustors 160, such as 1 to 20 combustors 160 distributed circumferentially about a rotational axis 162 of the SEGR gas turbine system 52. Furthermore, each combustor 160 may include one or more fuel nozzles 164 configured to inject the exhaust gas 66, the oxidant 68, and/or the fuel 70. For example, a head end portion 166 of each combustor 160 may house 1, 2, 3, 4, 5, 6, or more fuel nozzles 164, which may inject streams or mixtures of the exhaust gas 66, the oxidant 68, and/or the fuel 70 into a combustion portion 168 (e.g., combustion chamber) of the combustor 160.

The fuel nozzles 164 may include any combination of premix fuel nozzles 164 (e.g., configured to premix the oxidant 68 and fuel 70 for generation of an oxidant/fuel premix flame) and/or diffusion fuel nozzles 164 (e.g., configured to inject separate flows of the oxidant 68 and fuel 70 for generation of an oxidant/fuel diffusion flame). Embodiments of the premix fuel nozzles 164 may include swirl vanes, mixing chambers, or other features to internally mix the oxidant 68 and fuel 70 within the nozzles 164, prior to injection and combustion in the combustion chamber 168. The premix fuel nozzles 164 also may receive at least some partially mixed oxidant 68 and fuel 70. In certain embodiments, each diffusion fuel nozzle 164 may isolate flows of the oxidant 68 and the fuel 70 until the point of injection, while also isolating flows of one or more diluents (e.g., the exhaust gas 66, steam, nitrogen, or another inert gas) until the point of injection. In other embodiments, each diffusion fuel nozzle 164 may isolate flows of the oxidant 68 and the fuel 70 until the point of injection, while partially mixing one or more diluents (e.g., the exhaust gas 66, steam, nitrogen, or another inert gas) with the oxidant 68 and/or the fuel 70 prior to the point of injection. In addition, one or more diluents (e.g., the exhaust gas 66, steam, nitrogen, or another inert gas) may be injected into the combustor (e.g., into the hot products of combustion) either at or downstream from the combustion zone, thereby helping to reduce the temperature of the hot products of combustion and reduce emissions of $NO_X$ (e.g., NO and $NO_2$). Regardless of the type of fuel nozzle 164, the SEGR gas turbine system 52 may be controlled to provide substantially stoichiometric combustion of the oxidant 68 and fuel 70.

In diffusion combustion embodiments using the diffusion fuel nozzles 164, the fuel 70 and oxidant 68 generally do not mix upstream from the diffusion flame, but rather the fuel 70 and oxidant 68 mix and react directly at the flame surface and/or the flame surface exists at the location of mixing between the fuel 70 and oxidant 68. In particular, the fuel 70 and oxidant 68 separately approach the flame surface (or diffusion boundary/interface), and then diffuse (e.g., via molecular and viscous diffusion) along the flame surface (or diffusion boundary/interface) to generate the diffusion flame. It is noteworthy that the fuel 70 and oxidant 68 may be at a substantially stoichiometric ratio along this flame surface (or diffusion boundary/interface), which may result in a greater flame temperature (e.g., a peak flame temperature) along this flame surface. The stoichiometric fuel/oxidant ratio generally results in a greater flame temperature (e.g., a peak flame temperature), as compared with a fuel-lean or fuel-rich fuel/oxidant ratio. As a result, the diffusion flame may be substantially more stable than a premix flame, because the diffusion of fuel 70 and oxidant 68 helps to maintain a stoichiometric ratio (and greater temperature) along the flame surface. Although greater flame temperatures can also lead to greater exhaust emissions, such as $NO_X$ emissions, the disclosed embodiments use one or more diluents to help control the temperature and emissions while still avoiding any premixing of the fuel 70 and oxidant 68. For example, the disclosed embodiments may introduce one or more diluents separate from the fuel 70 and oxidant 68 (e.g., after the point of combustion and/or downstream from the diffusion flame), thereby helping to reduce the temperature and reduce the emissions (e.g., $NO_X$ emissions) produced by the diffusion flame.

In operation, as illustrated, the compressor section 152 receives and compresses the exhaust gas 66 from the EG processing system 54, and outputs a compressed exhaust gas 170 to each of the combustors 160 in the combustor section 154. Upon combustion of the fuel 60, oxidant 68, and exhaust gas 170 within each combustor 160, additional exhaust gas or products of combustion 172 (i.e., combustion gas) is routed into the turbine section 156. Similar to the compressor section 152, the turbine section 156 includes one or more turbines or turbine stages 174, which may include a series of rotary turbine blades. These turbine blades are then driven by the products of combustion 172 generated in the combustor section 154, thereby driving rotation of a shaft 176 coupled to the machinery 106. Again, the machinery 106 may include a variety of equipment coupled to either end of the SEGR gas turbine system 52, such as machinery 106, 178 coupled to the turbine section 156 and/or machinery 106, 180 coupled to the compressor section 152. In certain embodiments, the machinery 106, 178, 180 may include one or more electrical generators, oxidant compressors for the oxidant 68, fuel pumps for the fuel 70, gear boxes, or additional drives (e.g. steam turbine 104, electrical motor, etc.) coupled to the SEGR gas turbine system 52. Non-limiting examples are discussed in further detail below with reference to TABLE 1. As illustrated, the turbine section 156 outputs the exhaust gas 60 to recirculate along the exhaust recirculation path 110 from an exhaust outlet 182 of the turbine section 156 to an exhaust inlet 184 into the compressor section 152. Along the exhaust recirculation path 110, the exhaust gas 60 passes through the EG processing system 54 (e.g., the HRSG 56 and/or the EGR system 58) as discussed in detail above.

Again, each combustor 160 in the combustor section 154 receives, mixes, and stoichiometrically combusts the compressed exhaust gas 170, the oxidant 68, and the fuel 70 to produce the additional exhaust gas or products of combustion 172 to drive the turbine section 156. In certain embodiments, the oxidant 68 is compressed by an oxidant compression system 186, such as a main oxidant compression (MOC) system (e.g., a main air compression (MAC) system) having one or more oxidant compressors (MOCs). The oxidant compression system 186 includes an oxidant compressor 188 coupled to a drive 190. For example, the drive 190 may include an electric motor, a combustion engine, an expansion turbine, or any combination thereof. In certain embodiments, the drive 190 may be a turbine engine, such as the gas turbine engine 150. Accordingly, the oxidant compression system 186 may be an integral part of the machinery 106. In other words, the compressor 188 may be directly or indirectly driven by the mechanical power 72 supplied by the shaft 176 of the gas turbine engine 150. In such an embodiment, the drive 190 may be excluded, because the compressor 188 relies on the power output from the turbine engine 150. However, in certain embodiments employing more than one oxidant compressor is employed, a first oxidant compressor (e.g., a low pressure (LP) oxidant compressor) may be driven by the drive 190 while the shaft 176 drives a second oxidant compressor (e.g., a high pressure (HP) oxidant compressor), or vice versa. For example, in another embodiment, the HP MOC is driven by the drive 190 and the LP oxidant compressor is driven by the shaft 176. In the illustrated embodiment, the oxidant compression system 186 is separate from the machinery 106. In each of these embodiments, the compression system 186 compresses and supplies the oxidant 68 to the fuel nozzles 164 and the combustors 160. Accordingly, some or all of the machinery 106, 178, 180 may be configured to increase the operational efficiency of the compression system 186 (e.g., the compressor 188 and/or additional compressors).

The variety of components of the machinery 106, indicated by element numbers 106A, 106B, 106C, 106D, 106E, and 106F, may be disposed along the line of the shaft 176 and/or parallel to the line of the shaft 176 in one or more series arrangements, parallel arrangements, or any combination of series and parallel arrangements. For example, the machinery 106, 178, 180 (e.g., 106A through 106F) may include any series and/or parallel arrangement, in any order, of: one or more gearboxes (e.g., parallel shaft, epicyclic gearboxes), one or more compressors (e.g., oxidant compressors, booster compressors such as EG booster compressors), one or more power generation units (e.g., electrical generators), one or more drives (e.g., steam turbine engines, electrical motors), heat exchange units (e.g., direct or indirect heat exchangers), clutches, or any combination thereof. The compressors may include axial compressors, radial or centrifugal compressors, or any combination thereof, each having one or more compression stages. Regarding the heat exchangers, direct heat exchangers may include spray coolers (e.g., spray intercoolers), which inject a liquid spray into a gas flow (e.g., oxidant flow) for direct cooling of the gas flow. Indirect heat exchangers may include at least one wall (e.g., a shell and tube heat exchanger) separating first and second flows, such as a fluid flow (e.g., oxidant flow) separated from a coolant flow (e.g., water, air, refrigerant, or any other liquid or gas coolant), wherein the coolant flow transfers heat from the fluid flow without any direct contact. Examples of indirect heat exchangers include intercooler heat exchangers and heat recovery units, such as heat recovery steam generators. The heat exchangers also may include heaters. As discussed in further detail below, each of these machinery components may be used in various combinations as indicated by the non-limiting examples set forth in TABLE 1.

Generally, the machinery 106, 178, 180 may be configured to increase the efficiency of the compression system 186 by, for example, adjusting operational speeds of one or more oxidant compressors in the system 186, facilitating compression of the oxidant 68 through cooling, and/or extraction of surplus power. The disclosed embodiments are intended to include any and all permutations of the foregoing components in the machinery 106, 178, 180 in series and parallel arrangements, wherein one, more than one, all, or none of the components derive power from the shaft 176. As illustrated below, TABLE 1 depicts some non-limiting examples of arrangements of the machinery 106, 178, 180 disposed proximate and/or coupled to the compressor and turbine sections 152, 156.

TABLE 1

| 106A | 106B | 106C | 106D | 106E | 106F |
|---|---|---|---|---|---|
| MOC | GEN | | | | |
| MOC | GBX | GEN | | | |
| LP MOC | HP MOC | GEN | | | |
| HP MOC | GBX | LP MOC | GEN | | |
| MOC | GBX | GEN | | | |
| MOC | | | | | |
| HP MOC | GBX | GEN | LP MOC | | |
| MOC | GBX | GEN | | | |
| MOC | GBX | DRV | | | |
| DRV | GBX | LP MOC | HP MOC | GBX | GEN |
| DRV | GBX | HP MOC | LP MOC | GEN | |
| HP | GBX | LP | GEN | | |
| MOC | CLR | MOC | | | |
| HP | GBX | LP | GBX | GEN | |
| MOC | CLR | MOC | | | |
| HP | GBX | LP | GEN | | |
| MOC | HTR STGN | MOC | | | |
| MOC | GEN | DRV | | | |
| MOC | DRV | GEN | | | |
| DRV | MOC | GEN | | | |
| DRV | CLU | MOC | GEN | | |
| DRV | CLU | MOC | GBX | GEN | |

As illustrated above in TABLE 1, a cooling unit is represented as CLR, a clutch is represented as CLU, a drive is represented by DRV, a gearbox is represented as GBX, a generator is represented by GEN, a heating unit is represented by HTR, a main oxidant compressor unit is represented by MOC, with low pressure and high pressure variants being represented as LP MOC and HP MOC, respectively, and a steam generator unit is represented as STGN. Although TABLE 1 illustrates the machinery 106, 178, 180 in sequence toward the compressor section 152 or the turbine section 156, TABLE 1 is also intended to cover the reverse sequence of the machinery 106, 178, 180. In TABLE 1, any cell including two or more components is intended to cover a parallel arrangement of the components. TABLE 1 is not intended to exclude any non-illustrated permutations of the machinery 106, 178, 180. These components of the machinery 106, 178, 180 may enable feedback control of temperature, pressure, and flow rate of the oxidant 68 sent to the gas turbine engine 150. As discussed in further detail below, the oxidant 68 and the fuel 70 may be supplied to the gas turbine engine 150 at locations specifically selected to facilitate isolation and extraction of the compressed exhaust gas 170 without any oxidant 68 or fuel 70 degrading the quality of the exhaust gas 170.

The EG supply system 78, as illustrated in FIG. 3, is disposed between the gas turbine engine 150 and the target systems (e.g., the hydrocarbon production system 12 and the other systems 84). In particular, the EG supply system 78, e.g., the EG extraction system (EGES) 80), may be coupled to the gas turbine engine 150 at one or more extraction points 76 along the compressor section 152, the combustor section 154, and/or the turbine section 156. For example, the extraction points 76 may be located between adjacent compressor stages, such as 2, 3, 4, 5, 6, 7, 8, 9, or 10 interstage extraction points 76 between compressor stages. Each of these interstage extraction points 76 provides a different temperature and pressure of the extracted exhaust gas 42. Similarly, the extraction points 76 may be located between adjacent turbine stages, such as 2, 3, 4, 5, 6, 7, 8, 9, or 10 interstage extraction points 76 between turbine stages. Each of these interstage extraction points 76 provides a different temperature and pressure of the extracted exhaust gas 42. By further example, the extraction points 76 may be located at a multitude of locations throughout the combustor section 154, which may provide different temperatures, pressures, flow rates, and gas compositions. Each of these extraction points 76 may include an EG extraction conduit, one or more valves, sensors, and controls, which may be used to selectively control the flow of the extracted exhaust gas 42 to the EG supply system 78.

The extracted exhaust gas 42, which is distributed by the EG supply system 78, has a controlled composition suitable for the target systems (e.g., the hydrocarbon production system 12 and the other systems 84). For example, at each of these extraction points 76, the exhaust gas 170 may be substantially isolated from injection points (or flows) of the oxidant 68 and the fuel 70. In other words, the EG supply system 78 may be specifically designed to extract the exhaust gas 170 from the gas turbine engine 150 without any added oxidant 68 or fuel 70. Furthermore, in view of the stoichiometric combustion in each of the combustors 160, the extracted exhaust gas 42 may be substantially free of oxygen and fuel. The EG supply system 78 may route the extracted exhaust gas 42 directly or indirectly to the hydrocarbon production system 12 and/or other systems 84 for use in various processes, such as enhanced oil recovery, carbon sequestration, storage, or transport to an offsite location. However, in certain embodiments, the EG supply system 78 includes the EG treatment system (EGTS) 82 for further treatment of the exhaust gas 42, prior to use with the target systems. For example, the EG treatment system 82 may purify and/or separate the exhaust gas 42 into one or more streams 95, such as the $CO_2$ rich, $N_2$ lean stream 96, the intermediate concentration $CO_2$, $N_2$ stream 97, and the $CO_2$ lean, $N_2$ rich stream 98. These treated exhaust gas streams 95 may be used individually, or in any combination, with the hydrocarbon production system 12 and the other systems 84 (e.g., the pipeline 86, the storage tank 88, and the carbon sequestration system 90).

Similar to the exhaust gas treatments performed in the EG supply system 78, the EG processing system 54 may include a plurality of exhaust gas (EG) treatment components 192, such as indicated by element numbers 194, 196, 198, 200, 202, 204, 206, 208, and 210. These EG treatment components 192 (e.g., 194 through 210) may be disposed along the exhaust recirculation path 110 in one or more series arrangements, parallel arrangements, or any combination of series and parallel arrangements. For example, the EG treatment components 192 (e.g., 194 through 210) may include any series and/or parallel arrangement, in any order, of: one or more heat exchangers (e.g., heat recovery units such as heat recovery steam generators, condensers, coolers, or heaters), catalyst systems (e.g., oxidation catalyst systems), particulate and/or water removal systems (e.g., inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, or any combination thereof. In certain embodiments, the catalyst systems may include an oxidation catalyst, a carbon monoxide reduction catalyst, a nitrogen oxides reduction catalyst, an aluminum oxide, a zirconium oxide, a silicone oxide, a titanium oxide, a platinum oxide, a palladium oxide, a cobalt oxide, or a mixed metal oxide, or a combination thereof. The disclosed embodiments are intended to include any and all permutations of the foregoing components 192 in series and parallel arrangements. As illustrated below, TABLE 2 depicts some non-limiting examples of arrangements of the components 192 along the exhaust recirculation path 110.

TABLE 2

| 194 | 196 | 198 | 200 | 202 | 204 | 206 | 208 | 210 |
|---|---|---|---|---|---|---|---|---|
| CU | HRU | BB | MRU | PRU | | | | |
| CU | HRU | HRU | BB | MRU | PRU | DIL | | |
| CU | HRSG | HRSG | BB | MRU | PRU | | | |
| OCU | HRU | OCU | HRU | OCU | BB | MRU | PRU | |
| HRU CU | HRU CU | BB | MRU | PRU | | | | |
| HRSG OCU | HRSG OCU | BB | MRU | PRU | DIL | | | |
| OCU | HRSG OCU | OCU | HRSG OCU | BB | MRU | PRU | DIL | |
| OCU | HRSG ST | HRSG ST | BB | COND | INER | WFIL | CFIL | DIL |
| OCU HRSG ST | OCU HRSG ST | BB | COND | INER | FIL | DIL | | |
| OCU | HRSG ST | HRSG ST | OCU | BB | MRU HE COND | MRU WFIL | PRU INER | PRU FIL CFIL |
| CU | HRU | HRU | HRU | BB | MRU | PRU | PRU | DIL |

TABLE 2-continued

| 194 | 196 | 198 | 200 | 202 | 204 | 206 | 208 | 210 |
|---|---|---|---|---|---|---|---|---|
|  | COND | COND | COND |  | HE COND WFIL | INER | FIL CFIL |  |

As illustrated above in TABLE 2, a catalyst unit is represented by CU, an oxidation catalyst unit is represented by OCU, a booster blower is represented by BB, a heat exchanger is represented by HX, a heat recovery unit is represented by HRU, a heat recovery steam generator is represented by HRSG, a condenser is represented by COND, a steam turbine is represented by ST, a particulate removal unit is represented by PRU, a moisture removal unit is represented by MRU, a filter is represented by FIL, a coalescing filter is represented by CFIL, a water impermeable filter is represented by WFIL, an inertial separator is represented by INER, and a diluent supply system (e.g., steam, nitrogen, or other inert gas) is represented by DIL. Although TABLE 2 illustrates the components 192 in sequence from the exhaust outlet 182 of the turbine section 156 toward the exhaust inlet 184 of the compressor section 152, TABLE 2 is also intended to cover the reverse sequence of the illustrated components 192. In TABLE 2, any cell including two or more components is intended to cover an integrated unit with the components, a parallel arrangement of the components, or any combination thereof. Furthermore, in context of TABLE 2, the HRU, the HRSG, and the COND are examples of the HE; the HRSG is an example of the HRU; the COND, WFIL, and CFIL are examples of the WRU; the INER, FIL, WFIL, and CFIL are examples of the PRU; and the WFIL and CFIL are examples of the FIL. Again, TABLE 2 is not intended to exclude any non-illustrated permutations of the components 192. In certain embodiments, the illustrated components 192 (e.g., 194 through 210) may be partially or completed integrated within the HRSG 56, the EGR system 58, or any combination thereof. These EG treatment components 192 may enable feedback control of temperature, pressure, flow rate, and gas composition, while also removing moisture and particulates from the exhaust gas 60. Furthermore, the treated exhaust gas 60 may be extracted at one or more extraction points 76 for use in the EG supply system 78 and/or recirculated to the exhaust inlet 184 of the compressor section 152.

As the treated, recirculated exhaust gas 66 passes through the compressor section 152, the SEGR gas turbine system 52 may bleed off a portion of the compressed exhaust gas along one or more lines 212 (e.g., bleed conduits or bypass conduits). Each line 212 may route the exhaust gas into one or more heat exchangers 214 (e.g., cooling units), thereby cooling the exhaust gas for recirculation back into the SEGR gas turbine system 52. For example, after passing through the heat exchanger 214, a portion of the cooled exhaust gas may be routed to the turbine section 156 along line 212 for cooling and/or sealing of the turbine casing, turbine shrouds, bearings, and other components. In such an embodiment, the SEGR gas turbine system 52 does not route any oxidant 68 (or other potential contaminants) through the turbine section 156 for cooling and/or sealing purposes, and thus any leakage of the cooled exhaust gas will not contaminate the hot products of combustion (e.g., working exhaust gas) flowing through and driving the turbine stages of the turbine section 156. By further example, after passing through the heat exchanger 214, a portion of the cooled exhaust gas may be routed along line 216 (e.g., return conduit) to an upstream compressor stage of the compressor section 152, thereby improving the efficiency of compression by the compressor section 152. In such an embodiment, the heat exchanger 214 may be configured as an interstage cooling unit for the compressor section 152. In this manner, the cooled exhaust gas helps to increase the operational efficiency of the SEGR gas turbine system 52, while simultaneously helping to maintain the purity of the exhaust gas (e.g., substantially free of oxidant and fuel).

Figure 4:
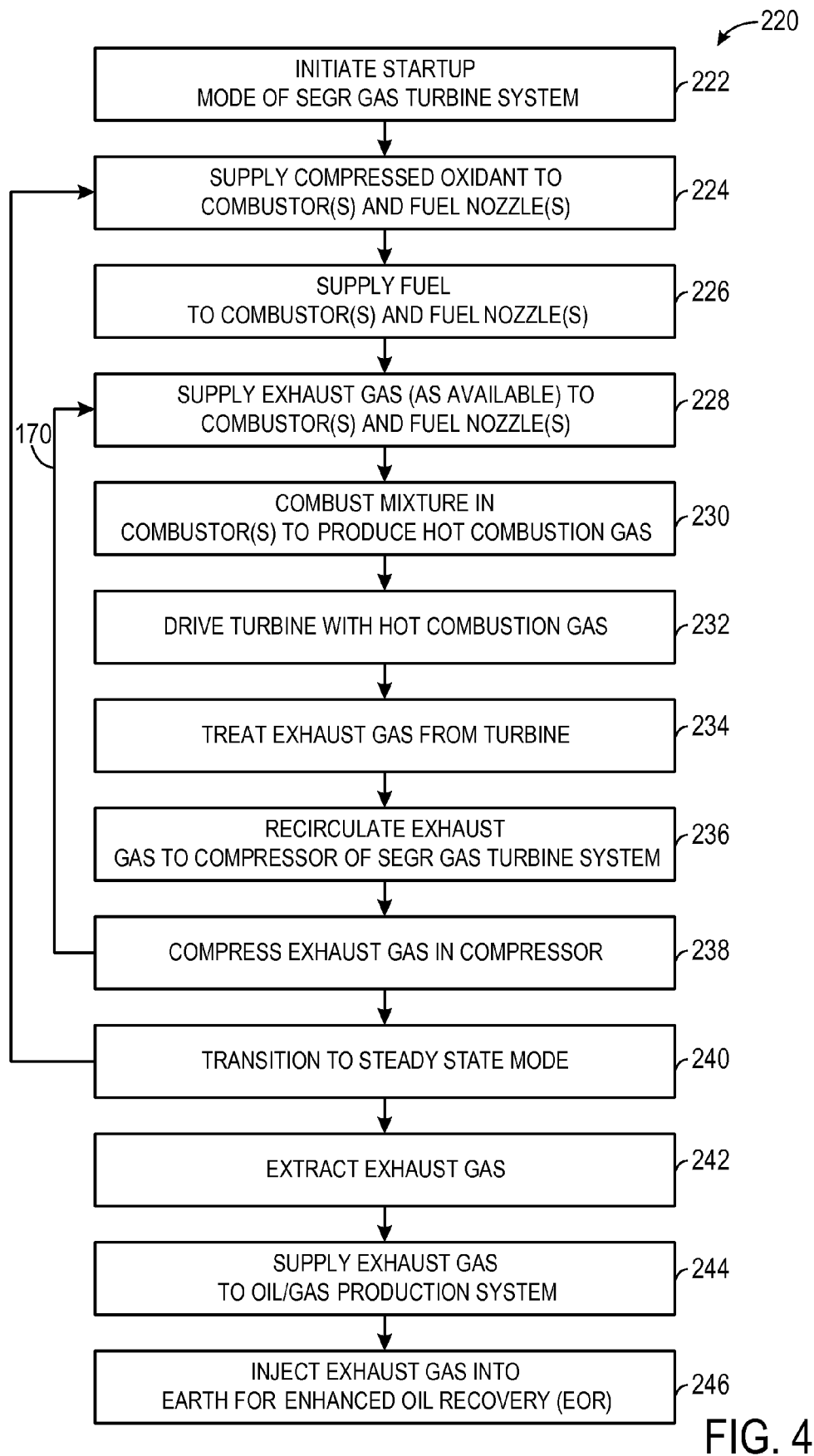
FIG. 4 is a flow chart of an embodiment of a process for operating the system of FIGS. 1-3.

FIG. 4 is a flow chart of an embodiment of an operational process 220 of the system 10 illustrated in FIGS. 1-3. In certain embodiments, the process 220 may be a computer implemented process, which accesses one or more instructions stored on the memory 122 and executes the instructions on the processor 120 of the controller 118 shown in FIG. 2. For example, each step in the process 220 may include instructions executable by the controller 118 of the control system 100 described with reference to FIG. 2.

The process 220 may begin by initiating a startup mode of the SEGR gas turbine system 52 of FIGS. 1-3, as indicated by block 222. For example, the startup mode may involve a gradual ramp up of the SEGR gas turbine system 52 to maintain thermal gradients, vibration, and clearance (e.g., between rotating and stationary parts) within acceptable thresholds. For example, during the startup mode 222, the process 220 may begin to supply a compressed oxidant 68 to the combustors 160 and the fuel nozzles 164 of the combustor section 154, as indicated by block 224. In certain embodiments, the compressed oxidant may include a compressed air, oxygen, oxygen-enriched air, oxygen-reduced air, oxygen-nitrogen mixtures, or any combination thereof. For example, the oxidant 68 may be compressed by the oxidant compression system 186 illustrated in FIG. 3. The process 220 also may begin to supply fuel to the combustors 160 and the fuel nozzles 164 during the startup mode 222, as indicated by block 226. During the startup mode 222, the process 220 also may begin to supply exhaust gas (as available) to the combustors 160 and the fuel nozzles 164, as indicated by block 228. For example, the fuel nozzles 164 may produce one or more diffusion flames, premix flames, or a combination of diffusion and premix flames. During the startup mode 222, the exhaust gas 60 being generated by the gas turbine engine 156 may be insufficient or unstable in quantity and/or quality. Accordingly, during the startup mode, the process 220 may supply the exhaust gas 66 from one or more storage units (e.g., storage tank 88), the pipeline 86, other SEGR gas turbine systems 52, or other exhaust gas sources.

The process 220 may then combust a mixture of the compressed oxidant, fuel, and exhaust gas in the combustors 160 to produce hot combustion gas 172, as indicated by block 230 by the one or more diffusion flames, premix flames, or a combination of diffusion and premix flames. In particular, the process 220 may be controlled by the control system 100 of FIG. 2 to facilitate stoichiometric combustion (e.g., stoichiometric diffusion combustion, premix combustion, or both) of the mixture in the combustors 160 of the combustor section 154. However, during the startup mode 222, it may be particularly difficult to maintain stoichiometric combustion of the mixture (and thus low levels of oxidant and unburnt fuel may be present in the hot combustion gas 172). As a result, in the startup mode 222, the hot combustion gas 172 may have greater amounts of residual oxidant 68 and/or fuel 70 than during a steady state mode as discussed in further detail below. For this reason, the process 220 may execute one or more control instructions to reduce or eliminate the residual oxidant 68 and/or fuel 70 in the hot combustion gas 172 during the startup mode.

The process 220 then drives the turbine section 156 with the hot combustion gas 172, as indicated by block 232. For example, the hot combustion gas 172 may drive one or more turbine stages 174 disposed within the turbine section 156. Downstream of the turbine section 156, the process 220 may treat the exhaust gas 60 from the final turbine stage 174, as indicated by block 234. For example, the exhaust gas treatment 234 may include filtration, catalytic reaction of any residual oxidant 68 and/or fuel 70, chemical treatment, heat recovery with the HRSG 56, and so forth. The process 220 may also recirculate at least some of the exhaust gas 60 back to the compressor section 152 of the SEGR gas turbine system 52, as indicated by block 236. For example, the exhaust gas recirculation 236 may involve passage through the exhaust recirculation path 110 having the EG processing system 54 as illustrated in FIGS. 1-3.

In turn, the recirculated exhaust gas 66 may be compressed in the compressor section 152, as indicated by block 238. For example, the SEGR gas turbine system 52 may sequentially compress the recirculated exhaust gas 66 in one or more compressor stages 158 of the compressor section 152. Subsequently, the compressed exhaust gas 170 may be supplied to the combustors 160 and fuel nozzles 164, as indicated by block 228. Steps 230, 232, 234, 236, and 238 may then repeat, until the process 220 eventually transitions to a steady state mode, as indicated by block 240. Upon the transition 240, the process 220 may continue to perform the steps 224 through 238, but may also begin to extract the exhaust gas 42 via the EG supply system 78, as indicated by block 242. For example, the exhaust gas 42 may be extracted from one or more extraction points 76 along the compressor section 152, the combustor section 154, and the turbine section 156 as indicated in FIG. 3. In turn, the process 220 may supply the extracted exhaust gas 42 from the EG supply system 78 to the hydrocarbon production system 12, as indicated by block 244. The hydrocarbon production system 12 may then inject the exhaust gas 42 into the earth 32 for enhanced oil recovery, as indicated by block 246. For example, the extracted exhaust gas 42 may be used by the exhaust gas injection EOR system 112 of the EOR system 18 illustrated in FIGS. 1-3.

As noted above, it may be particularly difficult to maintain stoichiometric combustion (or combustion at a predetermined equivalence ratio), such as a stoichiometric equivalence ratio of approximately 1.0 or 0.90 to 1.10 due to complexities in monitoring and controlling a ratio of the fuel 70 and the oxidant 68. For example, variations in the composition of the fuel 70 and oxidant 68, variations in flow rates of the fuel 70 and oxidant 68, or other such variations can lead to non-stoichiometric combustion, or combustion at an equivalence ratio that deviates from a set value. Again, this may result in residual oxidant 68 and/or fuel in the hot combustion gas 172, which may be undesirable in certain downstream processes.

In accordance with present embodiments, as set forth above, the control system 100, in performing the process 220, may execute one or more control routines to enable combustion at desired fuel/oxidant equivalence ratios in the combustor 160. In one control routine, the control system 100 may receive information relating to flow rates and/or compositions of the oxidant 68 and/or the fuel 70, and the control system 100 may utilize feed forward control based on all or a portion of this information to adjust a flow of the fuel 70 and/or the oxidant 68 to the combustor 160. In another control routine, the control system 100 may receive information relating to flow rates and/or compositions of the exhaust 60, 66, and the control system 100 may utilize feedback control based on all or a portion of this information to adjust a flow of the fuel 70 and/or the oxidant 68 to the combustor 160. Some embodiments may utilize a control routine with both feed forward control and feedback control based on all or a portion of the information to adjust a flow of the fuel 70 and/or the oxidant 68 to the combustor 160. In certain of these embodiments, the control system 100 may utilize model-based analyses to determine the feedback control. As discussed in detail below and illustrated in FIG. 5, the flow rates of the fuel 70 and/or the oxidant 68 may be determined via a distributed flow measurement system 320 having multiple pressure taps 259 in fuel passages and oxidant passages coupled to each combustor 160. The pressure taps 259 may provide pressure signals to the controller 118 as feedback, and the controller 118 may determine the flow rate of the respective fluid based at least in part on the pressure signals. In some embodiments, the controller 118 may utilize equations, computer models, look-up tables, graphs, historical data, trend data, fleet data, or any combination thereof to determine the flow rate of the respective fluid.

Figure 5:
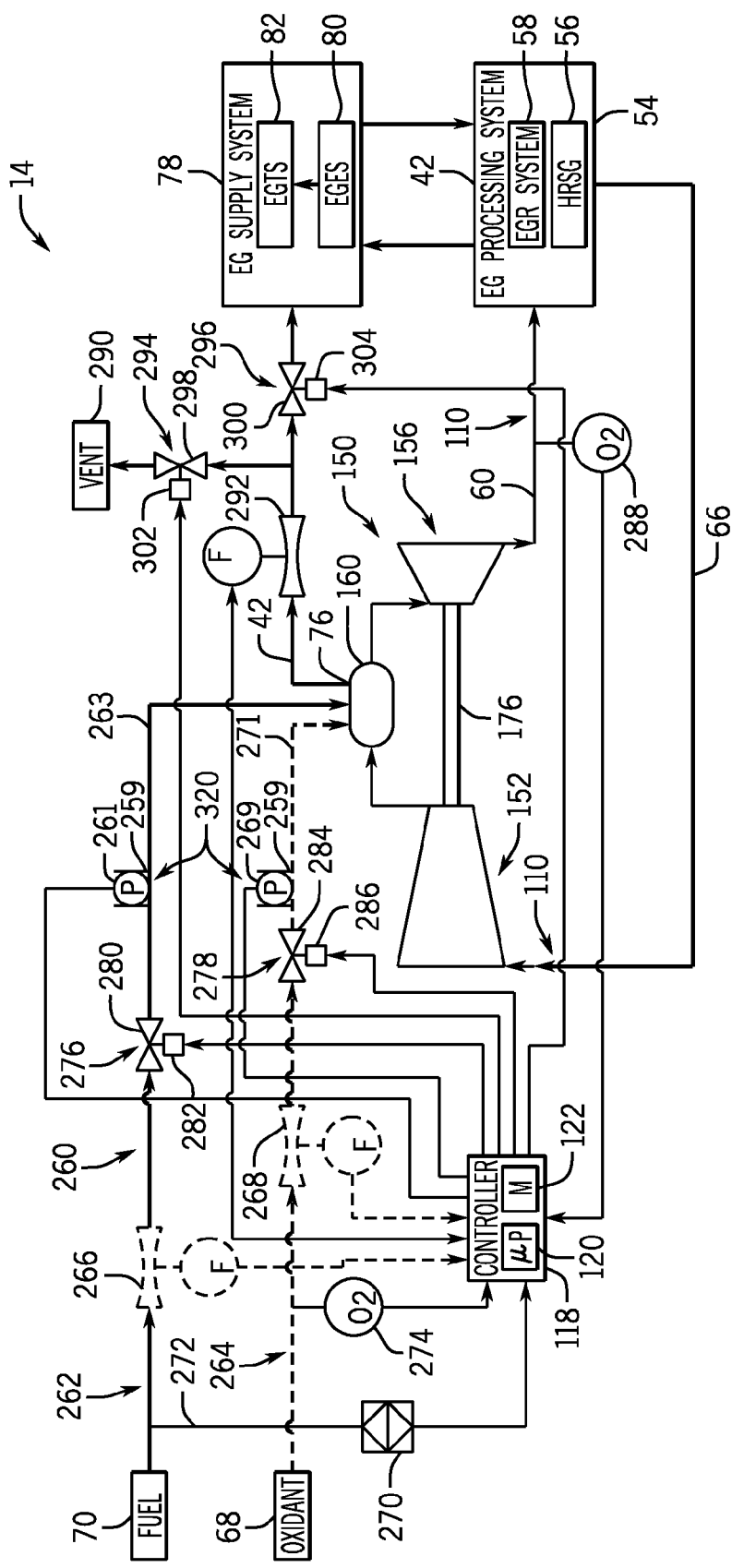
FIG. 5 is a diagram of an embodiment of the system of FIGS. 1-3, further illustrating a control system and sensing systems for fuel and oxidant flows.

The control routines noted above may be used together. That is, in certain embodiments, the control system 100 may utilize both feed forward and feedback control. One embodiment of the control system 100 and examples of associated analysis features suitable for performing such control routines are illustrated diagrammatically in FIG. 5. In particular, FIG. 5 depicts an embodiment of the turbine-based service system 14 having the gas turbine engine 150, the EG supply system 78, the EG processing system 54, and an equivalence control system 260 having the controller 118 and a number of sensing features, which are discussed in detail below.

In general, the equivalence control system 260 is configured to control flows of the oxidant 68 and/or the fuel 70 to enable stoichiometric combustion, or combustion at a predetermined equivalence ratio (e.g., approximately 0.90 to 1.10, 0.95 to 1.05, or about 1.0), of the oxidant 68 and the fuel 70 in the combustor 160 to provide substantially stoichiometric combustion. For example, the equivalence control system 260 may adjust a flow of the fuel 70 along a fuel supply path 262, a flow of the oxidant 68 along an oxidant supply path 264, or a combination thereof, in response to information related to the flow of the fuel 70, the flow of the oxidant 68, and operating conditions within the combustor 160. The information relating to the operating conditions may include data indicative of the combustion dynamics in the combustor 160, such as an actual fuel-to-oxidant ratio of combustion within the combustor 160. In response to this information, the equivalence control system 260, and more particularly the controller 118, may adjust either or both of the flows of the fuel 70 and/or oxidant 68 along their respective supply paths 262, 264 to move the dynamics toward a predetermined equivalence ratio or a fuel-to-oxidant ratio (e.g., a stoichiometric fuel-to-oxidant ratio), which may be used as a set point. Again, the routines performed by the controller 118 may include either or both of a feed forward or feedback mechanism. In embodiments where both are utilized for control, the control may be considered to have a feedback component and a feed forward component. The feed forward component may be utilized to establish a baseline, or coarse, flow rate for the fuel 70 along the fuel supply path 262, while the feedback component may be utilized to refine the flow rate of the fuel 70 by accounting for drift or other flow variations. Additionally or alternatively, a flow rate of the oxidant 68 may be adjusted according to these mechanisms.

In accordance with the present disclosure, the feed forward component of the control performed by the controller 118 is enabled by the analysis of at least fuel composition, and oxidant composition, and in certain embodiments, in addition to the composition information, flow rates for the fuel 70 and/or oxidant 68, ambient temperature, humidity, and so forth, which may be provided intermittently, at regular intervals, or substantially continuously to the controller 118. Rather than utilizing a fuel flow meter 266 to measure or otherwise determine a flow rate of the fuel 70 flowing along the fuel supply path 262, the equivalence control system 260 includes a fuel pressure sensor 261 in a pressure tap 259 along the fuel supply path 262 to the combustor 160. The fuel pressure sensor 261 is configured to supply a fuel pressure signal to the controller 118 based at least in part on the pressure of the fuel 70 along a fuel passage 263 of the fuel supply path 262, and the controller 118 may determine the flow rate of the fuel 70 along the respective fuel passage 263 based at least in part on the pressure of the fuel 70. In some embodiments, the fuel supply path 262 has multiple fuel passages 263, such as one or more fuel passages 263 for each fuel nozzle of the combustor 160, and each fuel passage 263 has a pressure tap 259 and fuel pressure sensor 261. The gas turbine engine 150 may include one or more combustors 160 (e.g., 1, 2, 3, 4, 5, 6, 7, 8, 9, 10, or more), and the fuel supply path 262 for each combustor 160 may include multiple fuel passages 263. As an example, the gas turbine engine 150 may include six combustors 160, the fuel supply path 262 for each combustor 160 may have seven fuel passages 263, the gas turbine engine 150 may include forty-two or more fuel passages 263, and each fuel passage 263 may include a fuel pressure sensor 261. In some embodiments, the combustor 160 is an annular combustor. In an annular combustor, fuel nozzles receiving fuel from the fuel passages 263 may be arranged within an annular combustion chamber.

Presently contemplated embodiments may include embodiments where each combustor 160 has any number (e.g., 1, 2, 3, or more) of separately supplied and/or separately controlled fuel passages 263. For example, a fuel nozzle of a combustor 160 may have a primary fuel passage 263 with a primary fuel pressure sensor 261 and a secondary fuel passage 263 with a secondary fuel pressure sensor 261. The fuel pressure sensors 261 may be internal (e.g., within a head end or a fuel nozzle) or external to each combustor 160.

Similarly, rather than utilizing an oxidant flow meter 268 to measure or otherwise determine a flow rate of the oxidant 68 flowing along the oxidant supply path 264, the equivalence control system 260 includes an oxidant pressure sensor 269 in a pressure tap 259 along the oxidant supply path 264 to the combustor 160. The oxidant pressure sensor 269 is configured to supply an oxidant pressure signal to the controller 118 based at least in part on the pressure of the oxidant 68 along an oxidant passage 271 of the oxidant supply path 264, and the controller 118 may determine the flow rate of the oxidant 68 along the respective oxidant passage 271 based at least in part on the pressure of the oxidant 68. In some embodiments, the oxidant supply path 264 has multiple oxidant passages 271, and each oxidant passage 271 has a pressure tap 259 and an oxidant pressure sensor 269. In some embodiments, each fuel nozzle of the combustor 160 may have one or more oxidant passages 271, and each oxidant passage 271 has a pressure tap 259 and an oxidant pressure sensor 269. The oxidant supply path 264 to each combustor 160 of the gas turbine engine 150 may include one or more oxidant passages 271, and each oxidant passage 271 may have a respective oxidant pressure sensor 269.

The fuel pressure sensors 261 and the oxidant pressure sensors 269, as illustrated, are communicatively coupled to the controller 118, and may provide, intermittently, at regular intervals, or substantially continuously, feedback indicative of the respective pressures of the fuel 70 and the oxidant 68, or may provide the actual pressure values. For example, the controller 118 may receive pressure data, and may determine the flow rate based on the received pressure data. Accordingly, in certain embodiments, the controller 118 may include code stored on the memory 122 for performing calculations on the raw data to determine their associated flow rates. In other embodiments, the controller 118 may receive the actual pressures from the fuel pressure sensors 261 and/or the oxidant pressure sensors 269, and may use this data according to the algorithms/routines discussed below.

As noted above, the controller 118 also utilizes composition information to generate the feed forward component. In accordance with an embodiment, a fuel analysis system 270 may determine composition information related to the fuel 70. For example, the fuel analysis system 270 may determine a concentration of, or relative amounts of, combustible components within the fuel 70, which may include but are not limited to CO, $H_2$, and methane ($CH_4$). Accordingly, the fuel analysis system 270 may include one or more analysis features capable of separating, detecting, and/or analyzing such components. For example, the fuel analysis system 270 may include any one or a combination of a gas chromatograph, a high performance liquid chromatograph, an infrared spectrometer, an ultraviolet/visible spectrometer, a fluorometer, a mass spectrometer, a nuclear magnetic resonance (NMR) spectrometer, an electron spin resonance (ESR) spectrometer, an atomic absorption unit, or the like. In some embodiments, the fuel analysis system 270 may include a CO sensor, an $H_2$ sensor, a $CH_4$ sensor, or similar sensors.

While the fuel analysis system 270 may be suitably positioned at any point along the fuel supply path 262, in the illustrated embodiment, the fuel analysis system 270 is configured to receive a slip stream 272 of the fuel 70 from the fuel supply path 262. That is, in the illustrated embodiment, the slip stream 272 is provided along a path diverging from the fuel supply path 262 to the fuel analysis system 270. During operation, the fuel analysis system 270 analyzes the fuel 70, such as for CO, $H_2$, and $CH_4$ concentrations, and sends the fuel composition information, intermittently, at regular intervals, or substantially continuously, to the controller 118. In other embodiments, the fuel analysis system 270 may provide, intermittently, at regular intervals, or substantially continuously, raw data (e.g., detector signals) to the controller 118, which may include code for analyzing the data.

The controller 118 also utilizes oxidant composition information for determining the feed forward component. As noted above, the oxidant 68 will generally include compressed ambient air, compressed oxygen-enriched air, compressed oxygen-depleted air, oxygen, or similar oxidant flow. Because the oxidizing agent generally utilized during the combustion process includes oxygen ($O_2$), the equivalence control system 270, as illustrated, includes an oxygen sensor 274 disposed along the oxidant supply path 264. The oxygen sensor 274 may include any suitable sensor capable of measuring/detecting an amount of oxygen in the flow of the oxidant 68. Such sensors include, but are not limited to, zirconia-based, electrochemical-based, infrared-based, ultrasonic-based, and laser-based oxygen sensors. The oxygen sensor 274 is communicatively coupled to the controller 118 to provide, intermittently, at regular intervals, or substantially continuously, feedback indicative of the amount of $O_2$ in the oxidant 68 flowing through the oxidant supply path 264. In certain embodiments, the amount of $O_2$ in the oxidant 68 may be assumed or estimated, with the amount assumed or estimated depending on the source of the oxidant 68 (e.g., ambient air, oxygen-enriched or oxygen-depleted air).

Although illustrated as having only one fuel analysis system 270 and one oxygen sensor 274, the equivalence control system 260 may have more than one of each, such as two, three, four, five, or more of each. Indeed, any number of such sensors is presently contemplated. Furthermore, the positioning of the fuel analysis system 270 and the oxygen sensor 274 is not limited to their illustrated positions. For example, the fuel analysis system 270 may be positioned at any point along the fuel supply path 262, and the oxygen sensor 274 may be positioned at any point along the oxidant supply path 264. Further, as noted above, in certain embodiments the oxygen sensor 274 may not be positioned along the oxidant supply path 264 and may receive a slip stream of the oxidant 68 for analysis.

Again, the feed forward component of the control actions performed by the controller 118 may result in an adjustment to the flow rate of the fuel 70 along the fuel supply path 262 and/or an adjustment to the flow rate of the oxidant 68 along the oxidant supply path 264. Accordingly, in addition to the sensing features discussed above, the controller 118 is also communicatively coupled to one or more fuel flow control systems 276 and to one or more oxidant flow control systems 278. The fuel flow control system 276, as illustrated, includes at least a fuel flow control valve 280 and a fuel flow control valve actuator 282. Each fuel flow control valve 280 is disposed along the fuel supply path 262, and is configured stop, start, reduce, or increase a flow of the fuel 70 along one or more fuel passages 263 coupled to the respective combustor 160, depending on the position of the respective fuel flow control valve 280 relative to the fuel supply path 262. The position of the respective fuel flow control valve 280 is adjusted by the fuel flow control valve actuator 282, which may be a servo motor or similar motive device (e.g., a stepper motor). In such embodiments, the fuel flow control valve actuator 282 may include a servo positioning system, such as a local processing device configured to receive control signals from the controller 118 and, as a result of the control signals, cause the fuel flow control valve actuator 282 to actuate the fuel flow control valve 280 accordingly. In other embodiments, such as when the fuel flow control system 276 does not process data or determine appropriate servo positioning based on the control signals, the controller 118 may determine the proper servo positioning, and may send an appropriate control signal to the flow control valve actuator 282 to adjust its position. Indeed, in certain embodiments, the controller 118 may include one or more servo positioning modules each configured to provide an appropriate signal to the flow control systems disclosed herein to adjust their respective positions to attain a desired level of flow.

Similarly, the oxidant flow control system 278, as illustrated, includes an oxidant flow control device 284 and an oxidant flow control valve actuator 286. The oxidant flow control device 284 may include, but is not limited to, a flow control valve, a speed governor on the oxidant compressor, variable stator vanes on the oxidant compressor, or one or more bypass valves on the oxidant compressor discharge, or any combination thereof. Each oxidant flow control device 284 is disposed along the oxidant supply path 264, and is configured stop, start, reduce, or increase a flow of the oxidant 68 along the oxidant supply path 264, depending on the position of the respective oxidant flow control device 284 relative to the oxidant supply path 264. The position of the respective oxidant flow control device 284 is adjusted by the oxidant flow control valve actuator 286, which may be a servo motor or similar motive device. In such embodiments, the oxidant flow control valve actuator 286 may include a servo positioning system, such as a local processing device configured to receive control signals from the controller 118 and, as a result of the control signals, cause the oxidant flow control valve actuator 286 to actuate the oxidant flow control device 284 accordingly. In other embodiments, such as when the oxidant flow control system 278 does not process data or determine appropriate servo positioning based on the control signals, the controller 118 may determine the proper servo positioning, and may send an appropriate control signal to the oxidant control valve actuator 286 to adjust its position.

Again, the controller 118 receives the information noted above (e.g., intermittently, at regular intervals, or substantially continuously), including fuel composition and pressure or flow information, oxidant composition and pressure or information, ambient conditions (e.g., temperature, humidity), temperature information about the fuel 70 and/or oxidant 68, or any combination thereof, to generate a feed forward component of control to adjust a flow of the fuel 70 and/or the oxidant 68 to the combustor 160 and/or individual fuel nozzles in the combustor 160. For example, if the fuel composition changes (e.g., due to variations in fuel feedstock used to generate the fuel), if the oxidant flow changes (e.g., due to operational variability in the main oxidant compressor), or the like, the controller 118 may send control signals to either or both of the fuel flow control system 276 and the oxidant flow control system 278 to adjust a flow of the fuel 70 and the oxidant 68. However, as noted above, in addition to such feed forward control, the controller 118 may also perform feedback control, in which the controller 118 adjusts either or both of the fuel and/or oxidant flows to the combustor 160 as a result of feedback indicative of the combustion process occurring within the combustor 160.

For example, as depicted, the equivalence control system 260 also includes an exhaust oxygen sensor 288 disposed along the exhaust recirculation path 110, which may include a flow path through the compressor section 152, the combustor section 154, the turbine section 156 (FIG. 3), and the EG processing system 54. The exhaust oxygen sensor 288 is configured to determine an amount (e.g., a concentration in mass, volume, and/or moles) of oxygen within the exhaust gas 60, and is communicatively coupled to the controller 118 so as to provide this compositional information to the controller 118. While illustrated as disposed along the exhaust recirculation path 110, the exhaust oxygen sensor 288, or another exhaust oxygen sensor 288, may not be positioned along the exhaust recirculation path 110 but may receive a slip stream of the exhaust gas 60 from the exhaust recirculation path 110 to determine the amount of oxygen in the exhaust gas 60. Furthermore, one or more exhaust oxygen sensors may be positioned at one or more of the extraction points 76 (FIG. 3). Indeed, in some embodiments, it may be desirable to sense the exhaust gas composition of the exhaust gas 60 being provided to the compressor section 152, because the composition of the exhaust gas 60 may impact the combustion dynamics and the products of combustion.

The compositional information relating to the exhaust gas 60 is not limited to the oxygen content of the exhaust gas 60. Rather, the compositional information relating to the exhaust gas 60 may include information relating to unburnt fuel, $O_2$, CO, $CO_2$, $H_2$, $CH_4$, $NO_X$, water, or other components, within the exhaust gas 60. Accordingly, the equivalence control system 260 may include any one or a combination of sensors capable of detecting unburnt fuel, $O_2$, CO, $CO_2$, $H_2$, $CH_4$, water, $NO_X$, or similar combustion/partial combustion products. In addition, because it may be desirable to provide accurate information relating to these potential products of combustion, the sensors (e.g., the exhaust oxygen sensor 288) may be positioned along the exhaust recirculation path 110 between the turbine section 156 and the EG processing system 52, such as before the exhaust gas 60 passes through catalyst treatment, where certain components (e.g., CO, $H_2$, $O_2$, $NO_X$) may be removed from the exhaust gas 60.

As discussed in detail below, the controller 118 may utilize the compositional information obtained relating to the exhaust gas 60, and may generate a feedback component of control for adjusting, when appropriate, the flow of the fuel 70 through the fuel supply path 262 and/or the flow of the oxidant 68 along the oxidant supply path 264 to adjust the ratio of fuel 70 to oxidant 68, for example to adjust the equivalence ratio to achieve stoichiometric combustion. Additionally or alternatively, the controller 118 may utilize model-based control in which the outputs of the sensors are used as inputs to a model that generates an input for the controller 118. Example models include physics-based models, computational fluid dynamics (CFD) models, or finite element analysis (FEA) models. Models may also include artificial intelligence (AI) models, such as expert systems (e.g. forward chained expert systems, backward chained expert systems), neural networks, fuzzy logic systems, state vector machines (SVMs), inductive reasoning systems, Bayesian inference systems, or a combination thereof.

In certain embodiments, the controller 118 may maintain the oxidant flow at a predetermined rate not to achieve stoichiometric combustion, but to control loading on the gas turbine engine 150. In some embodiments, the controller 118 may adjust the flow of the fuel 70 to maintain the desired equivalence ratio, such as an equivalence ratio of approximately 1.0 or between 0.90 to 1.10 to provide substantially stoichiometric combustion, or an equivalence ratio greater or lesser than 1.0 to provide lean or rich operation. Given that the oxidant flow may be controlled by varying various compressor components (e.g., inlet guide vanes), the response by such components to change the oxidant flow may be relatively slow (e.g., between 3 and 5 seconds). This may not be suitable for responding to rapid changes in composition. The flow of the fuel 70, however, may be more rapidly adjusted by moving flow control valves in the manner discussed in detail below. Indeed, adjusting the flow of the fuel 70 may more rapidly address various changes in the composition of the oxidant 68 and/or fuel 70, and/or changes in the flow of the oxidant 68. While changing only the flow of the fuel 70 to maintain stoichiometric combustion (or any suitable equivalence ratio) may be desirable for at least these reasons, the present disclosure is not limited to such operation. In other words, the flow of the oxidant 68 may, in addition to or in lieu of adjusting fuel flow, be changed to maintain stoichiometric combustion (e.g., an equivalence ratio of between approximately 0.90 to 1.10, between 0.95 to 1.05, or about 1.0), or combustion at another target equivalence ratio for either fuel-rich or fuel-lean combustion.

In addition to or in lieu of adjusting the flow of the fuel 70 and/or oxidant 68, the controller 118 may adjust a flow of the exhaust 42 that is extracted from the combustor 160. In particular, in some embodiments, the controller 118 is configured to adjust a flow of the exhaust gas 42 extracted via one or more of the extraction points 76 for provision to the EG supply system 78 and/or as a vent 290. The vent 290, in some embodiments, may be used for pressure relief or to control an amount of exhaust gas diluent within the combustor 160. For example, the flow of the exhaust gas 42 may also be adjusted to control the temperature of combustion within the combustor 160, such as to mitigate less desirable products of combustion (e.g., $NO_X$).

As depicted, the controller 118 may monitor a flow rate of the exhaust 42 flowing from the one or more extraction points 76 from the combustor 160 to the vent 290 and/or the EG supply system 78. In particular, the controller 118 may monitor the flow rate of the exhaust 42 using an exhaust flow meter 292 and/or pressure sensors, and may control the flow of the exhaust 42 from the combustor 160 to the vent 290 using a first exhaust extraction flow control system 294 and the flow of the exhaust 42 to the EG supply system 78 using a second exhaust extraction flow control system 296. The exhaust flow meter 292 may be any suitable flow meter, including but not limited to, thermal mass flow meters, Coriolis mass flow meters, mass flow controllers, rotary piston meters, gear meters, Venturi meters, orifice plate meters, dall tube meters, Pitot tube meters, multi-hole pressure probe meters, cone meters, optical flow meters, electromagnetic flow meters, or ultrasonic flow meters. Additionally, the controller 118 may receive raw data (e.g., pressure or mechanical displacement data), or may receive data that has been pre-processed as flow data.

The first and second exhaust extraction flow control systems 294, 296 each include respective flow control valves 298, 300 and respective valve actuators 302, 304. As discussed above with respect to the fuel and oxidant flow control systems 276, 278, the respective valve actuators 302, 304 may be any suitable displacement devices, such as servo or stepping motors, and may position the respective flow control valves 298, 300 according to control input from the controller 118. Again, the respective valve actuators 302, 304 may include processing devices, such as servo controllers, or may simply receive electrical signals (e.g., current, voltage) that cause displacement to a degree sufficient to enable a desired flow of the exhaust 42 to each of the vent 290 or the EG supply system 78. In accordance with an embodiment, the controller 118 may control the first and second exhaust extraction flow control systems 294, 296 independent of one another to provide a desired amount of exhaust gas 42 for use as a diluent in the combustor 160, and to provide a desired amount of the exhaust gas 42 to various downstream processes. Again, controlling the amount of exhaust gas 42 for use as the diluent in the combustor 160 may help control (e.g., reduce) the temperature of combustion and concomitant NO$_X$ production when operating at stoichiometric conditions, as such conditions may have a relatively high flame temperature compared to non-stoichiometric combustion conditions.

As noted above, the controller 118 may be configured to control flows of the fuel 70 and/or the oxidant 68 along the fuel supply path 262 and/or the oxidant supply path 264, respectively, using a feed forward control component, a feedback control component, or a combination thereof. In particular, the controller 118, as discussed above with respect to FIG. 2, includes the processor 120 and the memory 122, wherein the processor 120 may include one or more processing devices, and the memory 122 may include one or more tangible, non-transitory, machine-readable media collectively storing instructions (e.g., routines) executable by the processor 120 to perform the analysis and control actions described herein. In an embodiment, the one or more sets of instructions may be performed to generate the feed forward control component, the feedback control component, or combination thereof.

Figure 6:
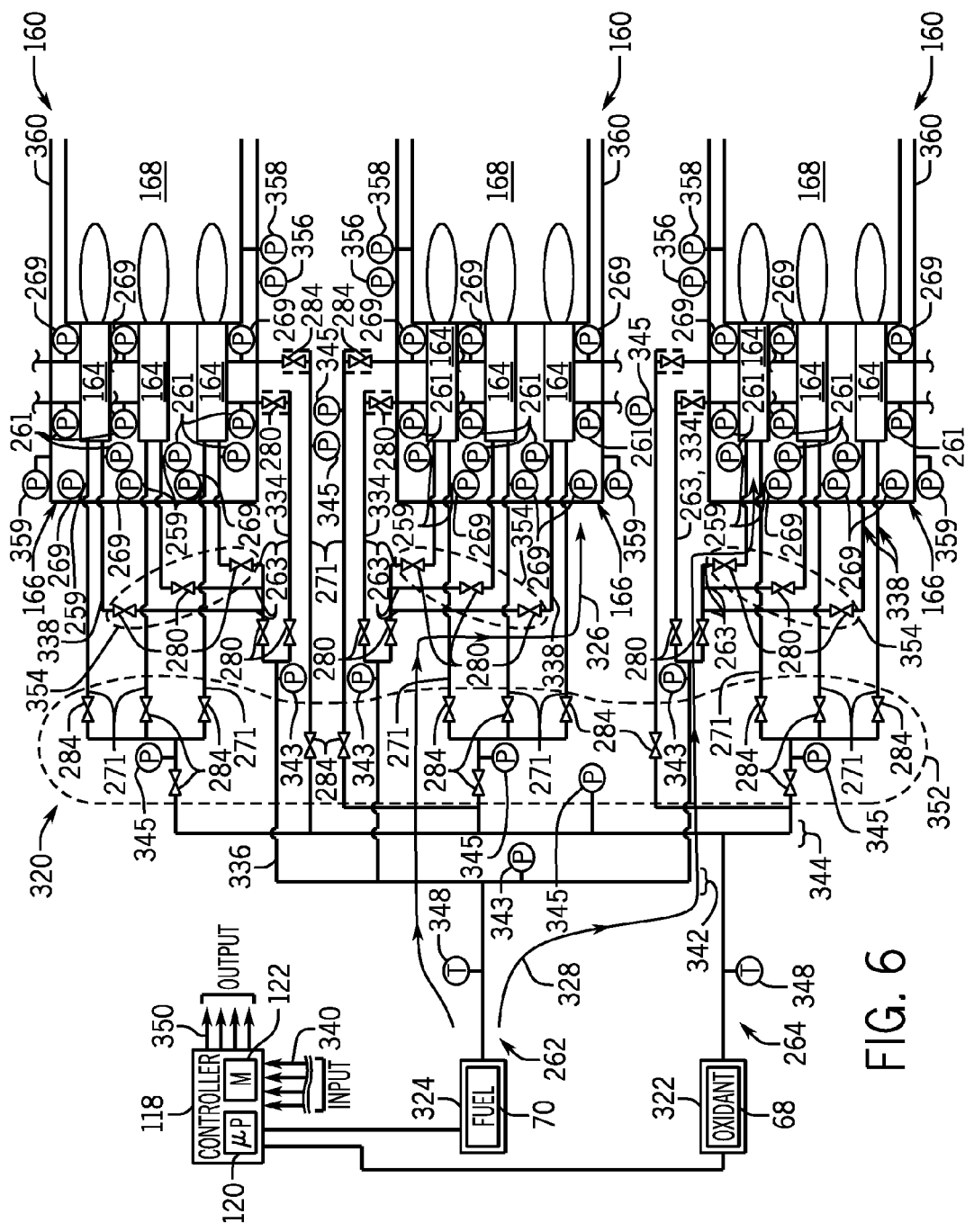
FIG. 6 is a diagram of an embodiment of a distributed flow measurement system with an oxidant supply system, a fuel supply system, and multiple combustors.

FIG. 6 is diagram of an embodiment of a distributed flow measurement system 320 with an oxidant supply system 322 (e.g., oxidant compression system 186 (FIG. 3) and a fuel supply system 324 coupled to multiple combustors 160. The distributed flow measurement system 320 utilizes fuel pressure sensors 261 in fuel passages 263 and oxidant pressure sensors 269 in oxidant passages 271 to determine the fuel flow rate and the oxidant flow rate to each combustor 160. The distributed flow measurement system 320 may determine the fuel flow rate and the oxidant flow rate based at least in part on a comparison of the sensed pressure with a reference pressure. The reference pressure may include, but is not limited to an oxidant supply pressure at the oxidant supply system 322, a fuel supply pressure at the fuel supply system 324, a pressure in a head end portion 166 of the combustor 160 as sensed by a head end pressure sensor 359, pressure in a combustor liner 360 as sensed by a recirculated exhaust gas pressure sensor 356, a pressure in the combustion chamber 168 as sensed by a combustion chamber sensor 358, or any combination thereof. In some embodiments, the distributed flow measurement system 320 determines the fuel flow rate and the oxidant flow rate to one or more fuel nozzles 164 (e.g., diffusion nozzle and/or premix nozzle) of each combustor 160.

As illustrated in FIG. 6, the fuel supply path 262 from the fuel supply system 324 has multiple fuel passages 263, and the oxidant supply path 264 from the oxidant supply system 322 has multiple oxidant passages 271. The distributed flow measurement system 320 may determine a differential fuel pressure for each fuel passage 263 through comparison of the observed fuel pressure via the respective fuel pressure sensor 261 for the respective fuel passage 263 to a reference pressure. Likewise, the distributed flow measurement system 320 may determine a differential oxidant pressure for each oxidant passage 271 through comparison of the measured oxidant pressure via the respective oxidant pressure sensor 269 for the respective oxidant passage 271 to the reference pressure. The distributed flow measurement system 320 may determine the fuel flow rate through each fuel passage 263 based at least in part on the differential fuel pressure, and may determine the oxidant flow rate through each oxidant passage 271 based at least in part on the differential oxidant pressure.

As may be appreciated, the pressure of a fluid (e.g., fuel 70, oxidant 68) along a passage (e.g., fuel passage 263, oxidant passage 271) may decrease based at least in part on the size and route of the passage. For example, the pressure drop of the fluid along a passage may be directly related to the length of the passage such that a long passage induces a greater pressure drop than a short passage. Junctions (e.g., elbows, T's, valves, and so forth) along a flow path may increase a pressure drop of a fluid along the flow path. Moreover, the pressure drop of the fluid along a passage may be inversely proportional to the size (e.g., diameter) of the passage. FIG. 6 illustrates an embodiment of the fuel supply system 324 and the oxidant supply system 322 that are coupled to multiple fuel nozzles 164 via the fuel passages 263 and the oxidant passages 271. The fuel passage 263 to a first fuel nozzle 164 may have differences in size, length, types of junctions, or quantities of junctions along its respective route relative to another fuel passage 263 to a second fuel nozzle 164. For example, fuel 70 flowing along a first flow path 326 may have a different pressure drop than fuel flowing along a second flow path 328. Presently contemplated embodiments are not intended to be limited to the size, routes, and/or junctions of those shown in FIG. 6 along the fuel supply path 262 and the oxidant supply path 264.

The fuel supply system 324 supplies fuel 70 to one or more fuel nozzles 164 (e.g., 1, 2, 3, 4, 5, 6, or more) of each combustor 160 via multiple fuel passages 263 (e.g., 1, 2, 3, or more per fuel nozzle 164), and the oxidant supply system 322 supplies oxidant 68 to one or more fuel nozzles 164 (e.g., 1, 2, 3, 4, 5, 6, or more) of each combustor 160 via one or more oxidant passages 271 (e.g., 1, 2, 3, or more per fuel nozzle 164). In some embodiments, the oxidant 68 and the fuel 70 are premixed by the fuel nozzle 164 (e.g., premix nozzle) into a fuel mixture prior to injection into the combustion chamber 168 of the combustor 160, thereby creating a premix flame. In some embodiments, the oxidant 68 and the fuel 70 are injected separately by the fuel nozzle 164 (e.g., diffusion nozzle) into the combustion chamber 168, thereby creating a diffusion flame. The fuel nozzles 164 may have one or more stages, where each stage receives oxidant 68 via an auxiliary oxidant passage 332 and/or fuel 70 via an auxiliary fuel passage 334. The oxidant passages 271, 332 and the fuel passages 263, 334 may include tubes, pipes, machined passages, cavities, orifices, or any combination thereof. For example, one or more pipes 336 coupled to the fuel supply system 324 supply the fuel 70 to the head end portion 166 of the combustor 160, and machined passages 338 within the head end portion 166 supply the fuel 70 to the fuel nozzles 164.

One or more of the oxidant passages 271, 332 coupled to each combustor 160 includes a pressure tap 259 with a respective oxidant pressure sensor 269, and one or more of the fuel passages 263, 334 coupled to each combustor 160 includes a pressure tap 259 with a respective fuel pressure sensor 261. The pressure taps 259 in the oxidant passages 271 and/or the fuel passages 263 may be arranged within the head end portion 166 of the combustor 160, such as external to, near, or internally within the one or more fuel nozzles 164. The pressure taps 259 and respective oxidant pressures sensors 269 or fuel pressure sensors 261 may be positioned external to, near, or internally within the fuel nozzle 164 where the fluids are injected, thereby enabling the controller 118 to determine the pressure drop of the respective fluid along most of the flow path when the reference pressure is the respective fluid supply system (e.g., oxidant supply system 322, fuel supply system 324). The respective oxidant pressures sensors 269 or fuel pressure sensors 261 may be positioned external to, near, or internally within the fuel nozzle 164 where the fluids are injected, thereby enabling the controller 118 to determine the pressure drop of the respective fluid between the pressure taps 259 and the combustion chamber 168 when the reference pressure is the pressure in the combustion chamber 168. In some embodiments, as illustrated in FIG. 6, each oxidant passage 271 includes a pressure tap 259 and a respective oxidant pressure sensor 269, and each fuel passage 263 includes a pressure tap 259 and a respective fuel pressure sensor 261. Alternatively, one or more of a set of fuel nozzles 164 may have oxidant passages 271 and fuel passages 263 having pressure taps 259, and the remaining fuel nozzles 164 of the set do not have pressure taps 259. For example, the distributed flow measurement system 320 may utilize fuel pressure sensors 261 and oxidant pressure sensors 269 to determine the fuel and oxidant flow rates for a center fuel nozzle and a subset of the exterior fuel nozzles within each combustor 160.

The controller 118 receives pressure signals as input 340 from the pressure sensors (e.g., fuel pressure sensors 261, oxidant pressure sensors 269, recirculated exhaust gas pressure sensors 356, combustion chamber pressure sensors 258, head end pressure sensors 359). The pressure taps 259 in the fuel passages 263 and the oxidant passages 271 enable the distributed flow measurement system 320 to monitor the pressure of the fuel 70 flow or the oxidant 68 flow without significantly affecting the pressure of the measured flow. For example, the pressure taps 259 may reduce the pressure of the measured flow by less than approximately 1, 0.5, or 0.1 percent. In some embodiments, the pressure taps 259 may reduce the pressure of the measured flow by less than approximately 100 to 2500 Pa. Accordingly, the pressure sensors in the pressure taps 259 monitor the pressure of the flow while affecting the pressure of the measured flow less than monitoring the pressure via a restriction flow meter (e.g., orifice plate, Venturi meter) that induces a differential pressure in the flow. In some embodiments, the pressure taps 259 may be formed as part of the machined passages 338 in the head end portion 166.

The controller 118 may determine the flow rate of a fluid by comparing the measured pressure drop at a pressure tap 259 to a reference pressure. For example, the controller 118 may compare a determined pressure of the fuel 70 at a pressure tap 259 to a fuel supply pressure of the fuel supply system 324 and/or to a fuel manifold pressure of a fuel manifold 342 sensed by a fuel manifold pressure sensor 343. Additionally, or in the alternative, the controller 118 may compare the determined pressure of the fuel 70 at the pressure tap 259 to the pressure sensed by the recirculated exhaust gas pressure sensor 356, the combustion chamber pressure sensor 358, or the head end pressure sensor 359. The controller 118 may compare a determined pressure of the oxidant 68 at a pressure tap 259 to an oxidant supply pressure of the oxidant supply system 322 and/or to an oxidant manifold pressure of an oxidant manifold 344 sensed by an oxidant manifold pressure sensor 345. Additionally, or in the alternative, the controller 118 may compare the determined pressure of the oxidant 68 at the pressure tap 259 to the pressure sensed by the recirculated exhaust gas pressure sensor 356, the combustion chamber pressure sensor 358, or the head end pressure sensor 359. In some embodiments, the controller 118 determines the flow rate of the respective fluid (e.g., oxidant 68, fuel 70) utilizing data stored in the memory 122 of the controller 118, such as a look-up table or data related to the route of the respective fluid. The data stored may include reference pressures for each fuel passage 263, each oxidant passage 271, each fuel nozzle 164, each combustor 160, or any combination thereof. Additionally, or in the alternative, the data stored may include reference pressures for various fuel types or for various operating conditions, such as steady state operation, start up, full load, partial load, or any combination thereof.

As may be appreciated, the pressure may be sampled at various points along the fuel passages 262 between the fuel supply system 324 and the fuel nozzles 164. In some embodiments, the gas turbine system supplies fuel 70 from the fuel supply system 324 to each combustor 160 via a fuel manifold 342, and each combustor 160 may receive fuel 70 via one or more fuel manifolds 342. Fuel manifold pressure sensors 343 may be coupled to one or more of the fuel manifolds 342 via pressure taps 259. In a similar manner, the pressure may be sampled at various points along the oxidant passages 264 between the oxidant supply system 322 and the fuel nozzles 164. In some embodiments, the gas turbine system supplies oxidant 68 from the oxidant supply system 322 to each combustor 160 via an oxidant manifold 344, and each combustor 160 may receive oxidant 68 via one or more oxidant manifolds 344. Oxidant manifold pressure sensors 345 may be coupled to one or more of the oxidant manifolds 344 via pressure taps 259. Redundant fuel pressure sensors 261, 343 and/or redundant oxidant pressure sensors 269, 345 may be utilized at any respective location to increase the reliability and accuracy of a pressure measurement. Measuring the pressure of the fuel 70 and the oxidant 68 at the respective fuel and oxidant manifolds 342, 344 enables the controller 118 to obtain flow measurements to each combustor 160 and/or fuel nozzle 164 utilizing fewer pressure taps 259 within each combustor 160 or fuel nozzle 164. As may be appreciated, fewer pressure taps 259 may decrease costs and/or complexity of the distributed flow measurement system. In some embodiments, fuel pressure sampling lines may be brought to a fuel manifold system having one or more fuel pressure sensors 261 and oxidant pressure sampling lines may be brought to an oxidant manifold system having one or more oxidant pressure sensors 269. The respective pressures of the fuel and the oxidant may be sampled (e.g., cyclically) via a simple valve and header arrangement, a multiple port scanning valve, or any combination thereof.

In some embodiments, the controller 118 may determine the flow rate of the fuel 70 along the flow path 326 to a fuel nozzle 346 based at least in part on a determined pressure drop from the fuel manifold 342 to the fuel pressure determined at the fuel nozzle 346. In some embodiments, a technician may generate data relating the flow rate to a pressure drop via empirical testing or calibration of the fuel passages 263 and the oxidant passages 271. The data may be utilized to generate look up tables, equations, graphs, computer models, or algorithms that the controller 118 may utilize to determine the flow rate of a fluid based on a pressure drop during operation of the gas turbine system 150. Additionally, or in the alternative, the flow rate may be determined based at least in part on data corresponding to the route along which a particular fluid flow is supplied to a fuel nozzle 164. For example, the controller 118 may determine the flow rate along the flow path 238 based at least in part on the measured pressure drop and a flow discharge coefficient for the junctions and traveled distance of the fluid along the flow path 238. The controller 118 may store flow discharge coefficients for one or more flow paths in the memory 122 to utilize with the measured fluid pressure to determine the flow rate of the measured fluid. As may be appreciated, the controller 118 may determine the flow rate utilizing a generalized Equation (1):

$$\text{flow rate} = \Delta P^* f_{discharge} \qquad (1)$$

where ΔP is the pressure drop and $f_{discharge}$ is the flow discharge coefficient that may be based at least in part on one or more of the length of the respective passage (e.g., fuel passage 263, oxidant passage 271), the material of the passage, the viscosity of the fluid, the density of the fluid, and the diameter of the respective passage. In some embodiments, the controller 118 may determine the flow rate utilizing Equation (2):

$$\text{flow rate} = (\Delta P)^{0.5} * f_{discharge} \quad (2)$$

The controller 118 may utilize the pressure sensors to monitor the flow rates of the fuel 70 and the oxidant 68 along the respective fuel passages 263 and oxidant passages 271. The controller 118 may monitor the flow rates of the fuel 70 and the oxidant 68 to determine the equivalence ratio of various combustors 160 or fuel nozzles 164 of the gas turbine engine 150. The arrangement of the multiple fuel pressure sensors 261 and the multiple oxidant pressure sensors 269 determines the scope which the controller 118 may monitor the equivalence ratio. In some embodiments in which the controller 118 monitors the flow of fuel 70 through each fuel passage 263 and monitors the flow of oxidant 68 through each oxidant passage 271, the controller 118 may determine the equivalence ratio for each fuel nozzle 164, for each combustor 160, and for the gas turbine system 150. In some embodiments, in which the controller 118 monitors the flow of fuel 70 through a subset of the fuel passages 263 to a combustor 160 and monitors the flow of oxidant 68 through a subset of the oxidant passages 271 to the combustor 160, the controller 118 may determine a bulk equivalence ratio for the combustor 160 and/or for the gas turbine system 150 from the monitored pressure subsets of the fuel and oxidant passages 263, 271.

In some embodiments, the controller 118 may identify anomalies in a fluid flow to a fuel nozzle 164 or combustor 160 based at least in part on the pressure signals. For example, the controller 118 may identify that an obstruction is in an oxidant passage 271 where the controller 118 determines an oxidant pressure is higher than a target oxidant pressure for the oxidant passage 271. Additionally, or in the alternative, the controller 118 may identify anomalies or faults of the fuel flow control valves 280 and/or the oxidant flow control device 284. For example, the controller 118 may identify an anomalous flow control valve when the fluid pressure does not change in accordance with control adjustments to the flow control valve.

In some embodiments, one or more temperature sensors 348 may provide temperature signals to the controller 118 to determine a fuel temperature and an oxidant temperature. The controller 118 may determine the flow rate of the fuel 70 based at least in part on the fuel temperature and the fuel pressure, and/or the controller 118 may determine the flow rate of the oxidant 68 based at least in part on the oxidant temperature and the oxidant pressure. That is, the temperature sensors 348 may enable the controller 118 to augment a flow rate determination based on pressure signals from the fuel pressure sensors 261 and/or the oxidant pressure sensors 269. For example, the controller 118 may utilize the fuel temperature to determine the fuel density and to refine a flow rate determination.

The controller 118 may control the flow of the fuel 70 and/or the flow of the oxidant 68 based at least in part on the determined respective flow rates as discussed above. The controller may control the fuel flow control system 276 and the oxidant flow control system 278 via output signals 350. As discussed above, the controller 118 may control the fuel flow control system 276 with one or more fuel flow control valves 280, and the controller 118 may control the oxidant flow control system 278 with one or more oxidant flow control devices 284. In some embodiments, the oxidant flow control devices 284 in the dashed circle 352 are optional, as are the fuel flow control valves 280 in the dashed circle 354. The circled fuel flow control valves 280 may enable the controller to differentially control the fuel flow to particular fuel nozzles 164 and/or to particular combustors 160 based at least in part on the determined equivalence ratio. Additionally, fuel flow control valves 280 on the auxiliary fuel passages 334 are optionally included in the fuel flow control system 276, and the oxidant flow control devices 284 on the auxiliary oxidant passages 332 are optionally included in the oxidant flow control system 278. In some embodiments, the oxidant flow control devices 284 in the dashed circle 352 and on the auxiliary oxidant passages 332 may be omitted, and the fuel flow control valves 280 in the dashed circle 354 and on the auxiliary fuel passages 334 may be omitted. In other embodiments, one or more of the oxidant flow control devices 284 in the dashed circle 352, the oxidant control devices 284 on the auxiliary oxidant passages 332, the fuel flow control valves 280 in the dashed circle 354, and the fuel flow control valves 280 on the auxiliary fuel passages 334 may be included.

In some embodiments, one or more recirculated exhaust gas pressure sensors 356 and/or one or more combustion chamber pressure sensors 358 may transmit pressure signals to the controller 118. Additionally, or in the alternative, head end pressure sensors 359 may transmit pressure signals to the controller 118. Utilizing the received signals from the recirculated exhaust gas pressure sensors 356, the controller 118 may determine the pressure at the head end portion 166 and/or within a liner 360 of the combustor 160. In some embodiments, exhaust gas is recirculated through the liner 360 to mix with the oxidant 68 and/or the fuel 70 in the head end portion 166 or to mix in the combustion chamber 168. The flow rate of the recirculated exhaust gas may be based at least in part on the pressure at the head end portion 166 or in the liner of the combustor 160. Utilizing the received signals from the combustion chamber pressure sensors 358, the controller 118 may determine the pressure of the combustion products in the combustion chamber 168. The controller 118 may utilize the pressure of combustion products in the combustion chamber 168, the pressure at the head end portion 166, or the pressure within the liner 360 of a combustor 160 as data indicative of the combustion dynamics or characteristics in the combustor 160, such as an actual fuel-to-oxidant ratio of combustion within the combustor 160. Utilizing the received signals from the head end pressure sensors 359, the controller 118 may determine the pressure of the oxidant flow at the head end portion 166 of the combustor 160, such as upstream of the one or more fuel nozzles 164. In response to this information, the controller 118 may adjust either or both of the flows of the fuel 70 and/or oxidant 68 along their respective supply paths 262, 264 and passages 263, 271 to move the dynamics for the fuel nozzle 164 and/or for the combustor 160 toward a predetermined equivalence ratio or fuel-to-oxidant ratio (e.g., a stoichiometric fuel-to-oxidant ratio, or equivalence ratio between approximately 0.90 to 1.10, between 0.95 to 1.05, or about 1.0), which may be used as a set point. As may be appreciated, the routines performed by the controller 118 may include either or both of a feed forward or feedback mechanism.

Figure 7:
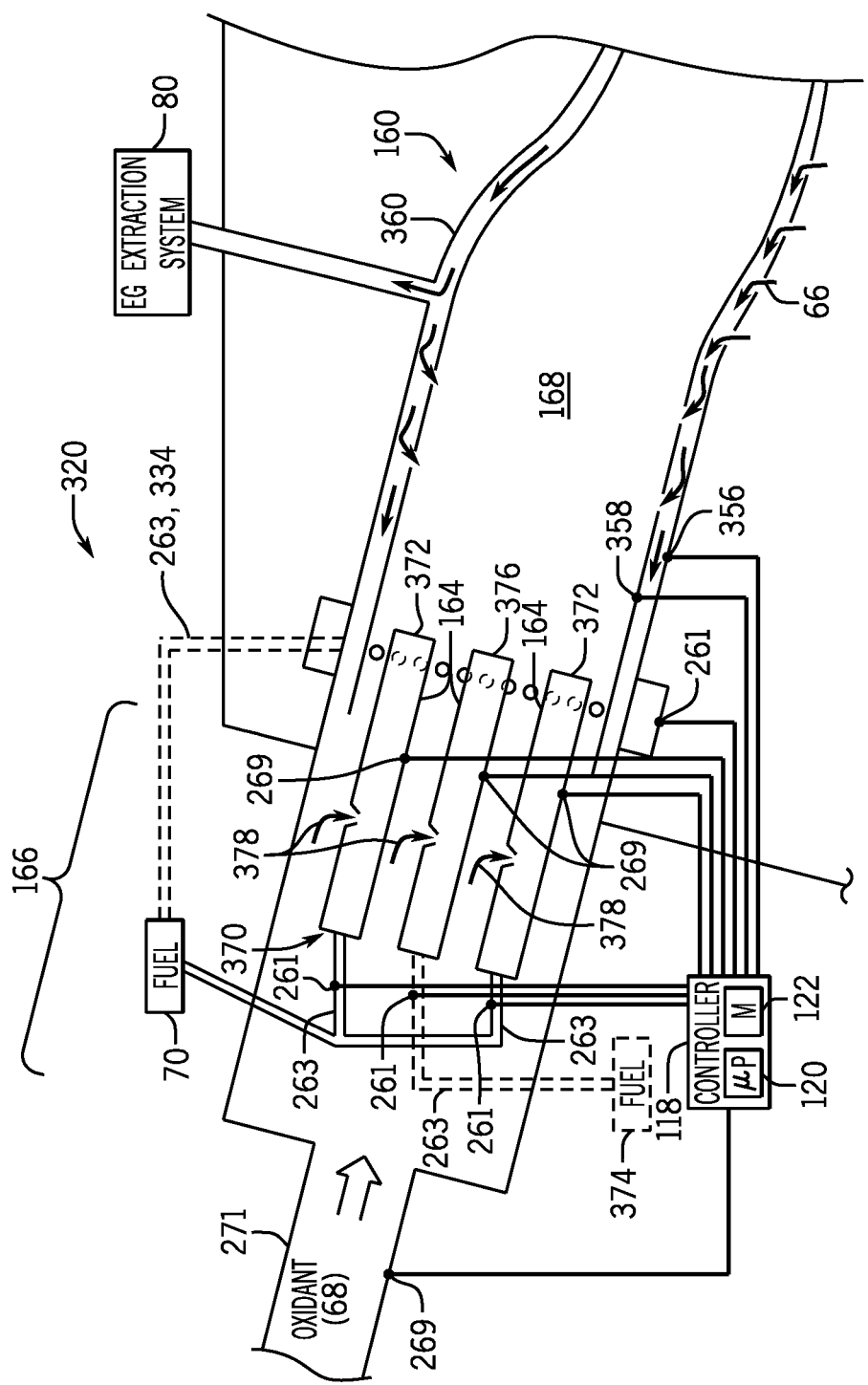
FIG. 7 is a cross-sectional view of an embodiment of a combustor with the distributed flow measurement system.

FIG. 7 is a cross-sectional view of an embodiment of a combustor 160 of the gas turbine system 150 having the distributed flow measurement system 320. The oxidant 68 flows to the head end 166 of the combustor 160 and may enter the fuel nozzles 164 at an upstream end 370. The oxidant pressure sensor 269 on the oxidant passage 271 transmits the pressure signal to the controller 118 based at least in part on the oxidant pressure in the oxidant passage 271. The fuel supply system 324 provides the fuel 70 to the fuel nozzles 164 via fuel passages 263. The fuel supply system 324 may provide the same or a different fuel to each of the fuel nozzles 164. For example, the fuel supply system 324 may supply a first fuel 70 to outer fuel nozzles 372, and may supply a second fuel 374 to a center fuel nozzle 376. The controller 118 may control the second fuel 374 to the center fuel nozzle 376 to tune the combustion in the combustion chamber based on the combustion dynamics or characteristics, such as the equivalence ratio, the combustion temperature, or emissions (e.g., unburnt fuel, $O_2$, CO, $CO_2$, $H_2$, $CH_4$, $NO_X$, water, or other components). In some embodiments, the center fuel nozzle 376 is a pilot fuel nozzle utilized during start-up of the gas turbine engine 150.

In some embodiments, the fuel nozzles 164 may receive the fuel 70 and/or the oxidant 68 in multiple stages. For example, the oxidant 68 may enter the fuel nozzles 164 at the upstream end 370 and as shown by arrows 378. Additionally, or in the alternative, auxiliary fuel passages 334 may provide additional fuel 70 for combustion in the combustion chamber 168.

The controller 118 receives pressure signals from the fuel pressure sensors 261 and from the oxidant pressure sensors 269. As discussed above, the controller 118 may determine the flow rates of the fuel 70 and the oxidant 68 for each fuel nozzle 164 based at least in part on the pressure signals. The controller 118 may also determine the overall flow rates of the fuel 70 and the oxidant 68 for the combustor 160. The equivalence ratio within the combustion chamber 168 is based at least in part on the flow rates of the oxidant 68 and the fuel 70, and may also be based at least in part on the flow rate of the recirculated exhaust gas 60. In some embodiments, the controller 118 may determine the flow rate of the recirculated exhaust gas 60 based at least in part on a pressure signal received from the recirculated exhaust gas pressure sensor 356. The recirculated exhaust gas 60 may flow from within the combustor liner 360 to the head end portion 166 and/or into the combustion chamber 168. The exhaust gas extraction system 80 may extract at least a portion of the recirculated exhaust gas 60 for supply or distribution to an enhanced oil recovery system 18, a pipeline 86, a storage tank 88, or a carbon sequestration system 90.

Figure 8:
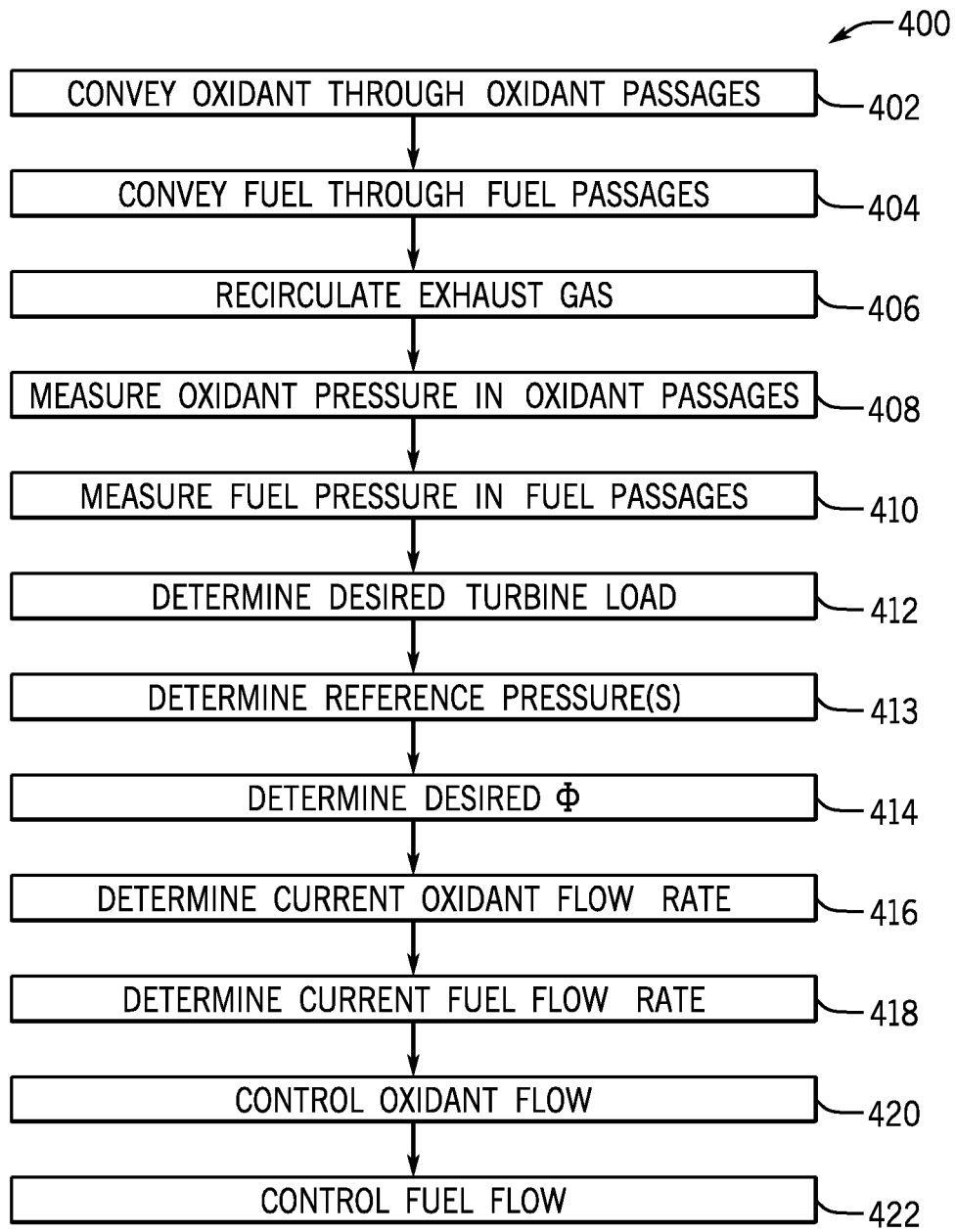
FIG. 8 is a flow chart of an embodiment of a process for monitoring and controlling an oxidant flow rate and a fuel flow rate of a stoichiometric exhaust gas recirculation (SEGR) gas turbine engine.

Some embodiments of the controller 118 may utilize the distributed flow measurement system 320 to control the operation of the gas turbine engine 150 according to a process 400 illustrated in FIG. 8. The oxidant supply system (e.g., oxidant compression system 186 of FIG. 3) conveys oxidant (block 402) through oxidant passages to the one or more fuel nozzles of each combustor. The fuel supply system conveys fuel (block 404) through fuel passages to the one or more fuel nozzles of each combustor. In some embodiments, the exhaust gas compression system recirculates exhaust gas (block 406) from the turbine section to the combustor for dilution of the oxidant in the fuel nozzles and/or in the combustion chamber.

The controller utilizes the distributed flow measurement system to determine the flow rates of fluid through passages to the fuel nozzles based at least in part on measured pressures. The controller measures (block 408) the oxidant pressure of one or more oxidant flows in one or more respective oxidant passages, and measures (block 410) the fuel pressure of one or more fuel flows in one or more respective fuel passages. The measured oxidant pressures and fuel pressures may be determined or received by the controller from pressure sensors. The oxidant pressure sensors and the fuel pressures sensors may provide, intermittently, at regular intervals, or substantially continuously, feedback indicative of the respective pressures of the fuel and the oxidant, or may provide the actual pressure values to the controller.

In some embodiments, the controller may adjust the oxidant flow rate to control the loading on the gas turbine engine, and may adjust the fuel flow rate to maintain a desired equivalence ratio ($\Phi$). The controller may determine (block 412) the desired loading of the gas turbine engine automatically or manually (e.g., based on a manually input load). For example, the controller may determine the desired loading of the gas turbine automatically based on instructions or algorithms stored in memory or the operating history of the gas turbine engine and driven loads. In some embodiments, the controller may determine (block 413) one or more reference pressures. As discussed above, the reference pressure for each passage (e.g., fuel passage, oxidant passage) may be an oxidant supply pressure, a fuel supply pressure, an oxidant manifold pressure, a fuel manifold pressure, a combustor liner pressure (e.g., recirculated exhaust gas pressure), a combustion chamber pressure, or a head end pressure, or any combination thereof. The controller may determine (block 414) the desired equivalence ratio based on one or more factors that include, but are not limited to, environmental conditions, emissions standards, operating state of the gas turbine engine (e.g., start-up, shut down, steady-state operation), destination or use of extracted exhaust gas, and so forth.

The controller determines (block 416) the current oxidant flow rate through each measured oxidant passage based at least in part on the respective measured oxidant pressure. In some embodiments, the controller determines the current oxidant flow rate through comparison of the measured oxidant pressure to a reference oxidant pressure. The controller may determine the current oxidant flow rate based on a corresponding relationship between the oxidant flow rate and pressure drop. The relationship between the oxidant flow rate and the pressure drop may be determined empirically (e.g., via testing) or by calculation of a flow discharge coefficient based at least in part on the length of the oxidant passage, the material of the oxidant passage, the viscosity of the oxidant, the density of the oxidant, or the diameter of the respective oxidant passage, or any combination thereof. In some embodiments, the controller determines (block 416) the current oxidant flow rate in an oxidant passage based at least in part on a measured temperature of the oxidant and the difference in pressure between the measured oxidant pressure and a reference pressure (e.g., oxidant supply pressure, head end pressure, combustor liner pressure, combustion chamber pressure).

Likewise, the controller determines (block 418) the current fuel flow rate through each measured fuel passage based at least in part on the respective measured fuel pressure. In some embodiments, the controller determines the current fuel flow rate through comparison of the measured fuel pressure to a reference fuel pressure. The controller may determine the current fuel flow rate based on a corresponding relationship between the fuel flow rate and pressure drop. The relationship between the fuel flow rate and the pressure drop may be determined empirically (e.g., via testing) or by calculation of a flow discharge coefficient based at least in part on the length of the fuel passage, the material of the fuel passage, the viscosity of the fuel, the density of the fuel, or the diameter of the respective fuel passage, or any combination thereof. In some embodiments, the controller determines (block 418) the current fuel flow rate in a fuel passage based at least in part on a measured temperature of the fuel and the difference in pressure between the measured fuel pressure and a reference pressure (e.g., fuel supply pressure, head end pressure, combustor liner pressure, combustion chamber pressure).

Upon determination of the flow rates of the oxidant and the fuel through the respective oxidant passages and the respective fuel passages, the controller may control (block 420) the oxidant flow and may control (block 422) the fuel flow. As discussed above, the controller may control (block 420) the oxidant flow based at least in part on the desired equivalence ratio and/or the desired loading of the gas turbine engine. In some embodiments, the controller may control (block 420) the oxidant flow to each combustor. Additionally, or in the alternative, the controller may control (block 420) the oxidant flow to one or more fuel nozzles of each combustor. The controller may control (block 422) the fuel flow based at least in part on the desired equivalence ratio and/or the desired loading of the gas turbine engine. In some embodiments, the controller may independently control (block 422) the fuel flow to each combustor. Additionally, or in the alternative, the controller may independently control (block 422) the fuel flow to one or more fuel nozzles of each combustor. For example, the controller may tune the equivalence ratio of a combustor by controlling the fuel flow to a center fuel nozzle of the combustor.

Technical effects of the invention include that the distributed flow measurement system enables the controller to determine the flow rates of the oxidant and the fuel to the fuel nozzles with a minimal effect on the pressure of the supplied oxidant and fuel flows. Oxidant pressure sensors in pressure taps of the oxidant passages transmit oxidant pressure signals to the controller, and the controller may determine the oxidant flow rates based on the oxidant pressure signals. Fuel pressure sensors in pressure taps of the fuel passages transmit fuel pressure signals to the controller, and the controller may determine the fuel flow rates based on the fuel pressure signals. Utilizing the determined oxidant flow rates and the determined fuel flow rates, the controller may adjust the oxidant and fuel flow rates to enable the gas turbine engine to respond to loading changes, and to enable the gas turbine engine to operate at a desired equivalence ratio (e.g., approximately 0.90 to 1.10, approximately 0.95 to 1.05, or about 1.0). As may be appreciated, operating at the desired equivalence ratio may enable the exhaust gas to have a desired composition for use as a recirculated exhaust gas, for use in an enhanced oil recovery system, or for use in another industrial system or process.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Additional Embodiments

The present embodiments provide a system and method for controlling combustion and emissions in a gas turbine engine with exhaust recirculation. It should be noted that any one or a combination of the features described above may be utilized in any suitable combination. Indeed, all permutations of such combinations are presently contemplated. By way of example, the following clauses are offered as further description of the present disclosure:

Embodiment 1. A system having a first combustor with a plurality of first oxidant passages configured to supply a first oxidant flow to the first combustor, a plurality of first fuel passages configured to supply a first fuel flow to the first combustor, a plurality of first oxidant pressure sensors, a plurality of first fuel pressure sensors, and a controller coupled to the plurality of first oxidant pressure sensors and to the plurality of first fuel pressure sensors. Each first oxidant pressure sensor of the plurality of first oxidant pressure sensors is fluidly coupled to a respective first oxidant passage of the plurality of first oxidant passages and is configured to transmit a respective first oxidant pressure signal. Each first fuel pressures sensor of the plurality of first fuel pressure sensors is fluidly coupled to a respective first fuel passage of the plurality of first fuel passages and is configured to transmit a respective first fuel pressure signal. The controller is configured to determine a first oxidant flow rate through each first oxidant passage of the plurality of first oxidant passages based at least in part on the respective first oxidant pressure signal and a first reference oxidant pressure. The controller is configured to determine a first fuel flow rate through each first fuel passage of the plurality of first fuel passages based at least in part on the respective first fuel pressure signal and a first reference fuel pressure.

Embodiment 2. The system of embodiment 1, wherein the first combustor is an annular combustor.

Embodiment 3. The system of any preceding embodiment, having a second combustor with a plurality of second oxidant passages configured to supply a second oxidant flow to the second combustor, a plurality of second fuel passages configured to supply a second fuel flow to the second combustor, a plurality of second oxidant pressure sensors, a plurality of second fuel pressure sensors, and the controller is coupled to the plurality of second oxidant pressure sensors and to the plurality of second fuel pressure sensors. Each second oxidant pressure sensor of the plurality of second oxidant pressure sensors is fluidly coupled to a respective second oxidant passage of the plurality of second oxidant passages and is configured to transmit a respective second oxidant pressure signal. Each second fuel pressures sensor of the plurality of second fuel pressure sensors is fluidly coupled to a respective second fuel passage of the plurality of second fuel passages and is configured to transmit a respective second fuel pressure signal. The controller is configured to determine a second oxidant flow rate through each second oxidant passage of the plurality of second oxidant passages based at least in part on the respective second oxidant pressure signal and a second reference oxidant pressure. The controller is configured to determine a second fuel flow rate through each second fuel passage of the plurality of second fuel passages based at least in part on the respective second fuel pressure signal and a second reference fuel pressure.

Embodiment 4. The system of any preceding embodiment, wherein the first combustor has a plurality of first fuel nozzles, the plurality of first fuel nozzles includes the respective plurality of first fuel passages, and the plurality of first fuel nozzles includes pre-mix nozzles, diffusion nozzles, or any combination thereof.

Embodiment 5. The system of any preceding embodiment, wherein the first reference oxidant pressure is based at least in part on a pressure of an oxidant supply system fluidly coupled to the plurality of first oxidant passages, and the first reference fuel pressure is based at least in part on a pressure of a fuel supply fluidly coupled to the plurality of first fuel passages.

Embodiment 6. The system of any of the preceding embodiment, wherein the first reference oxidant pressure is the first fuel pressure, and the first reference oxidant pressure is based at least in part on a pressure of an oxidant supply system fluidly coupled to the plurality of first oxidant passages, a fuel supply fluidly coupled to the plurality of first fuel passages, a head end pressure, a combustor liner pressure, or a combustion chamber pressure, or any combination thereof.

Embodiment 7. The system of any preceding embodiment, wherein the controller is configured to control the first fuel flow to the first combustor based at least in part on the determined first oxidant flow rate and the determined first fuel flow rate to the first combustor.

Embodiment 8. The system of any preceding embodiment, wherein the controller is configured to control the first oxidant flow to the first combustor based at least in part on the determined first oxidant flow rate and the determined first fuel flow rate to the first combustor.

Embodiment 9. The system of any preceding embodiment, having a lambda sensor configured to measure an oxidant concentration in an exhaust gas from the first combustor, wherein the controller is configured to control at least one of the first fuel flow or the first oxidant flow to the first combustor based at least in part on the measured oxidant concentration, the determined first fuel flow rate, and the determined first oxidant flow rate.

Embodiment 10. The system of any preceding embodiment, having a gas turbine engine with the first combustor, wherein the controller is configured to control the first oxidant flow and the first fuel flow based at least in part on a target equivalence ratio between 0.95 and 1.05.

Embodiment 11. The system of embodiment 10, wherein the gas turbine engine is a stoichiometric exhaust gas recirculation (SEGR) gas turbine engine.

Embodiment 12. A system includes a plurality of combustors and a distributed flow measurement system coupled to the plurality of combustors. Each combustor of the plurality of combustors includes one or more oxidant passages and one or more fuel passages. The distributed flow measurement system is configured to measure an oxidant flow rate for a respective oxidant passage of the one or more oxidant passages of the respective combustor based at least in part on an oxidant pressure drop along the respective oxidant passage, and the distributed flow measurement system is configured to measure a fuel flow rate for a respective fuel passage of the one or more fuel passages of the respective combustor based at least in part on a fuel pressure drop along the respective fuel passage.

Embodiment 13. The system of embodiment 12, wherein each combustor of the plurality of combustors includes a fuel manifold fluidly coupled to the one or more fuel passages of the respective combustor via one or more fuel valves or a multiple port fuel scanning valve, a fuel manifold pressure sensor coupled to the fuel manifold, wherein the fuel manifold pressure sensor is configured to sense a respective fuel pressure of the one or more fuel passages, an oxidant manifold fluidly coupled to the one or more oxidant passages of the respective combustor via one or more oxidant valves or a multiple port oxidant scanning valve, and an oxidant manifold pressure sensor coupled to the oxidant manifold, wherein the oxidant manifold pressure sensor is configured to sense a respective oxidant pressure of the one or more oxidant passages.

Embodiment 14. The system of embodiment 12 or 13, wherein the distributed flow measurement system includes a plurality of oxidant pressure sensors and a plurality of fuel pressure sensors. Each oxidant pressure sensor of the plurality of oxidant pressure sensors is coupled to a corresponding oxidant passage of the one or more oxidant passages of each combustor of the plurality of combustors. Each fuel pressure sensor of the plurality of fuel pressure sensors is coupled to a corresponding fuel passage of the one or more fuel passages of each combustor of the plurality of combustors.

Embodiment 15. The system of embodiment 14, wherein the distributed flow measurement system is configured to measure the oxidant flow rate and the fuel flow rate for each combustor of the plurality of combustors without constricting an oxidant flow through the one or more oxidant passages and without constricting a fuel flow through the one or more fuel passages.

Embodiment 16. The system of embodiment 12, 13, 14, or 15, wherein each oxidant passage of the one or more oxidant passages includes an oxidant flow discharge coefficient, and each fuel passage of the one or more fuel passages comprises a fuel flow discharge coefficient, wherein the distributed flow measurement system is configured to measure the oxidant flow rate for each oxidant passage of the one or more oxidant passages based at least in part on the respective oxidant flow discharge coefficient, and the distributed flow measurement system is configured to measure the fuel flow rate for each fuel passage of the one or more fuel passages based at least in part on the respective fuel flow discharge coefficient.

Embodiment 17. The system of embodiment 12, 13, 14, 15, or 16, wherein the plurality of combustors includes pre-mix fuel nozzles, diffusion fuel nozzles, or any combination thereof.

Embodiment 18. A method of operating a combustor, including conveying an oxidant flow through a plurality of oxidant passages, conveying a fuel flow through a plurality of fuel passages, measuring an oxidant pressure of the oxidant flow through each oxidant passage of the plurality of oxidant passages, measuring a fuel pressure of the fuel flow through each fuel passage of the plurality of fuel passages, determining an oxidant flow rate through each oxidant passage of the plurality of oxidant passages based at least in part on the respective oxidant pressure and a reference pressure, and determining a fuel flow rate of the fuel flow through each fuel passage of the plurality of fuel passages based at least in part on the respective fuel flow and the reference pressure.

Embodiment 19. The method of embodiment 18, including determining the oxidant flow rate of the oxidant flow through each oxidant passage of the plurality of oxidant passages utilizing oxidant passage data stored in a memory and determining the fuel flow rate of the fuel flow through each fuel passage of the plurality of fuel passages utilizing fuel passage data stored in the memory.

Embodiment 20. The method of embodiment 18 or 19, including determining the oxidant flow rate of the oxidant flow through each oxidant passage of the plurality of oxidant passages based at least in part on an oxidant flow discharge coefficient of the respective oxidant passage, and determining the fuel flow rate of the fuel flow through each fuel passage of the plurality of fuel passages based at least in part on a fuel flow discharge coefficient of the respective fuel passage.

Embodiment 21. The method of embodiment 18, 19, or 20, including controlling a ratio of the fuel flow to the oxidant flow conveyed to the combustor based at least in part on the oxidant flow rate and the fuel flow rate.

Embodiment 22. The method of embodiment 21, including controlling the ratio of the fuel flow to the oxidant flow to an equivalence ratio between 0.95 to 1.05.

Embodiment 23. The method of embodiment 21 or 22, including measuring an oxidant concentration in an exhaust flow from the combustor and controlling the ratio of the fuel flow to the oxidant flow based at least in part on the oxidant concentration.

Embodiment 24. The method of embodiment 18, 19, 20, 21, 22, or 23, including identifying an oxidant flow anomaly in a respective oxidant passage of the plurality of oxidant passages based at least in part on the oxidant pressure of the respective oxidant passage or identifying a fuel flow anomaly in a respective fuel passage of the plurality of fuel passages based at least in part on the fuel pressure of the respective fuel passage.

Embodiment 25. The method of embodiment 18, 19, 20, 21, 22, 23, or 24, including measuring an oxidant temperature of the oxidant flow through each oxidant passage of the plurality of oxidant passages, measuring a fuel temperature of the fuel flow through each fuel passage of the plurality of fuel passages, determining the oxidant flow rate of the oxidant flow through each oxidant passage based at least in part on the respective oxidant temperature, and determining the fuel flow rate of the fuel flow through each fuel passage based at least in part on the respective fuel temperature.

The invention claimed is:

1. A system comprising:
a first combustor, comprising:
a plurality of first oxidant passages configured to supply a first oxidant flow to the first combustor;
a plurality of first fuel passages configured to supply a first fuel flow to the first combustor;
a plurality of first oxidant pressure sensors, wherein each first oxidant pressure sensor of the plurality of first oxidant pressure sensors is fluidly coupled to a respective first oxidant passage of the plurality of first oxidant passages and is configured to transmit a respective first oxidant pressure signal corresponding to a first oxidant pressure of the respective first oxidant passage; and
a plurality of first fuel pressure sensors, wherein each first fuel pressure sensor of the plurality of first fuel pressure sensors is fluidly coupled to a respective first fuel passage of the plurality of first fuel passages and is configured to transmit a respective first fuel pressure signal corresponding to a first fuel pressure of the respective first fuel passage; and
a controller coupled to the plurality of first oxidant pressure sensors and to the plurality of first fuel pressure sensors, wherein the controller is configured to determine a first oxidant flow rate through each first oxidant passage of the plurality of first oxidant passages based at least in part on the respective first oxidant pressure signal and a first reference oxidant pressure, and the controller is configured to determine a first fuel flow rate through each first fuel passage of the plurality of first fuel passages based at least in part on the respective first fuel pressure signal and a first reference fuel pressure.

2. The system of claim 1, wherein the first combustor comprises an annular combustor.

3. The system of claim 1, comprising a second combustor, comprising:
a plurality of second oxidant passages configured to supply a second oxidant flow to the second combustor;
a plurality of second fuel passages configured to supply a second fuel flow to the second combustor;
a plurality of second oxidant pressure sensors, wherein each second oxidant pressure sensor of the plurality of second oxidant pressure sensors is fluidly coupled to a respective second oxidant passage of the plurality of second oxidant passages and is configured to transmit a respective second oxidant pressure signal corresponding to a second oxidant pressure of the respective second oxidant passage; and
a plurality of second fuel pressure sensors, wherein each second fuel pressure sensor of the plurality of second fuel pressure sensors is fluidly coupled to a respective second fuel passage of the plurality of second fuel passages and is configured to transmit a respective second fuel pressure signal corresponding to a second fuel pressure of the respective second fuel passage;
wherein the controller is configured to determine a second oxidant flow rate through each second oxidant passage of the plurality of second oxidant passages based at least in part on the respective second oxidant pressure signal and a second reference oxidant pressure, and the controller is configured to determine a second fuel flow rate through each second fuel passage of the plurality of second fuel passages based at least in part on the respective second fuel pressure signal and a second reference fuel pressure.

4. The system of claim 1, wherein the first combustor comprises a plurality of first fuel nozzles, the plurality of first fuel nozzles comprises the respective plurality of first fuel passages, and the plurality of first fuel nozzles comprises pre-mix nozzles, diffusion nozzles, or any combination thereof.

5. The system of claim 1, wherein the first reference oxidant pressure is based at least in part on a pressure of an oxidant supply system fluidly coupled to the plurality of first oxidant passages, and the first reference fuel pressure is based at least in part on a pressure of a fuel supply fluidly coupled to the plurality of first fuel passages.

6. The system of claim 1, wherein the first reference oxidant pressure is the same as the first reference fuel pressure, and the first reference oxidant pressure is based at least in part on a pressure of an oxidant supply system fluidly coupled to the plurality of first oxidant passages, a fuel supply fluidly coupled to the plurality of first fuel passages, a head end pressure, a combustor liner pressure, or a combustion chamber pressure, or any combination thereof.

7. The system of claim 1, wherein the controller is configured to control the first fuel flow to the first combustor based at least in part on the determined first oxidant flow rate and the determined first fuel flow rate to the first combustor.

8. The system of claim 1, wherein the controller is configured to control the first oxidant flow to the first combustor based at least in part on the determined first oxidant flow rate and the determined first fuel flow rate to the first combustor.

9. The system of claim 1, comprising a lambda sensor configured to measure an oxidant concentration in an exhaust gas from the first combustor, wherein the controller is configured to control at least one of the first fuel flow or the first oxidant flow to the first combustor based at least in part on the measured oxidant concentration, the determined first fuel flow rate, and the determined first oxidant flow rate.

10. The system of claim 1, comprising a gas turbine engine having the first combustor, wherein the controller is configured to control the first oxidant flow and the first fuel flow based at least in part on a target equivalence ratio between 0.95 and 1.05.

11. The system of claim 10, wherein the gas turbine engine comprises a stoichiometric exhaust gas recirculation (SEGR) gas turbine engine.

12. A system comprising:
a plurality of combustors, wherein each combustor comprises one or more oxidant passages and one or more fuel passages; and
a distributed flow measurement system coupled to the plurality of combustors, wherein the distributed flow measurement system is configured to measure an oxidant flow rate for a respective oxidant passage of the one or more oxidant passages of the respective combustor based at least in part on an oxidant pressure drop along the respective oxidant passage, and the distributed flow measurement system is configured to measure a fuel flow rate for a respective fuel passage of the one or more fuel passages of the respective combustor based at least in part on a fuel pressure drop along the respective fuel passage.

13. The system of claim 12, wherein each combustor of the plurality of combustors comprises:
a fuel sampling manifold fluidly coupled to the one or more fuel passages of the respective combustor via one or more fuel valves or a multiple port fuel scanning valve, wherein the distributed flow measurement system is configured to control the one or more fuel valves or the multiple port fuel scanning valve to cyclically sample to the fuel sampling manifold a respective fuel flow through each fuel passage of the one or more fuel passages;
a fuel manifold pressure sensor coupled to the fuel sampling manifold, wherein the fuel manifold pressure sensor is configured to sense a respective fuel pressure of the respective fuel flow sampled to the fuel sampling manifold;
an oxidant sampling manifold fluidly coupled to the one or more oxidant passages of the respective combustor via one or more oxidant valves or a multiple port oxidant scanning valve, wherein the distributed flow measurement system is configured to control the one or more oxidant valves or the multiple port oxidant scanning valve to cyclically sample to the oxidant sampling manifold a respective oxidant flow through each oxidant passage of the one or more oxidant passages; and
an oxidant manifold pressure sensor coupled to the oxidant sampling manifold, wherein the oxidant manifold pressure sensor is configured to sense a respective oxidant pressure of the respective oxidant flow sampled to the oxidant sampling manifold.

14. The system of claim 12, wherein the distributed flow measurement system comprises:
a plurality of oxidant pressure sensors, wherein each oxidant pressure sensor of the plurality of oxidant pressure sensors is coupled to a corresponding oxidant passage of the one or more oxidant passages of each combustor of the plurality of combustors; and
a plurality of fuel pressure sensors, wherein each fuel pressure sensor of the plurality of fuel pressure sensors is coupled to a corresponding fuel passage of the one or more fuel passages of each combustor of the plurality of combustors.

15. The system of claim 14, wherein the distributed flow measurement system is configured to measure the oxidant flow rate and the fuel flow rate for each combustor of the plurality of combustors without constricting an oxidant flow through the one or more oxidant passages and without constricting a fuel flow through the one or more fuel passages.

16. The system of claim 12, wherein each oxidant passage of the one or more oxidant passages comprises an oxidant flow discharge coefficient, and each fuel passage of the one or more fuel passages comprises a fuel flow discharge coefficient, wherein the distributed flow measurement system is configured to measure the oxidant flow rate for each oxidant passage of the one or more oxidant passages based at least in part on the respective oxidant flow discharge coefficient, and the distributed measurement system is configured to measure the fuel flow rate for each fuel passage of the one or more fuel passages based at least in part on the respective fuel flow discharge coefficient.

17. The system of claim 12, wherein the plurality of combustors comprises pre-mix fuel nozzles, diffusion fuel nozzles, or any combination thereof.

18. A method of operating a combustor with a controller programmed to execute control of a process comprising:
conveying an oxidant flow through a plurality of oxidant passages;
conveying a fuel flow through a plurality of fuel passages;
measuring an oxidant pressure of the oxidant flow through each oxidant passage of the plurality of oxidant passages;
measuring a fuel pressure of the fuel flow through each fuel passage of the plurality of fuel passages;
determining an oxidant flow rate of the oxidant flow through each oxidant passage of the plurality of oxidant passages based at least in part on the respective oxidant pressure and a reference pressure;
determining a fuel flow rate of the fuel flow through each fuel passage of the plurality of fuel passages based at least in part on the respective fuel flow and the reference pressure, wherein the reference pressure comprises a head end pressure in a head end portion of the combustor or a combustion chamber pressure in the combustor; and
controlling a ratio of the fuel flow to the oxidant flow conveyed to the combustor based at least in part on the oxidant flow rate and the fuel flow rate.

19. The method of claim 18, comprising:
determining the oxidant flow rate of the oxidant flow through each oxidant passage of the plurality of oxidant passages utilizing oxidant passage data stored in a memory; and
determining the fuel flow rate of the fuel flow through each fuel passage of the plurality of fuel passages utilizing fuel passage data stored in the memory.

20. The method of claim 18, comprising:
determining the oxidant flow rate of the oxidant flow through each oxidant passage of the plurality of oxidant passages based at least in part on an oxidant flow discharge coefficient of the respective oxidant passage; and
determining the fuel flow rate of the fuel flow through each fuel passage of the plurality of fuel passages based at least in part on a fuel flow discharge coefficient of the respective fuel passage.

21. The method of claim 18, comprising controlling the ratio of the fuel flow to the oxidant flow to an equivalence ratio between 0.95 to 1.05.

22. The method of claim 18, comprising:

measuring an oxidant concentration in an exhaust flow from the combustor; and controlling the ratio of the fuel flow to the oxidant flow based at least in part on the oxidant concentration.

23. The method of claim 18, comprising identifying an oxidant flow anomaly in a respective oxidant passage of the plurality of oxidant passages based at least in part on the oxidant pressure of the respective oxidant passage or identifying a fuel flow anomaly in a respective fuel passage of the plurality of fuel passages based at least in part on the fuel pressure of the respective fuel passage.

24. The method of claim 18, comprising:

measuring an oxidant temperature of the oxidant flow through each oxidant passage of the plurality of oxidant passages;

measuring a fuel temperature of the fuel flow through each fuel passage of the plurality of fuel passages;

determining the oxidant flow rate of the oxidant flow through each oxidant passage based at least in part on the respective oxidant temperature; and determining the fuel flow rate of the fuel flow through each fuel passage based at least in part on the respective fuel temperature.

25. The system of claim 5, wherein the first combustor comprises:

a plurality of fuel nozzles, wherein each fuel nozzle of the plurality of fuel nozzles is coupled to a respective first oxidant passage of the plurality of first oxidant passages and to a first fuel passage of the plurality of first fuel passages, wherein each fuel nozzle comprises:

an oxidant pressure tap comprising a respective first oxidant pressure sensor of the plurality of first oxidant pressure sensors; and a fuel pressure tap comprising a respective first fuel pressure sensor of the plurality of first fuel pressure sensors.

* * * * *